United States Patent
Bolli et al.

(10) Patent No.: US 12,479,820 B2
(45) Date of Patent: Nov. 25, 2025

(54) PYRIDIN-3-YL DERIVATIVES

(71) Applicant: Idorsia Pharmaceuticals Ltd, Allschwil (CH)

(72) Inventors: Martin Bolli, Allschwil (CH); Christine Brotschi, Allschwil (CH); Cyrille Lescop, Allschwil (CH)

(73) Assignee: IDORSIA PHARMACEUTICALS LTD, Allschwil (CH)

( * ) Notice: Subject to any disclaimer, the term of this patent is extended or adjusted under 35 U.S.C. 154(b) by 1000 days.

(21) Appl. No.: 17/620,520

(22) PCT Filed: Jun. 17, 2020

(86) PCT No.: PCT/EP2020/066767
§ 371 (c)(1),
(2) Date: Dec. 17, 2021

(87) PCT Pub. No.: WO2020/254408
PCT Pub. Date: Dec. 24, 2020

(65) Prior Publication Data
US 2022/0251068 A1    Aug. 11, 2022

(30) Foreign Application Priority Data
Jun. 18, 2019 (WO) .................. PCT/EP2019/065963

(51) Int. Cl.
*C07D 401/12* (2006.01)
*A61P 9/14* (2006.01)
*C07D 401/14* (2006.01)
*C07D 405/14* (2006.01)

(52) U.S. Cl.
CPC .............. *C07D 401/12* (2013.01); *A61P 9/14* (2018.01); *C07D 401/14* (2013.01); *C07D 405/14* (2013.01)

(58) Field of Classification Search
CPC ........................... C07D 401/12; C07D 401/14
See application file for complete search history.

(56) References Cited

U.S. PATENT DOCUMENTS

| | | | |
|---|---|---|---|
| 3,097,209 | A | 7/1963 | Jannsen |
| 6,734,184 | B1 | 5/2004 | Barlaam et al. |
| 7,855,290 | B2 | 12/2010 | Matsushima et al. |
| 12,344,597 | B2 | 7/2025 | Bolli et al. |
| 2004/0067908 | A1 | 4/2004 | Nakade et al. |
| 2007/0078120 | A1 | 4/2007 | Ban et al. |
| 2008/0207573 | A1 | 8/2008 | Yager et al. |
| 2008/0319188 | A1 | 12/2008 | Matsushima et al. |
| 2012/0232026 | A1 | 9/2012 | Curtis et al. |
| 2021/0246116 | A1 | 8/2021 | Bolli et al. |
| 2023/0000846 | A1 | 1/2023 | Birker et al. |

FOREIGN PATENT DOCUMENTS

| | | |
|---|---|---|
| EP | 1 364 659 A1 | 11/2003 |
| EP | 2 481 725 A1 | 8/2012 |
| JP | 2008-110971 A1 | 5/2008 |
| WO | WO 1996/011940 A1 | 4/1996 |
| WO | WO 2000/012478 A1 | 3/2000 |
| WO | WO 2001/032173 A1 | 5/2001 |
| WO | WO 2001/077077 A1 | 10/2001 |
| WO | WO 2002/062389 A1 | 8/2002 |
| WO | WO 2003/088908 A2 | 10/2003 |
| WO | WO 2004/085385 A2 | 10/2004 |
| WO | WO 2004/110350 A2 | 12/2004 |
| WO | WO 2005/023761 A2 | 3/2005 |
| WO | WO 2005/037269 A1 | 4/2005 |
| WO | WO 2005/049605 A1 | 6/2005 |
| WO | WO 2006/073967 A1 | 7/2006 |
| WO | WO 2006/091862 A2 | 8/2006 |
| WO | WO 2007/058990 A2 | 5/2007 |
| WO | WO 2007/146712 A2 | 12/2007 |
| WO | WO 2008/115281 A2 | 9/2008 |
| WO | WO 2009/051715 A1 | 4/2009 |
| WO | WO 2009/131940 A1 | 10/2009 |

(Continued)

OTHER PUBLICATIONS

U.S. Appl. No. 16/972,878, filed Dec. 7, 2020 (371(c) Date), Bolli et al.
Abu El-Asrar, A. et al., "Expression of Autotaxin and Acylglycerol Kinase in Proliferative Vitreoretinal Epiretinal Membranes," Acta Ophthainiologica, 2012, 90, e84-e89.
An, S. et al., "Molecular Cloning of the Human Edg2 Protein and Its Identification as a Functional Cellular Receptor for Lysophosphatidic Acid," Biochemical and Biophysical Research Communications, 1997, 231, 619-622.
Baker, D. et al., "Direct Quantitative Analysis of Lysophosphatidic Acid Molecular Species by Stable Isotope Dilution Electrospray Ionization Liquid Chromatography-Mass Spectrometry," Analytical Biochemistry, 2001, 292, 287-295.
Boucharaba, A. et al., "Platelet-Derived Lysophosphatidic Acid Supports the Progression of Osteolytic Bone Metastases in Breast Cancer," The Journal of Clinical Investigation, 2004, 114 (12), 1714-1725.

(Continued)

*Primary Examiner* — Brian E Mcdowell
(74) *Attorney, Agent, or Firm* — Hoxie & Associates LLC

(57) ABSTRACT

The present invention relates to pyridin-3-yl derivatives of Formula (I)

Formula (I)

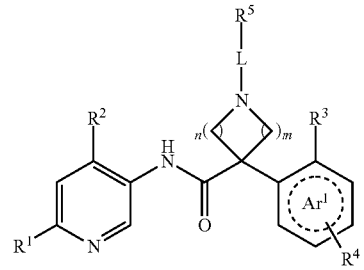

wherein $R^1$, $R^2$, $R^3$, $R^4$, $R^5$, $Ar^1$, L, m and n are as described in the description, their preparation, to pharmaceutically acceptable salts thereof, and to their use as pharmaceuticals, to pharmaceutical compositions containing one or more compounds of Formula (I), and especially to their use as LPA1 receptor modulators.

17 Claims, No Drawings

(56) References Cited

FOREIGN PATENT DOCUMENTS

| | | |
|---|---|---|
| WO | WO 2009/135590 A1 | 11/2009 |
| WO | WO 2010/023181 A1 | 3/2010 |
| WO | WO 2011/037192 A1 | 3/2011 |
| WO | WO 2012/017359 A1 | 2/2012 |
| WO | WO 2012/055995 A1 | 5/2012 |
| WO | WO 2012/078805 A1 | 6/2012 |
| WO | WO 2012/082817 A1 | 6/2012 |
| WO | WO 2012/120399 A1 | 9/2012 |
| WO | WO 2013/096771 A1 | 6/2013 |
| WO | WO 2014/079805 A1 | 5/2014 |
| WO | WO 2017/177004 A1 | 10/2017 |
| WO | WO 2019/234115 A1 | 12/2019 |
| WO | WO 2021/110805 A1 | 6/2021 |

OTHER PUBLICATIONS

Boucharaba, A. et al., "The Type 1 Lysophosphatidic Acid Receptor is a Target for Therapy in Bone Metastases," Proceedings of the National Academy of Sciences, 2006, 103 (25), 9643-9648.

Bremner, D. et al., "The Synthesis of Thienopyridines from ortho-Halogenated Pyridine Derivatives," Synthesis, 1992, 6, 528-530.

Brindley, D., "Lipid Phosphate Phosphatases and Related Proteins: Signaling Functions in Development, Cell Division, and Cancer," Journal of Cellular Biochemistry, 2004, 92, 900-912.

Castelino, F. et al., "Amelioration of Dermal Fibrosis by Genetic Deletion or Pharmacologic Antagonism of Lysophosphatidic Acid Receptor 1 in a Mouse Model of Scleroderma," Arthritis & Rheumatism, 2011, 63 (5), 1405-1415.

Choi, J. et al., "LPA Receptors: Subtypes and Biological Actions," Annual Review of Pharmacology and Toxicology, 2010, 50, 157-186.

Choi, J. et al., "Lysophospholipids and Their Receptors in the Central Nervous System," Biochimica et Biophysica Acta, 2013, 1831, 20-32.

Chun, J. et al., Eds., Lysophospholipid Receptors: Signaling and Biochemistry, 2013, John Wiley & Sons, Inc., ISBN: 978-0-470-56905-4.

Dollé, V. et al., "Studies Towards 4-C-Alkylation of Pyridin-2(1H)-one Derivatives," Tetrahedron, 1997, 53 (37), 12505-12524.

D'Souza, K. et al., "Lysophosphatidic Acid Signaling in Obesity and Insulin Resistance," Nutrients, 2018, 10, 399, 20 pages, doi:10.3390/nu10040399.

Fujiwara, Y. et al., "Identification of Residues Responsible for Ligand Recognition and Regioisomeric Selectivity of Lysophosphatidic Acid Receptors Expressed in Mammalian Cells," The Journal of Biological Chemistry, 2005, 280 (41), 35038-35050.

Georas, S. et al., "Lysophosphatidic Acid is Detectable in Human Bronchoalveolar Lavage Fluids at Baseline and Increased After Segmental Allergen Challenge," Clinical and Experimental Allergy, 2006, 37 (3), 311-322.

Gill, M. et al., "Pigments of Fungi. LIX*† Synthesis of (1S,3S)- and (1R,3R)-Austrocortilutein and (1S,3S)-Austrocortirubin from Citramalic Acid," Australian Journal of Chemistry, 2000, 53, 245-256.

Goetzl, E. et al., "Lysophospholipid Growth Factors and Their G Protein-Coupled Receptors in Immunity, Coronary Artery Disease, and Cancer," The Scientific World Journal, 2002, 2, 324-338.

Greene, T. et al., Eds., "Protective Groups in Organic Synthesis," Wiley-Interscience, 1999.

Guo, C. et al., "Mitogenic Signaling in Androgen Sensitive and Insensitive Prostate Cancer Cell Lines," The Journal of Urology, 2000, 163, 1027-1032.

Hecht, J. et al., "*Ventricular Zone Gene-1* (vzg-1) Encodes a Lysophosphatidic Acid Receptor Expressed in Neurogenic Regions of the Developing Cerebral Cortex," The Journal of Cell Biology, 1996, 135 (4), 1071-1083.

Inoue, M. et al., "Initiation of Neuropathic Pain Requires Lysophosphatidic Acid Receptor Signaling," Nature Medicine, 2004, 10 (7), 712-718 and Erratum.

Kerins, F. et al., "Generation of Substituted Styrenes via Suzuki Cross-Coupling of Aryl Halides with 2,4,6-Trivinylcyclotriboroxane," Journal of Organic Chemistry, 2002, 67, 4968-4971.

Kocienski, P., Protecting Groups, George Thieme Verlag Stuttgart, New York, 1994.

Komachi, M. et al., "Orally Active Lysophosphatidic Acid Receptor Antagonist Attenuates Pancreatic Cancer Invasion and Metastasis In Vivo," Cancer Science, 2012, 103 (6), 1099-1104.

Kropp, B. et al., "Characterization of Cultured Bladder Smooth Muscle Cells: Assessment of In Vitro Contractility," The Journal of Urology, 1999, 162, 1779-1784.

Kuner, R., "Central Mechanisms of Pathological Pain," Nature Medicine, 2010, 16 (11), 1258-1266.

Li, H. et al., "Blocking Lysophosphatidic Acid Receptor 1 Signaling Inhibits Diabetic Nephropathy in db/db Mice," Kidney International, 2017, 91, 1362-1373.

Lin, S et al., "Lysophosphatidic Acid Receptor 1 is Important for Intestinal Epithelial Barrier Function and Susceptibility to Colitis," The American Journal of Pathology, Accepted Manuscript, 2017, doi: 10.1016/j.ajpath.2017.10.006, 40 pages.

Liu, Y. et al. "Highly Controlling Selectivity of Copper(I)-catalyzed Azide/Alkyne Cycloaddition (CuAAC) between Sulfonyl Azids and Normal Alkynes or Propynoates," Tetrahedron, 2011, 67, 6294-6299.

Matsushita, H. et al., "Palladium-Catalyzed Reactions of Allylic Electrophiles with Organometallic Reagents. A Regioselective 1,4-Elimination and a Regio- and Stereoselective Reduction of Allylic Derivatives," Journal of Organic Chemistry, 1982, 47 (21), 4161-4165.

Möbus, K. et al., "Hydrogenation of Aromatic Nitrogroups with Precious Metal Powder Catalysts: Influence of Modifier on Selectivity and Activity," Topics in Catalysis, 2010, 53, 1126-1131.

Montalbetti, C. et al., "Amide Bond Formation and Peptide Coupling," Tetrahedron, 2005, 61, 10827-10852.

Moolenaar, W. et al., "The Ins and Outs of Lysophosphatidic Acid Signaling," BioEssays, 2004, 26, 870-881.

Nagai, J. et al., "Autotaxin and Lysophosphatidic Acid$_1$ Receptor-mediated Demyelination of Dorsal Root Fibers by Sciatic Nerve Injury and Intrathecal Lysophosphatidylcholine," Molecular Pain, 2010, 6:78, 11 pages, doi: 10.1186/1744-8069-6-78.

Onorato, J. et al., "Challenges in Accurate Quantitation of Lysophosphatidic Acids in Human Biofluids," Journal of Lipid Research, 2014, 55, 1784-1796.

Pradère, J-P. et al., "LPA$_1$ Receptor Activation Promotes Renal Interstitial Fibrosis," Journal of the American Society of Nephrology, 2007, 18, 3110-3118.

Rancoule, C. et al., "Lysophosphatidic Acid-1-receptor Targeting Agents for Fibrosis," Expert Opinion on Investigational Drugs, 2011, 20 (5), 657-667.

Remington, The Science and Practice of Pharmacy, 21st Edition, 2005, Part 5, "Pharmaceutical Manufacturing," published by Lippincott Williams & Wilkins.

Rockey, D. et al., "Fibrosis—A Common Pathway to Organ Injury and Failure," New England Journal of Medicine, 2015, 372 (12), 1138-1149.

Sakamoto, K. et al., "Effect of ASP6432, a Novel Type 1 Lysophosphatidic Acid Receptor Antagonist, on Urethral Function and Prostate Cell Proliferation" The Journal of Pharmacology and Experimental Therapeutics, 2018, 366, 390-396.

Simon, M. et al., "Lysophosphatidic Acid Inhibits Adipocyte Differentiation via Lysophosphatidic Acid 1 Receptor-dependent Down-regulation of Peroxisome Proliferator-activated Receptor γ2*," The Journal of Biological Chemistry, 2005, 280 (15), 14656-14662.

Sperry, J. et al., "A Safe and Practical Procedure for the Difluoromethylation of Methyl 4-Hydroxy-3-iodobenzoate," Organic Process Research & Development, 2011, 15, 721-725.

Stahl, P. et al., Eds., Handbook of Pharmaceutical Salts. Properties, Selection and Use, Wiley-VCH, 2008.

Stepan, A. et al., "Application of the Bicyclo[1.1.1]pentane Motif as a Nonclassical Phenyl Ring Bioisostere in the Design of a Potent and Orally Active γ-Secretase Inhibitor," Journal of Medicinal Chemistry, 2012, 55 (7), 3414-3424.

(56) References Cited

OTHER PUBLICATIONS

Stoddard, N. et al., "Promising Pharmacological Directions in the World of Lysophosphatidic Acid Signaling," Biomolecules & Therapeutics, 2015, 23 (1), 1-11.
Tager, A. et al., "The Lysophosphatidic Acid Receptor $LPA_1$ Links Pulmonary Fibrosis to Lung Injury by Mediating Fibroblast Recruitment and Vascular Leak," Nature Medicine, 2008, 14, 45-54.
Thomoson, C. et al., "Use of Fluoroform as a Source of Difluorocarbene in the Synthesis of N-CF2H Heterocycles and Difluoromethoxypyridines," Journal of Fluorine Chemistry, 2014, 168, 34-39.
Valeur, E. et al., "Amide Bond Formation: Beyond the Myth of Coupling Reagents," Chemical Society Reviews, 2009, 38, 606-631.
Van Leeuwen, F. et al., "Lysophosphatidic Acid: Mitogen and Motility Factor," Biochemical Society Transactions, 2003, 31 (6), 1209-1212.
Watanabe, N. et al., "Both Plasma Lysophosphatidic Acid and Serum Autotaxin Levels are Increased in Chronic Hepatitis C," Journal of Clinical Gastroenterology, 2007, 41 (6), 616-623.
Watanabe, N. et al., "Plasma Lysophosphatidic Acid Level and Serum Autotaxin Activity are Increased in Liver Injury in Rats in Relation to Its Severity," Life Sciences, 2007, 81, 1009-1015.
Wouters, J. et al., Eds., Pharmaceutical Salts and Co-crystals, RSC Publishing, 2012.
Yamada, T. et al., "Lysophosphatidic Acid Stimulates the Proliferation and Motility of Malignant Pleural Mesothelioma Cells Through Lysophosphatidic Acid Receptors, $LPA_1$ and $LPA_2$," Cancer Science, 2008, 99 (8), 1603-1610.
Yang, C. et al., "The Role of Lysophosphatidic Acid Receptor ($LPA_1$) in the Oxygen-Induced Retinal Ganglion Cell Degeneration," Investigative Ophthalmology & Visual Science, 2009, 50 (3), 1290-1298.
Zeng, Y. et al., "Gene expression Profiles of Lysophosphatidic Acid-Related Molecules in the Prostate: Relevance to Prostate Cancer and Benign Hyperplasia," The Prostate, 2009, 69, 283-292.
Zhao, Y. et al., "Lysophosphatidic Acid (LPA) and Its Receptors: Role in Airway Inflammation and Remodeling," Biochimica et Biophysica Acta, 2013, 1831, 86-92.
Pending Claims for U.S. Appl. No. 16/972,878, filed Nov. 14, 2024, 22 pages.
U.S. Appl. No. 17/782,530, filed Jun. 3, 2022 (371(c) Date), Birker et al.

PYRIDIN-3-YL DERIVATIVES

CROSS REFERENCE TO RELATED APPLICATIONS

This application is the National Stage Entry under 35 U.S.C. § 371 of International Application No. PCT/EP2020/066767 filed Jun. 17, 2020, which claims priority to International Application No. PCT/EP2019/065963 filed Jun. 18, 2019, the contents of each of which are hereby incorporated by reference in their entireties.

The present invention relates to $LPA_1$ receptor antagonists of Formula (I) and their use as active ingredients in the preparation of pharmaceutical compositions. The invention also concerns related aspects including processes for the preparation of the compounds, pharmaceutical compositions containing a compound of the Formula (I), and their use as medicaments inhibiting fibrotic processes or other disorders in which $LPA_1$ receptors play a role, either alone or in combination with other active compounds or therapies.

Lysophospholipids are membrane-derived bioactive lipid mediators, of which one of the most medically important is lysophosphatidic acid (LPA). LPA is not a single molecular entity but a collection of endogenous structural variants with fatty acids of varied lengths and degrees of saturation (Fujiwara et al., J. Biol. Chem. 2005, 280, 35038-35050). The structural backbone of the LPAs is derived from glycerol-based phospholipids such as phosphatidylcholine (PC) or phosphatidic acid (PA). The LPAs are bioactive lipids (signaling lipids) that regulate various cellular signaling pathways by binding to the same class of 7-transmembrane domain G protein-coupled (GPCR) receptors (Chun, J., Hla, T., Spiegel, S., Moolenaar, W., Editors, Lysophospholipid Receptors: Signaling and Biochemistry, 2013, Wiley; ISBN: 978-0-470-56905-4; Zhao, Y. et al, Biochim. Biophys. Acta (BBA)-Mol. Cell Biol. Of Lipids, 2013, 1831, 86-92). The currently known LPA receptors are designated as $LPA_1$, $LPA_2$, $LPA_3$, $LPA_4$, $LPA_5$ and $LPA_6$ (Choi, J. W., Annu. Rev. Pharmacol. Toxicol. 2010, 50, 157-186). The nucleotide sequence and the amino acid sequence for the human $LPA_1$ receptor is known in the art and are published (Hecht et al 1996 J. Cell. Biol. 135:1071-83, An et al 1997 Biochem. Biophys. Res. Comm. 231:619-622).

The LPAs have long been known as precursors of phospholipid biosynthesis in both eukaryotic and prokaryotic cells, but the LPAs have emerged only recently as signaling molecules that are rapidly produced and released by activated cells, notably platelets, to influence target cells by acting on specific cell-surface receptors (see, e.g., Moolenaar et al., BioEssays, 2004, 26, 870-881, and van Leewen et al, Biochem. Soc. Trans., 2003, 31, 1209-1212). Besides being synthesized and processed to more complex phospholipids in the endoplasmic reticulum, LPAs can be generated through the hydrolysis of pre-existing phospholipids following cell activation; for example, the sn-2 position is commonly missing a fatty acid residue due to deacylation, leaving only the sn-1 hydroxyl esterified to a fatty acid. Moreover, a key enzyme in the production of LPA, autotaxin (lysoPLD/NPP2), may be the product of an oncogene, as many tumor types up-regulate autotaxin (Brindley, D., J. Cell Biochem. 2004, 92, 900-12). The concentrations of LPAs in human plasma & serum as well as human bronchoalveolar lavage fluid (BALF) have been reported, including determinations made using sensitive and specific LC/MS & LC/MS/MS procedures (Baker et al., Anal. Biochem. 2001, 292, 287-295; Onorato et al., J. Lipid Res., 2014, 55, 1784-1796).

LPA influences a wide range of biological responses, ranging from induction of cell proliferation, stimulation of cell migration and neurite retraction, gap junction closure, and even slime mold chemotaxis (Goetzl, et al, Scientific World J., 2002, 2, 324-338; Chun, J., Hla, T., Spiegel, S., Moolenaar, W., Editors, Lysophospholipid Receptors: Signaling and Biochemistry, 2013, Wiley; ISBN; 978-0-470-56905-4). The body of knowledge about the biology of LPA continues to grow as more and more cellular systems are tested for LPA responsiveness. For instance, it is now known that, in addition to stimulating cell growth and proliferation, LPAs promote cellular tension and cell-surface fibronectin binding, which are important events in wound repair and regeneration (Moolenaar et al., BioEssays, 2004, 26, 870-881). Recently, anti-apoptotic activity has also been ascribed to LPA, and it has recently been reported that PPARy is a receptor/target for LPA (Simon et al., J. Biol. Chem., 2005, 280, 14656-14662).

Fibrosis is the result of an uncontrolled tissue healing process leading to excessive accumulation and insufficient resorption of extracellular matrix (ECM) which ultimately results in end-organ failure (Rockey et al., New Engl. J. Med., 2015, 372, 1138-1149). Recently it was reported that the $LPA_1$ receptor was over-expressed in idiopathic pulmonary fibrosis (IPF) patients. $LPA_1$ receptor knockout mice were also protected from bleomycin-induced lung fibrosis (Tager et al., Nature Med., 2008, 14, 45-54). Thus, antagonizing the $LPA_1$ receptor may be useful for the treatment of fibrosis (Stoddard et al., Biomol. Ther., 2015, 23 (1), 1-11; Rancoule et al., Expert. Opin. Inv. Drug 2011, 20 (85), 657-667; Yang et al., IOVS 2009, 50 (3) 1290-1298; Pradère et al., J. Am. Soc. Nephro. 2007, 18, 3110-3118; Abu El-Asrar et al., Acta Ophthalmol. 2012, 90, e84-e89) such as pulmonary fibrosis, hepatic fibrosis, renal fibrosis, arterial fibrosis and systemic sclerosis, and thus the diseases that result from fibrosis (pulmonary fibrosis-Idiopathic Pulmonary Fibrosis [IPF], hepatic fibrosis-Non-alcoholic Steatohepatitis [NASH], renal fibrosis-diabetic nephropathy, systemic sclerosis-scleroderma) (Castellino et al., Arthritis Rheum. 2011, 63 (5), 1405-1415).

Corticosteroids in combination with immunosuppressant drugs, cytostatic drugs and antioxidants are used in the treatment of IPF. Corticosteroids may cause side effects when used in long term treatment. Pirfenidone is approved for treatment of IPF but the therapeutic mechanism of action is not known and also, side effects are associated with the use of pirfenidone. Therefore, orally active compounds which specifically target the fibrotic processes with reduced side effects would significantly improve current treatments of uncontrolled fibrotic diseases.

The use of $LPA_1$ receptor antagonists is not limited to fibrosis, and can apply to other disorders where $LPA/LPA_1$ receptor axis plays a role in the pathology; such as pain including acute pain, chronic pain, and neuropathic pain (Inoue et al, Nat. Med. 2004, 10 (7) 712-718; Kuner, Nat. Med. 2010, 16 (11), 1258-1266) including fibromyalgia stemming from the formation of fibrous scar tissue in contractile (voluntary) muscles, wherein fibrosis binds the tissue and inhibits blood flow, resulting in pain, and cancer pain; malignant and benign proliferative diseases including cancer (Stoddard et al., Biomol. Ther., 2015, 23 (1), 1-11; Komachi et al., Cancer Sci. 2012, 103 (6), 1099-1104; Zeng et al., The Prostate 2009, 69, 283-292), and the control of proliferation of tumor cells, invasion and metastasis of carcinomas, pleural mesothelioma (Yamada, Cancer Sci., 2008, 99 (8), 1603-1610), peritoneal mesothelioma, or bone metastases (Boucharaba et al, J. Clin. Invest., 2004, 1

14(12), 1714-1725; Boucharaba et al, Proc. Natl. acad. Sci., 2006, 103(25) 9643-9648); inflammation (Li et al., Kidney International 2017, 91(6), 1362-1373; Lin et al., Am. J. Pathol. 2018, 188 (2), 353-366; Watanabe et al., J. Clin. Gastroenterol. 2007, 41 (6), 616-623; Watanabe et al., Life Sciences 2007, 81, 1009-1015); nervous system disorders (Stoddard et al., Biomol. Ther., 2015, 23 (1), 1-11; Choi et al., Biochim. Biophys. Acta 2013, 1831, 20-32; Nagai et al., Molecular Pain 2010, 6, 78); and respiratory diseases including allergic respiratory diseases, and hypoxia (Georas et al., Clin. Exp. Allergy 2007, 37 (3), 311-322). LPA has been shown to have contracting action on bladder smooth muscle cell isolated from bladder, and promotes growth of prostate-derived epithelial cell (B. P. Kropp et al., J. Urology, 1999, 162, 1779-1784; C. Guo et al., J. Urology, 2000, 163, 1027-1032) and stromal cells (Sakamoto et al., J. Pharmacol. Exp. Ther. 2018, 366, 390-396). LPA further has been shown to contract the urinary tract and prostate in vitro and increases intraurethral pressure in vivo (WO 02/062389). LPA has further been linked to obesity and insulin resistance (K. D'Souza et al., Nutrients 2018, 10, 399).

WO2013/096771 discloses a broad generic scope of TGR5 agonists, claimed to be active in the treatment of diabetes. US2007/0078120 (WO2005/037269) discloses a broad generic scope of piperidine derivatives claimed to be useful to lower the blood concentration of LDL cholesterol. WO2003/088908 discloses a broad generic scope of potassium channel inhibitors exemplifying some piperidine derivatives which, however, are different from the present compounds by at least the absence of present mandatory substituent $R^3$. WO2012/078805, and WO2009/135590 disclose structurally remote compounds that act as antagonists of the $LPA_1$ receptor and are claimed to show certain anti-fibrotic effects.

The present invention provides novel compounds of Formula (I) that are antagonists for the G protein-coupled receptor $LPA_1$ and may have a potent and long-lasting anti-fibrotic effect which may be mediated by inhibiting vascular leakage, inhibiting the conversion of fibroblasts to myofibroblasts, and/or inhibiting the subsequent release of pro-fibrotic cytokines by myofibroblasts. The present compounds may thus be useful to treat e.g. uncontrolled fibrotic diseases and other disease and disorders related to $LPA_1$ signalling.

1) A first aspect of the invention relates to compounds of the Formula (I),

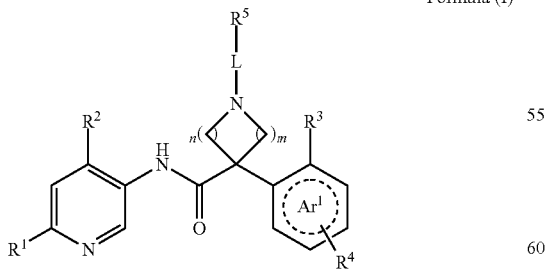

Formula (I)

wherein
- $R^1$ is hydrogen, halogen (especially chloro), methyl, or trifluoromethyl;
- $R^2$ is $C_{1-3}$-alkoxy (especially methoxy), cyclopropyloxy or methoxy-$C_{2-3}$-alkoxy; or
- $Ar^1$ represents phenyl, or 6-membered heteroaryl containing one or two nitrogen atoms (especially pyridinyl); (notably, $Ar^1$ represents phenyl), wherein said group $Ar^1$ is substituted with $R^3$ and $R^4$, wherein
  - $R^3$ is n-propyl, isopropyl, or $C_{3-6}$-cycloalkyl; [wherein it is understood that said substituent $R^3$ is attached in ortho-position with regard to the point of the attachment of the rest of the molecule] and
  - $R^4$ represents one substituent independently selected from hydrogen, fluoro, methyl and methoxy [in particular, $R^4$ represents hydrogen or fluoro; especially hydrogen];
- m and n independently represent the integer 1 or 2 (especially both m and n represent the integer 1); and
- the group -L-$R^5$ represents
  - hydrogen;
  - —$C_{1-4}$-alkyl;
  - —$C_{0-6}$-alkylene-$C_{3-6}$-cycloalkyl; wherein the $C_{3-6}$-cycloalkyl independently is unsubstituted or mono-substituted with halogen (especially fluoro);
  - —CO—H;
  - -$L^1$—CO—$R^{C11}$ wherein $R^{C11}$ independently represents hydroxy; —O-benzyl; —O—$C_{1-6}$-alkyl; $C_1$-fluoroalkyl; or —$NR^{N11}R^{N12}$; wherein independently $R^{N11}$ is hydrogen or $C_{1-4}$-alkyl, and $R^{N12}$ is hydrogen, $C_{1-4}$-alkyl, —$SO_2$—$C_{1-6}$-alkyl, or —O—$R^{O11}$, wherein $R^{O11}$ independently represents hydrogen, $C_{1-6}$-alkyl, or benzyl; and -$L^1$- independently represents
    - —$C_{1-6}$-alkylene-, —CO—$C_{1-6}$-alkylene-, —$SO_2$—$C_{1-6}$-alkylene-, —CO—O—$C_{1-6}$-alkylene-, —CO—NH—$C_{1-6}$-alkylene-, or —$SO_2$—NH—$C_{1-6}$-alkylene-;
    - —$C_{1-6}$-alkylene-, —CO—$C_{1-6}$-alkylene-, or —$SO_2$—$C_{1-6}$-alkylene-; wherein in the above groups said $C_{1-6}$-alkylene independently is mono-substituted with hydroxy, $C_{1-3}$-alkoxy, —O—CO—$C_{1-4}$-alkyl, or —$NR^{N13}R^{N14}$; wherein independently $R^{N13}$ is hydrogen or $C_{1-4}$-alkyl, and $R^{N14}$ is hydrogen, $C_{1-4}$-alkyl or —CO—O—$C_{1-4}$-alkyl;
    - —$C_{2-6}$-alkylene-, —CO—$C_{2-6}$-alkylene-, or —$SO_2$—$C_{2-6}$-alkylene-; wherein in the above groups said $C_{2-6}$-alkylene independently is di-substituted wherein the substituents are independently selected from hydroxy and —$NR^{N15}R^{N16}$; wherein independently $R^{N15}$ is hydrogen or $C_{1-4}$-alkyl, and $R^{N16}$ is hydrogen, $C_{1-4}$-alkyl or —CO—O—$C_{1-4}$-alkyl;
    - —$C_{0-4}$-alkylene-$C_{3-8}$-cycloalkylene-$C_{0-4}$-alkylene-, —CO—$C_{0-4}$-alkylene-$C_{3-8}$-cycloalkylene-$C_{0-4}$-alkylene-, —$SO_2$—$C_{0-4}$-alkylene-$C_{3-8}$-cycloalkylene-$C_{0-4}$-alkylene-, —CO—NH—$C_{0-4}$-alkylene-$C_{3-8}$-cycloalkylene-$C_{0-4}$-alkylene-, or —CO—O—$C_{0-4}$-alkylene-$C_{3-8}$-cycloalkylene-$C_{0-4}$-alkylene-;
    - —$C_{0-4}$-alkylene-$Cy^1$-$C_{0-4}$-alkylene-, —CO—$C_{0-4}$-alkylene-$Cy^1$-$C_{0-4}$-alkylene-, —CO—O—$C_{0-4}$-alkylene-$Cy^1$-$C_{0-4}$-alkylene-, —CO—NH—$C_{0-4}$-alkylene-$Cy^1$-$C_{0-4}$-alkylene-, —$SO_2$—$C_{0-4}$-alkylene-$Cy^1$-$C_{0-4}$-alkylene-, or —$SO_2$—NH—$C_{0-4}$-alkylene-$Cy^1$-$C_{0-4}$-alkylene-; wherein $Cy^1$ independently represents a $C_{3-6}$-heterocycloalkylene containing one ring oxygen atom, or one ring nitrogen atom, wherein said ring nitrogen, in case it has a free valency, independently is unsubstituted, or mono-substituted with $C_{1-4}$-alkyl or —CO—O—$C_{1-4}$-alkyl;

—$C_{2-4}$-alkylene-O—$C_{2-4}$-alkylene-O—$C_{1-4}$-alkylene-, or —CO—$C_{1-4}$-alkylene-O—$C_{2-4}$-alkylene-O—$C_{1-4}$-alkylene-;

—$C_{2-4}$-alkylene-$X^{11}$—$C_{1-4}$-alkylene-, —CO—O—$C_{2-4}$-alkylene-$X^{11}$—$C_{1-4}$-alkylene-, —CO—NH—$C_{2-4}$-alkylene-$X^{11}$—$C_{1-4}$-alkylene-, or —$SO_2$—NH—$C_{2-4}$-alkylene-$X^{11}$—$C_{1-4}$-alkylene-; wherein $X^{11}$ independently represents oxygen, or a nitrogen atom which is independently unsubstituted, or mono-substituted with $C_{1-4}$-alkyl, $C_{3-6}$-cycloalkyl, or —CO—O—$C_{1-4}$-alkyl;

—CO—$C_{1-4}$-alkylene-$X^{12}$—$C_{1-4}$-alkylene-, —$SO_2$—$C_{1-4}$-alkylene-$X^{12}$—$C_{1-4}$-alkylene-, or —CO—$C_{1-4}$-alkylene-$X^{12}$—$C_{0-4}$-alkylene-$C_{3-6}$-cycloalkylene-$C_{0-4}$-alkylene-; wherein $X^{12}$ independently represents oxygen, or a nitrogen atom which is independently unsubstituted, or mono-substituted with $C_{1-4}$-alkyl, $C_{3-6}$-cycloalkyl, —CO—O—$C_{1-4}$-alkyl, or $C_{1-3}$-alkoxy-$C_{2-4}$-alkyl;

—$C_{2-4}$-alkylene-$X^{13}$—$C_{1-4}$-alkylene-; wherein $X^{13}$ represents —NH—CO—, and wherein said $C_{2-4}$-alkylene independently is unsubstituted, or mono-substituted with hydroxy;

—$C_{1-4}$-alkylene-$X^{14}$—$C_{1-4}$-alkylene-; wherein $X^{14}$ represents —CO—NH—;

—CO—$C_{2-6}$-alkenylene- or —$SO_2$—$C_{2-6}$-alkenylene-; or

—CO—$C_{2-6}$-fluoroalkylene-;

-$L^2$-hydroxy; wherein -$L^2$- represents
- —CO—$C_{1-6}$-alkylene- or —$SO_2$—$C_{1-6}$-alkylene-; wherein in the above groups said $C_{1-6}$-alkylene independently is unsubstituted, or mono-substituted with hydroxy, $C_1$-fluoroalkyl, or —$NR^{N21}R^{N22}$ wherein independently $R^{N21}$ is hydrogen or $C_{1-4}$-alkyl, and $R^{N22}$ is hydrogen, $C_{1-4}$-alkyl or —CO—O—$C_{1-4}$-alkyl;
- —$C_{2-6}$-alkylene-, —CO—O—$C_{2-6}$-alkylene-, —CO—NH—$C_{2-6}$-alkylene-, or —$SO_2$—NH—$C_{2-6}$-alkylene-, wherein in the above groups said $C_{2-6}$-alkylene independently is unsubstituted, or mono-substituted with hydroxy, $C_1$-fluoroalkyl, or —$NR^{N23}R^{N24}$ wherein independently $R^{N23}$ is hydrogen or $C_{1-4}$-alkyl, and $R^{N24}$ is hydrogen, $C_{1-4}$-alkyl or —CO—O—$C_{1-4}$-alkyl;
- —$C_{0-4}$-alkylene-$C_{3-6}$-cycloalkylene-$C_{0-4}$-alkylene-, —CO—$C_{0-4}$-alkylene-$C_{3-6}$-cycloalkylene-$C_{0-4}$-alkylene-, or —$SO_2$—$C_{0-4}$-alkylene-$C_{3-6}$-cycloalkylene-$C_{0-4}$-alkylene-;
- —$C_{0-4}$-alkylene-$Cy^2$-$C_{0-4}$-alkylene-, —CO—$C_{0-4}$-alkylene-$Cy^2$-$C_{0-4}$-alkylene-, or —$SO_2$—$C_{0-4}$-alkylene-$Cy^2$-$C_{0-4}$-alkylene-; wherein $Cy^2$ independently represents a $C_{3-6}$-heterocycloalkylene group containing one ring oxygen atom, or one ring nitrogen atom; wherein said ring nitrogen, in case it has a free valency, is independently unsubstituted, or mono-substituted with $C_{1-4}$-alkyl or —CO—O—$C_{1-4}$-alkyl;
- —$C_{2-4}$-alkylene-(O—$C_{2-4}$-alkylene)$_p$- or —CO—$C_{1-4}$-alkylene-(O—$C_{2-4}$-alkylene)$_p$-; wherein p independently represents the integer 1 or 2;
- —$C_{2-4}$-alkylene-$X^{21}$—$C_{2-4}$-alkylene-; wherein $X^{21}$ represents a nitrogen atom which is unsubstituted, or mono-substituted with $C_{1-4}$-alkyl, $C_{3-6}$-cycloalkyl, or —CO—O—$C_{1-4}$-alkyl;
- —CO—$C_{1-4}$-alkylene-$X^{22}$—$C_{2-4}$-alkylene-, —CO—$C_{1-4}$-alkylene-$X^{22}$—$C_{1-4}$-alkylene-$C_{3-6}$-cycloalkylene-, or —$SO_2$—$C_{1-4}$-alkylene-$X^{22}$—$C_{2-4}$-alkylene-; wherein $X^{22}$ represents a nitrogen atom which is independently unsubstituted, or mono-substituted with $C_{1-4}$-alkyl, $C_{3-6}$-cycloalkyl, or —CO—O—$C_{1-4}$-alkyl;
- —$C_{2-4}$-alkylene-$X^{23}$—$C_{1-4}$-alkylene-; wherein $X^{23}$ represents —NH—CO—, and wherein said $C_{2-4}$-alkylene independently is unsubstituted, or mono-substituted with hydroxy;
- —$C_{1-4}$-alkylene-$X^{24}$—$C_{2-4}$-alkylene-; wherein $X^{24}$ represents —CO—NH—, and wherein said $C_{2-4}$-alkylene independently is unsubstituted, or mono-substituted with hydroxy; or
- 3,4-dioxocyclobut-1-ene-1,2-diyl;

-$L^3$-O—$R^{O31}$ wherein $R^{O31}$ is —$C_{1-4}$-alkyl, —CO—$C_{1-4}$-alkyl or —CO—$C_{2-4}$-alkenyl; and -$L^3$- independently represents
- —$C_{2-6}$-alkylene-, —CO—$C_{1-6}$-alkylene- or —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-;

-$L^4$-$NR^{N1}R^{N2}$ wherein independently $R^{N1}$ is hydrogen or $C_{1-4}$-alkyl; and $R^{N2}$ is hydrogen; $C_{1-4}$-alkyl; $C_{1-3}$-fluoroalkyl; $C_{3-6}$-cycloalkyl; $C_{1-3}$-alkoxy-$C_{2-4}$-alkylene; —CO—$C_{1-4}$-alkyl; —$SO_2$—$C_{1-4}$-alkyl; or —$SO_2$—$C_1$-fluoroalkyl; and -$L^4$- independently represents
- —$C_{2-6}$-alkylene-, —CO—$C_{1-6}$-alkylene-, —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-; or
- —$C_{0-4}$-alkylene-$Cy^4$-$C_{0-4}$-alkylene-, —CO—$C_{0-4}$-alkylene-$Cy^4$-$C_{0-4}$-alkylene-, or —$SO_2$—$C_{0-4}$-alkylene-$Cy^4$-$C_{0-4}$-alkylene-; wherein $Cy^4$ independently represents a $C_{3-6}$-heterocycloalkylene group containing one ring oxygen atom;

-$L^5$-$NR^{N3}R^{N4}$ wherein $R^{N3}$ is hydrogen, $C_{1-4}$-alkyl, or $C_{1-3}$-alkoxy-$C_{2-4}$-alkylene; and $R^{N4}$ is —CO—O—$C_{1-4}$-alkyl; —CO—$NR^{N51}R^{N52}$ wherein $R^{N51}$ and $R^{N52}$ are independently selected from hydrogen and $C_{1-4}$-alkyl; or —$SO_2$—$NR^{N53}R^{N54}$ wherein independently $R^{N53}$ is hydrogen or $C_{1-4}$-alkyl, and $R^{N54}$ is hydrogen, $C_{1-4}$-alkyl, or —CO—$C_{1-4}$-alkyl;

and -$L^5$- independently represents
- —$C_{2-6}$-alkylene-, —CO—$C_{1-6}$-alkylene- or —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-;

-$L^6$-N($R^{N61}$)—O—$R^{O61}$ wherein $R^{N61}$ is hydrogen, —CO—$C_{1-4}$-alkyl, or —CO—O—$C_{1-4}$-alkyl; and $R^{O61}$ independently represents hydrogen, $C_{1-6}$-alkyl, or benzyl;

and -$L^6$- independently represents
- —$C_{2-6}$-alkylene-, —CO—$C_{1-6}$-alkylene-, —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-;

-$L^7$-$NR^{N5}R^{N6}$ wherein $R^{N5}$ is hydrogen or $C_{1-4}$-alkyl (especially hydrogen); $R^{N6}$ is hydrogen, $C_{1-4}$-alkyl, —CO—$C_{1-4}$-alkyl, $C_{1-3}$-fluoroalkyl, or $C_{3-6}$-cycloalkyl (especially hydrogen); and -$L^7$- independently represents
- —CO—, or —$SO_2$—;

-$L^8$—$SO_2$—$R^{S81}$ wherein $R^{S81}$ independently represents —$C_{1-6}$-alkyl; $C_1$-fluoroalkyl; hydroxy; —$NR^{N81}R^{N82}$ wherein independently $R^{N81}$ is hydrogen or $C_{1-4}$-alkyl, and $R^{N82}$ is hydrogen, $C_{1-4}$-alkyl, —CO—$C_{1-6}$-alkyl; and -$L^8$- independently represents
—$C_{1-6}$-alkylene-, —CO—$C_{1-6}$-alkylene-, —$SO_2$—$C_{1-6}$-alkylene-, —CO—O—$C_{2-6}$-alkylene-, —CO—NH—$C_{1-6}$-alkylene-, or —$SO_2$—NH—$C_{1-6}$-alkylene-;

-$L^9$-$HET^1$, wherein $HET^1$ represents 5- or 6-membered heteroaryl (especially pyrrolyl, pyrazolyl, imidazolyl, triazolyl, tetrazolyl, furanyl, oxazolyl, isoxazolyl; thiazolyl, isothiazolyl, oxadiazolyl, thiadiazolyl, pyridinyl, pyrimidinyl, pyridazinyl, pyrazinyl), wherein said $HET^1$ independently is unsubstituted or mono-, or di-substituted wherein the substituents are independently selected from $C_{1-4}$-alkyl (especially methyl); halogen; cyano; hydroxy; hydroxymethyl; —$C_{0-2}$-alkylene-$Cy^{91}$—$COOR^{O91}$ wherein $R^{O91}$ is hydrogen or $C_{1-4}$-alkyl, and wherein $Cy^{91}$ represents a $C_{3-6}$-cycloalkylene group; or —$C_{0-2}$-alkylene-CO—$OR^{O92}$ wherein $R^{O92}$ is hydrogen or $C_{1-4}$-alkyl; and -$L^9$- independently represents
—$C_{0-6}$-alkylene-, —CO—$C_{0-6}$-alkylene-, —$SO_2$—$C_{0-6}$-alkylene-, —CO—O—$C_{1-6}$-alkylene-, —CO—NH—$C_{1-6}$-alkylene-, or —$SO_2$—NH—$C_{1-6}$-alkylene-;

-$L^{10}$-$C_{4-6}$-heterocyclyl, wherein the $C_{4-6}$-heterocyclyl independently contains one or two ring heteroatoms independently selected from nitrogen, sulfur and oxygen; wherein in the above groups said $C_{4-6}$-heterocyclyl independently is unsubstituted, or mono-, di-, or tri-substituted wherein the substituents are independently selected from:
  one or two oxo substituents each attached to a ring carbon atom in alpha position to a ring nitrogen atom (thus forming together with the nitrogen an amide group, or, in case a ring oxygen is additionally adjacent, a carbamate group, or, in case second ring nitrogen is additionally adjacent, a urea group); and/or
  two methyl substituents attached to a ring carbon atom in alpha position to a ring nitrogen atom or a ring oxygen atom (thus forming together with the nitrogen a —$C(CH_3)_2$—N— or with the oxygen a —$C(CH_3)_2$—O-group); and/or
  two oxo substituents at a ring sulfur ring atom (thus forming a —$SO_2$— group); and/or
  $C_{1-4}$-alkyl, $C_{1-3}$-alkoxy-$C_{2-4}$-alkyl, $C_{2-3}$-fluoroalkyl, or —CO—$C_{1-4}$-alkyl attached to a ring nitrogen atom having a free valency; and -$L^{10}$- independently represents
—$C_{0-6}$-alkylene-, —CO—$C_{0-6}$-alkylene-, —$SO_2$—$C_{0-6}$-alkylene-, —CO—O—$C_{1-6}$-alkylene-, —CO—NH—$C_{1-6}$-alkylene-, or —$SO_2$—NH—$C_{1-6}$-alkylene-;

-$L^{11}$-cyano; wherein -$L^{11}$- represents —CO—$C_{1-6}$-alkylene-, —$SO_2$—$C_{1-6}$-alkylene, or —$C_{0-6}$-alkylene-;

-$L^{12}$-$NO_2$; wherein -$L^{12}$- represents —$C_{2-6}$-alkylene-; or

-$L^{13}$-$C_{1-4}$-alkyl; wherein -$L^{13}$- represents —CO—, —CO—O—, or —$SO_2$—.

In a sub-embodiment, the present invention especially relates to compounds of Formula (I) as defined in embodiment 1), wherein the linker L in the group -L-$R^5$ is as defined hereinbefore (or, mutatis mutandis, in any one of embodiments below) wherein the length of such linker L (i.e. each of the particular linker groups -$L^1$-, -$L^2$-, -$L^3$-, -$L^4$-, -$L^5$-, -$L^6$-, -$L^7$-, -$L^8$-, -$L^9$-, -$L^{10}$-, -$L^{11}$-, -$L^{12}$-, and -$L^{13}$-) is such that the group $R^5$ is distanced from the nitrogen atom to which L is attached by at maximum 9 atoms (preferably it is distanced by at maximum 5 atoms).

It is understood that the linker groups in group -L-$R^5$ (such as -$L^1$-, -$L^2$-, -$L^3$-, -$L^4$-, -$L^5$-, -$L^6$-, -$L^7$-, -$L^8$-, -$L^9$-, -$L^{10}$-, -$L^{11}$-, -$L^{12}$-, and -$L^{13}$-) are to be read from left to right: for example a linker group —CO—$C_{0-6}$-alkylene- is attached to the rest of the molecule on the —CO— group part of said linker.

The compounds of Formula (I) may contain one or more stereogenic or asymmetric centers, such as one or more asymmetric carbon atoms, which are allowed to be present in (R)- as well as (S)-configuration. The compounds of Formula (I) may further encompass compounds with one or more double bonds which are allowed to be present in Z- as well as E-configuration and/or compounds with substituents at a ring system which are allowed to be present, relative to each other, in cis- as well as trans-configuration. The compounds of of Formula (I) may thus be present as mixtures of stereoisomers or preferably as pure stereoisomers. Mixtures of stereoisomers may be separated in a manner known to a person skilled in the art.

In case a particular compound (or generic structure) is designated as (R)- or (S)-enantiomer, such designation is to be understood as referring to the respective compound (or generic structure) in enriched, especially essentially pure, enantiomeric form. Likewise, in case a specific asymmetric center in a compound is designated as being in (R)- or (S)-configuration or as being in a certain relative configuration, such designation is to be understood as referring to the compound that is in enriched, especially essentially pure, form with regard to the respective configuration of said asymmetric center. In analogy, cis- or trans-designations are to be understood as referring to the respective stereoisomer of the respective relative configuration in enriched, especially essentially pure, form. Likewise, in case a particular compound (or generic structure) is designated as Z- or E-stereoisomer (or in case a specific double bond in a compound is designated as being in Z- or E-configuration), such designation is to be understood as referring to the respective compound (or generic structure) in enriched, especially essentially pure, stereoisomeric form (or to the compound that is in enriched, especially essentially pure, form with regard to the respective configuration of the double bond).

The term "enriched", when used in the context of stereoisomers, is to be understood in the context of the present invention to mean that the respective stereoisomer is present in a ratio of at least 70:30, especially of at least 90:10 (i.e., in a purity of at least 70% by weight, especially of at least 90% by weight), with regard to the respective other stereoisomer/the entirety of the respective other stereoisomers.

The term "essentially pure", when used in the context of stereoisomers, is to be understood in the context of the present invention to mean that the respective stereoisomer is present in a purity of at least 95% by weight, especially of at least 99% by weight, with regard to the respective other stereoisomer/the entirety of the respective other stereoisomers.

The present invention also includes isotopically labelled, especially $^2$H (deuterium) labelled compounds of Formula (I) according to embodiments 1) to 19), which compounds are identical to the compounds of Formula (I) except that one or more atoms have each been replaced by an atom having the same atomic number but an atomic mass different from the atomic mass usually found in nature. Isotopically labelled, especially $^2$H (deuterium) labelled compounds of Formula (I) and salts thereof are within the scope of the present invention. Substitution of hydrogen with the heavier isotope $^2$H (deuterium) may lead to greater metabolic stability, resulting e.g. in increased in-vivo half-life or reduced dosage requirements, or may lead to reduced inhibition of cytochrome P450 enzymes, resulting e.g. in an improved safety profile. In one embodiment of the invention, the compounds of Formula (I) are not isotopically labelled, or they are labelled only with one or more deuterium atoms. In a sub-embodiment, the compounds of Formula (I) are not isotopically labelled at all. Isotopically labelled compounds of Formula (I) may be prepared in analogy to the methods described hereinafter, but using the appropriate isotopic variation of suitable reagents or starting materials.

In this patent application, a bond drawn with a wavy line or with a dotted line shows the point of attachment of the radical drawn. For example, the radical

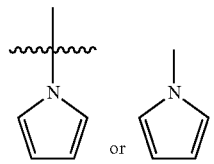

is a 1H-pyrrol-1-yl group.

Whenever a substituent $R^4$ is designated to be in a specific position of the phenyl moiety to which it is attached, it is understood that the point of attachment of the substituent $R^3$ is considered position 2 of said phenyl moiety.

In some instances, the compounds of Formula (I) may contain tautomeric forms. Such tautomeric forms are encompassed in the scope of the present invention. In case tautomeric forms exist of a certain residue, and only one form of such residue is disclosed or defined, the other tautomeric form(s) are understood to be encompassed in such disclosed residue. For example, the group 3-hydroxy-1H-pyrazol-4-yl is to be understood as also encompassing its tautomeric form 3-oxo-2,3-dihydro-1H-pyrazol-4-yl. Likewise, the group 3-hydroxy-1H-pyrazol-5-yl is to be understood as also encompassing its tautomeric form 3-oxo-2,3-dihydro-1H-pyrazol-5-yl; the group 3-hydroxy-1H-1,2,4-triazole-5-yl is to be understood as also encompassing its tautomeric forms 3-hydroxy-4H-1,2,4-triazol-5-yl, 3-hydroxy-3H-1,2,4-triazol-5-yl, as well as 3-oxo-2,5-dihydro-1H-1,2,4-triazol-5-yl and 3-oxo-4,5-dihydro-1H-1,2,4-triazol-5-yl; the group 3-hydroxyisoxazole-5-yl is to be understood as also encompassing its tautomeric form 3-oxo-2,3-dihydroisoxazole-5-yl; the group 5-hydroxy-[1,2,4]oxadiazol-3-yl is to be understood as also encompassing its tautomeric form 5-oxo-4,5-dihydro-[1,2,4]oxadiazol-3-yl and the group 5-hydroxy-[1,3,4]oxadiazol-2-yl is to be understood as also encompassing its tautomeric form 5-oxo-4,5-dihydro-1,3,4-oxadiazol-2-yl; the group 4-oxo-4,5-dihydro-oxazole-2-yl is to be understood as also encompassing its tautomeric form 4-hydroxy-oxazole-2-yl; the group 2,4-dioxoimidazolidin-1-yl is to be understood as also encompassing its tautomeric form 2,4-dihydroxy-imidazol-1-yl; and the group 2,5-dioxoimidazolidin-1-yl is to be understood as also encompassing its tautomeric form 2,5-dihydroxy-imidazol-1-yl.

Where the plural form is used for compounds, salts, pharmaceutical compositions, diseases and the like, this is intended to mean also a single compound, salt, or the like.

Any reference to compounds of Formula (I) according to embodiments 1) to 19) is to be understood as referring also to the salts (and especially the pharmaceutically acceptable salts) of such compounds, as appropriate and expedient.

The term "pharmaceutically acceptable salts" refers to salts that retain the desired biological activity of the subject compound and exhibit minimal undesired toxicological effects. Such salts include inorganic or organic acid and/or base addition salts depending on the presence of basic and/or acidic groups in the subject compound. For reference see for example "Handbook of Pharmaceutical Salts. Properties, Selection and Use.", P. Heinrich Stahl, Camille G. Wermuth (Eds.), Wiley-VCH, 2008; and "Pharmaceutical Salts and Co-crystals", Johan Wouters and Luc Quéré (Eds.), RSC Publishing, 2012.

Definitions provided herein are intended to apply uniformly to the compounds of Formula (I), as defined in any one of embodiments 1) to 18), and, mutatis mutandis, throughout the description and the claims unless an otherwise expressly set out definition provides a broader or narrower definition. It is well understood that a definition or preferred definition of a term defines and may replace the respective term independently of (and in combination with) any definition or preferred definition of any or all other terms as defined herein.

Whenever a substituent is denoted as optional, it is understood that such substituent may be absent (i.e. the respective residue is unsubstituted with regard to such optional substituent), in which case all positions having a free valency (to which such optional substituent could have been attached to; such as for example in an aromatic ring the ring carbon atoms and/or the ring nitrogen atoms having a free valency) are substituted with hydrogen where appropriate. Likewise, in case the term "optionally" is used in the context of (ring) heteroatom(s), the term means that either the respective optional heteroatom(s), or the like, are absent (i.e. a certain moiety does not contain heteroatom(s)/is a carbocycle/or the like), or the respective optional heteroatom(s), or the like, are present as explicitly defined.

The term "halogen" means fluorine, chlorine, or bromine, preferably fluorine or chlorine.

The term "alkyl", used alone or in combination, refers to a saturated straight or branched chain hydrocarbon group containing one to six carbon atoms. The term "$C_{x-y}$-alkyl" (x and y each being an integer), refers to an alkyl group as defined before, containing x to y carbon atoms. For example a $C_{1-6}$-alkyl group contains from one to six carbon atoms. Examples of alkyl groups are methyl, ethyl, propyl, isopropyl, butyl, isobutyl, tert.-butyl, 3-methyl-butyl, 2,2-dimethyl-propyl and 3,3-dimethyl-butyl. For avoidance of any doubt, in case a group is referred to as e.g. propyl or butyl, it is meant to be n-propyl, respectively n-butyl. Preferred are methyl and ethyl. Most preferred is methyl. For the group L-$R^5$ representing —$C_{1-4}$-alkyl preferred are isopropyl and isobutyl.

The term "—$C_{x-y}$-alkylene-", used alone or in combination, refers to bivalently bound alkyl group as defined before containing x to y carbon atoms. The term "—$C_{0-y}$-alkylene-" refers to a direct bond, or to a —($C_{1-y}$)alkylene- as defined before. Preferably, the points of attachment of a —$C_{1-y}$-alkylene group are in 1,1-diyl, in 1,2-diyl, or in 1,3-diyl arrangement. Preferably, the points of attachment of a —$C_{2-y}$-alkylene group are in 1,2-diyl or in 1,3-diyl arrangement. In case a $C_{0-y}$-alkylene group is used in combination with another substituent, the term means that either said substituent is linked through a $C_{1-y}$-alkylene group to the rest of the molecule, or it is directly attached to the rest of the molecule (i.e. a $C_0$-alkylene group represents a direct bond linking said substituent to the rest of the molecule). The alkylene group —$C_2H_4$— refers to —$CH_2$—$CH_2$— if not explicitly indicated otherwise. Examples of —$C_{0-4}$-alkylene- groups are notably methylene, ethylene, and propane-1,3-diyl. Examples of —$C_{0-6}$-alkylene- groups are notably methylene, ethylene, propane-1,3-diyl, and 3-methylbutane-1,3-diyl (especially methylene, ethylene, and propane-1,3-diyl). Examples of —$C_{1-6}$-alkylene- groups are notably methylene, ethylene, ethane-1,1-diyl, propane-1,3-diyl, propane-1,2-diyl, propane-2,2-diyl, 2-methylpropane-1,2-diyl, 2-methylpropane-1,1-diyl, 2,2-dimethylpropane-1,3-diyl, butane-1,4-diyl, 3-methylbutane-1,3-diyl, and 4-methylpentane-1,4-diyl. Examples of —$C_{1-4}$-alkylene- groups are notably methylene, ethylene, propane-2,2-diyl, and 2-methylpropane-1,2-diyl (especially methylene). Examples of —$C_{2-6}$-alkylene- groups are notably ethylene, propane-1,3-diyl, propane-1,2-diyl, 2,2-dimethylpropane-1,3-diyl, 2-methylpropane-1,2-diyl, 3-methylbutane-1,3-diyl, and 4-methylpentane-1,4-diyl (most preferably ethylene, propane-1,3-diyl, propane-1,2-diyl, 2-methylpropane-1,2-diyl, 3-methylbutane-1,3-diyl, and 4-methylpentane-1,4-diyl). Examples of —$C_{2-4}$-alkylene- groups are notably ethylene, propane-1,2-diyl and propane-1,3-diyl.

An example of a group -$L^2$-hydroxy wherein -$L^2$- represents $C_{2-6}$-alkylene which is mono-substituted with hydroxy is 2,3-dihydroxypropyl.

The term "alkenyl", used alone or in combination, refers to a straight or branched hydrocarbon chain containing two to five carbon atoms and one carbon-carbon double bond. The term "$C_{x-y}$-alkenyl" (x and y each being an integer), refers to an alkenyl group as defined before containing x to y carbon atoms. For example a $C_{2-5}$-alkenyl group contains from two to five carbon atoms. An example of alkenyl group is notably prop-1-en-2-yl.

The term "—$C_{x-y}$-alkenylene-", used alone or in combination, refers to bivalently bound alkenyl group as defined before containing x to y carbon atoms. Examples of —$C_{2-6}$-alkenylene- groups are notably ethen-1,2-diyl, prop-1-en-2,3-diyl, and prop-1-en-1,3-diyl.

The term "fluoroalkyl", used alone or in combination, refers to an alkyl group as defined before containing one to three carbon atoms in which one or more (and possibly all) hydrogen atoms have been replaced with fluorine. The term "$C_{x-y}$-fluoroalkyl" (x and y each being an integer) refers to a fluoroalkyl group as defined before containing x to y carbon atoms. For example a $C_{1-3}$-fluoroalkyl group contains from one to three carbon atoms in which one to seven hydrogen atoms have been replaced with fluorine. Representative examples of fluoroalkyl groups include trifluoromethyl, 2-fluoroethyl, 2,2-difluoroethyl and 2,2,2-trifluoroethyl. Preferred are $C_1$-fluoroalkyl groups such as trifluoromethyl.

The term "fluoroalkoxy", used alone or in combination, refers to an alkoxy group as defined before containing one to three carbon atoms in which one or more (and possibly all) hydrogen atoms have been replaced with fluorine. The term "$C_{x-y}$-fluoroalkoxy" (x and y each being an integer) refers to a fluoroalkoxy group as defined before containing x to y carbon atoms. For example a $C_{1-3}$-fluoroalkoxy group contains from one to three carbon atoms in which one to seven hydrogen atoms have been replaced with fluorine. Representative examples of fluoroalkoxy groups include trifluoromethoxy, difluoromethoxy, 2-fluoroethoxy, 2,2-difluoroethoxy and 2,2,2-trifluoroethoxy. Preferred are $C_1$-fluoroalkoxy groups such as trifluoromethoxy and difluoromethoxy, as well as 2,2,2-trifluoroethoxy.

The term "cycloalkyl", used alone or in combination, refers especially to a saturated monocyclic, or to a fused-, bridged-, or spiro-bicyclic hydrocarbon ring containing three to eight carbon atoms. The term "$C_{x-y}$-cycloalkyl" (x and y each being an integer), refers to a cycloalkyl group as defined before containing x to y carbon atoms. For example a $C_{3-6}$-cycloalkyl group contains from three to six carbon atoms. Examples of cycloalkyl groups are cyclopropyl, cyclobutyl, cyclopentyl, cyclohexyl, and cycloheptyl, as well as the bicyclic group bicyclo[1.1.1]pentane. Preferred are cyclopropyl, cyclobutyl, and cyclopentyl; especially cyclopropyl.

The term "$C_{x-y}$-cycloalkyl optionally containing a ring oxygen atom" refers to a cycloalkyl group as defined before containing x to y carbon atoms, wherein one ring carbon atom of said $C_{x-y}$-cycloalkyl may be replaced by an oxygen atom. Such groups are unsubstituted or substituted as explicitly defined. Examples are especially the $C_{3-6}$-cycloalkyl groups cyclopropyl, cyclobutyl, cyclopentyl, cyclohexyl; as well as oxetanyl, tetrahydrofuranyl, and tetrahydropyranyl. A particular "$C_{3-6}$-cycloalkyl, wherein said $C_{3-6}$-cycloalkyl contains one ring oxygen atom" is tetrahydro-2H-pyran-4-yl.

The term "—$C_{x-y}$-cycloalkylene-", used alone or in combination, refers to bivalently bound cycloalkyl group as defined before containing x to y carbon atoms. Preferably, the points of attachment of any bivalently bound cycloalkyl group are in 1,1-diyl, or in 1,2-diyl arrangement. An example of a —$C_{3-6}$-cycloalkylene- group is notably cyclopropane-1,1-diyl. Examples of —$C_{3-8}$-cycloalkylene- groups are notably cyclopropane-1,1-diyl, cyclopropane-1,2-diyl, cyclobutane-1,1-diyl, bicyclo[1.1.1]pentane-1,3-diyl, cyclohexane-1,3-diyl, and cyclohexane-1,4-diyl (especially cyclopropane-1,1-diyl, cyclopropane-1,2-diyl, and cyclobutane-1,1-diyl).

The term "alkoxy", used alone or in combination, refers to an alkyl-O— group wherein the alkyl group is as defined before. The term "$C_{x-y}$-alkoxy" (x and y each being an integer) refers to an alkoxy group as defined before containing x to y carbon atoms. For example a $C_{1-4}$-alkoxy group means a group of the formula $C_{1-4}$-alkyl-O— in which the term "$C_{1-4}$-alkyl" has the previously given significance. Examples of alkoxy groups are methoxy, ethoxy, n-propoxy, isopropoxy, n-butoxy, isobutoxy, sec.-butoxy and tert.-butoxy. Preferred are ethoxy and especially methoxy.

Examples of methoxy-$C_{2-3}$-alkoxy groups as used for the substituent $R^2$ are 2-methoxy-ethoxy and 2-methoxy-1-methyl-ethoxy.

The term "heterocyclyl", used alone or in combination, and if not explicitly defined in a broader or more narrow way, refers to a saturated or unsaturated non-aromatic monocyclic hydrocarbon ring containing one or two ring heteroatoms independently selected from nitrogen, sulfur, and oxygen (especially one oxygen atom, one sulfur atom, one nitrogen atom, two nitrogen atoms, two oxygen atoms, one nitrogen atom and one oxygen atom). The term "$C_{x-y}$-heterocyclyl" refers to such a heterocycle containing x to y ring atoms. Examples of heterocyclyl groups as used in the group -$L^{10}$-$C_{4-6}$-heterocyclyl are notably oxetan-3-yl, thietane-3-yl, imidazolidin-1-yl, 4,5-dihydrooxazol-2-yl, 1,3-dioxolan-4-yl, piperidin-4-yl, piperazin-1-yl, piperazin-2-yl, morpholin-3-yl, morpholin-4-yl and morpholin-2-yl (especially oxetan-3-yl, 4,5-dihydrooxazol-2-yl, 1,3-dioxolan-4- yl, and morpholin-4-yl). Heterocyclyl group are unsubstituted or substituted as explicitly defined.

The term "—$C_{x-y}$-heterocycloalkylene-", used alone or in combination, refers to bivalently bound heterocyclyl group as defined before containing x to y ring atoms. Examples of $C_{3-6}$-heterocycloalkylene containing one ring oxygen atom, or containing one ring nitrogen atom as used in the groups $Cy^1$, $Cy^2$, and, mutatis mutandis, $Cy^4$ are notably the nitrogen containing groups azetidin-1,3-diyl, azetidin-3,3-diyl, pyrrolidine-2,4-diyl, piperidin-1,4-diyl and piperidin-4,4-diyl; and the oxygen containing groups oxetan-3,3-diyl, tetrahydrofuran-3,3-diyl, and tetrahydro-2H-pyran-4,4-diyl.

The term "aryl", used alone or in combination, means a naphthyl or a phenyl group, especially phenyl.

The term "heteroaryl", used alone or in combination, means a 5- to 10-membered monocyclic or bicyclic aromatic ring containing one to a maximum of four heteroatoms, each independently selected from oxygen, nitrogen and sulfur. Examples of such heteroaryl groups are furanyl, oxazolyl, isoxazolyl, oxadiazolyl, thiophenyl, thiazolyl, isothiazolyl, thiadiazolyl, pyrrolyl, imidazolyl, pyrazolyl, triazolyl, tetrazolyl, pyridinyl, pyrimidinyl, pyridazinyl, pyrazinyl, indolyl, isoindolyl, benzofuranyl, isobenzofuranyl, benzothiophenyl, indazolyl, benzimidazolyl, benzoxazolyl, benzisoxazolyl, benzothiazolyl, benzoisothiazolyl, benzotriazolyl, benzoxadiazolyl, benzothiadiazolyl, quinolinyl, isoquinolinyl, naphthyridinyl, cinnolinyl, quinazolinyl, quinoxalinyl, phthalazinyl, pyrrolopyridinyl, pyrazolopyridinyl, pyrazolopyrimidinyl, pyrrolopyrazinyl, imidazopyridinyl, imidazopyridazinyl, and imidazothiazolyl. The above-mentioned heteroaryl groups are unsubstituted or substituted as explicitly defined. For the substituent $Ar^1$ representing "6-membered heteroaryl containing one or two nitrogen atoms", the term means the respective above-mentioned 6-membered groups; especially pyridinyl; in particular pyridin-2-yl. For the substituent $HET^1$ representing "5- or 6-membered heteroaryl", the term means the above-mentioned 5- or 6-membered groups. Notably, the term refers to 5-membered heteroaryl containing one to four heteroatoms, such as furanyl, imidazolyl, pyrrolyl, pyrazolyl, oxazolyl, isoxazolyl, oxadiazolyl, triazolyl, or tetrazolyl (especially pyrazolyl, triazolyl, or tetrazolyl); or to 6-membered heteroaryl containing one or two nitrogen atoms; such as especially pyrimidinyl, pyrazinyl, pyridazinyl, or pyridinyl. Particular examples of 5-membered heteroaryl as used for $HET^1$ are furan-2-yl, 1H-imidazol-2-yl, 1H-imidazol-4-yl, 1H-pyrrol-2-yl, 1H-pyrazol-3-yl, 1H-pyrazol-4-yl, 1H-pyrazol-5-yl, oxazol-2-yl, oxazol-4-yl, isoxazol-5-yl, 1,2,4-oxadiazol-3-yl, 2H-1,2,3-triazol-2-yl, 1H-1,2,3-triazol-4-yl, 1H-1,2,3-triazol-1-yl, 4H-1,2,4-triazol-4-yl, 1H-1,2,4-triazol-5-yl, 1H-tetrazol-1-yl, 2H-tetrazol-2-yl, and 1H-tetrazol-5-yl. Particular examples of 6-membered heteroaryl as used for $HET^1$ are pyrimidin-2-yl, pyrimidin-4-yl, pyrimidin-5-yl, pyridin-2-yl, pyridin-4-yl, pyridin-3-yl, pyridazin-3-yl, and pyrazin-2-yl.

For avoidance of doubt, certain groups having tautomeric forms which may be considered predominantly aromatic (such as for example 3-hydroxy-isoxazolyl, 5-hydroxy-[1,2,4]oxadiazol-3-yl, 3-hydroxy-[1,2,4]oxadiazol-5-yl, 3-hydroxy-1H-pyrazol-4-yl, or 2-hydroxy-[1,3,4]oxadiazolyl groups) are defined herein as heteroaryl groups $HET^1$, even though their corresponding tautomeric forms (3-oxo-2,3-dihydro-2H-isoxazolyl, respectively, 5-oxo-4,5-dihydro-[1,2,4]oxadiazol-3-yl, 3-oxo-4,5-dihydro-[1,2,4]oxadiazol-5-yl, 3-oxo-2,3-dihydro-1H-pyrazol-4-yl, 2-oxo-2,3-dihydro-3H-[1,3,4]oxadiazolyl) could also be considered as a non-aromatic heterocyclyl group. Likewise, certain groups having tautomeric forms which may be considered predominantly non-aromatic (such as 2,4-dioxoimidazolidin-1-yl, 4-oxo-4,5-dihydro-oxazole-2-yl) as defined for the substituent $-L^{10}$-$C_{4-6}$-heterocyclyl, are defined herein as not being part of substituted heteroaryl groups as defined for $HET^1$, even though their corresponding tautomeric form (4-hydroxy-oxazole-2-yl, respectively, 2,4-dihydroxy-imidazol-1-yl), could also be considered as an heteroaryl group $HET^1$. It is understood that the corresponding tautomers are encompassed in the respective scope -$L^9$-$HET^1$, respectively, -$L^{10}$-$C_{4-6}$-heterocyclyl as defined.

The term "cyano" refers to a group —CN.

The term "oxo" refers to a group =O which is preferably attached to a chain or ring carbon or sulfur atom as for example in a carbonyl group —(CO)—, or a sulfonyl group —($SO_2$)—.

Whenever the word "between" is used to describe a numerical range, it is to be understood that the end points of the indicated range are explicitly included in the range. For example: if a temperature range is described to be between 40° C. and 80° C., this means that the end points 40° C. and 80° C. are included in the range; or if a variable is defined as being an integer between 1 and 4, this means that the variable is the integer 1, 2, 3, or 4.

Unless used regarding temperatures, the term "about" placed before a numerical value "X" refers in the current application to an interval extending from X minus 10% of X to X plus 10% of X, and preferably to an interval extending from X minus 5% of X to X plus 5% of X. In the particular case of temperatures, the term "about" placed before a temperature "Y" refers in the current application to an interval extending from the temperature Y minus 10° C. to Y plus 10° C., and preferably to an interval extending from Y minus 5° C. to Y plus 5° C. Besides, the term "room temperature" as used herein refers to a temperature of about 25° C.

Further embodiments of the invention are presented hereinafter:

2) A second embodiment relates to compounds according to embodiment 1), wherein $R^1$ is halogen (especially chloro).

3) Another embodiment relates to compounds according to embodiments 1) or 2), wherein $R^2$ is methoxy, ethoxy, isopropoxy, cyclopropyloxy, 2-methoxy-ethoxy or 2-methoxy-1-methyl-ethoxy (especially methoxy).

4) Another embodiment relates to compounds according to any one of embodiments 1) or 2), wherein $R^2$ is $C_{1-3}$-alkoxy (notably methoxy, isopropoxy, especially methoxy).

5) Another embodiment relates to compounds according to any one of embodiments 1) to 4), wherein $Ar^1$ represents phenyl [wherein it is understood that said phenyl is substituted with $R^3$ and $R^4$ as explicitly defined].

6) Another embodiment relates to compounds according to any one of embodiments 1) to 4), wherein $Ar^1$ represents a 6-membered heteroaryl containing one or two nitrogen atoms (especially pyridinyl) [wherein it is understood that said heteroaryl is substituted with $R^3$ and $R^4$ as explicitly defined].

7) Another embodiment relates to compounds according to any one of embodiments 1) to 6), wherein $R^3$ represents isopropyl.

8) Another embodiment relates to compounds according to any one of embodiments 1) to 7), wherein $R^4$ represents fluoro.

9) Another embodiment relates to compounds according to any one of embodiments 1) to 7), wherein $R^4$ represents hydrogen.

10) Another embodiment relates to compounds according to any one of embodiments 1) to 4), wherein the fragment:

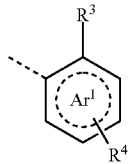

represents a ring independently selected from:

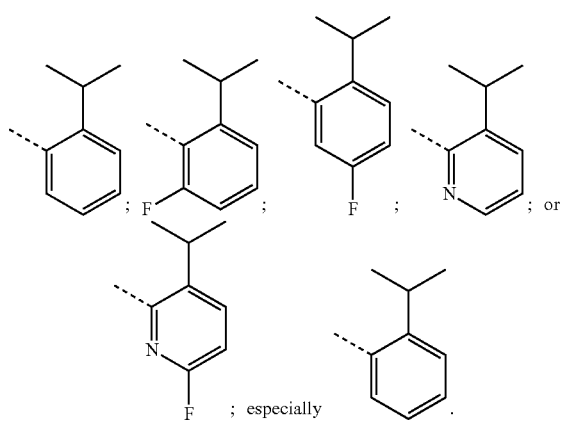

11) Another embodiment relates to compounds according to any one of embodiments 1) to 10), wherein m and n both are 1, or m and n both are 2.

12) Another embodiment relates to compounds according to any one of embodiments 1) to 10), wherein m and n both are 1.

13) Another embodiment relates to compounds according to any one of embodiments 1) to 12), wherein the group -L-$R^5$ represents hydrogen;
—$C_{1-4}$-alkyl;
—$C_{0-6}$-alkylene-$C_{3-6}$-cycloalkyl; wherein the $C_{3-6}$-cycloalkyl independently is unsubstituted or mono-substituted with halogen (especially fluoro);
—CO—H;
-$L^1$—CO—$R^{C11}$ wherein $R^{C11}$ independently represents hydroxy; —O-benzyl; —O—$C_{1-6}$-alkyl; $C_1$-fluoroalkyl; or —$NR^{N11}R^{N12}$; wherein independently $R^{N11}$ is hydrogen or $C_{1-4}$-alkyl, and $R^{N12}$ is hydrogen, $C_{1-4}$-alkyl, —$SO_2$—$C_{1-6}$-alkyl, or —O—$R^{O11}$, wherein $R^{O11}$ independently represents hydrogen, $C_{1-6}$-alkyl, or benzyl; and
-$L^1$- independently represents
—$C_{1-6}$-alkylene-, —CO—$C_{1-6}$-alkylene-, —$SO_2$—$C_{1-6}$-alkylene-, —CO—O—$C_{1-6}$-alkylene-, —CO—NH—$C_{1-6}$-alkylene-, or —$SO_2$—NH—$C_{1-6}$-alkylene-;
—$C_{1-6}$-alkylene-, —CO—$C_{1-6}$-alkylene-, or —$SO_2$—$C_{1-6}$-alkylene-; wherein in the above groups said $C_{1-6}$-alkylene independently is mono-substituted with hydroxy, $C_{1-3}$-alkoxy, —O—CO—$C_{1-4}$-alkyl, or —$NR^{N13}R^{N14}$; wherein independently $R^{N13}$ is hydrogen or $C_{1-4}$-alkyl, and $R^{N14}$ is hydrogen, $C_{1-4}$-alkyl or —CO—O—$C_{1-4}$-alkyl;
—$C_{2-6}$-alkylene-, —CO—$C_{2-6}$-alkylene-, or —$SO_2$—$C_{2-6}$-alkylene-; wherein in the above groups said $C_{2-6}$-alkylene independently is di-substituted wherein the substituents are independently selected from hydroxy and —$NR^{N15}R^{N16}$; wherein independently $R^{N15}$ is hydrogen or $C_{1-4}$-alkyl, and $R^{N16}$ is hydrogen, $C_{1-4}$-alkyl or —CO—O—$C_{1-4}$-alkyl;
—$C_{0-4}$-alkylene-$C_{3-8}$-cycloalkylene-$C_{0-4}$-alkylene-, —CO—$C_{0-4}$-alkylene-$C_{3-8}$-cycloalkylene-$C_{0-4}$-alkylene-, —$SO_2$—$C_{0-4}$-alkylene-$C_{3-8}$-cycloalkylene-$C_{0-4}$-alkylene-, —CO—NH—$C_{0-4}$-alkylene-$C_{3-8}$-cycloalkylene-$C_{0-4}$-alkylene-, or —CO—O—$C_{0-4}$-alkylene-$C_{3-8}$-cycloalkylene-$C_{0-4}$-alkylene-;
—$C_{0-4}$-alkylene-$Cy^1$-$C_{0-4}$-alkylene-, —CO—$C_{0-4}$-alkylene-$Cy^1$-$C_{0-4}$-alkylene-, —CO—O—$C_{0-4}$-alkylene-$Cy^1$-$C_{0-4}$-alkylene-, —CO—NH—$C_{0-4}$-alkylene-$Cy^1$-$C_{0-4}$-alkylene-, —$SO_2$—$C_{0-4}$-alkylene-$Cy^1$-$C_{0-4}$-alkylene-, or —$SO_2$—NH—$C_{0-4}$-alkylene-$Cy^1$-$C_{0-4}$-alkylene-; wherein $Cy^1$ independently represents a $C_{3-6}$-heterocycloalkylene containing one ring oxygen atom, or one ring nitrogen atom, wherein said ring nitrogen, in case it has a free valency, independently is unsubstituted, or mono-substituted with $C_{1-4}$-alkyl or —CO—O—$C_{1-4}$-alkyl;
—CO—$C_{1-4}$-alkylene-$X^{12}$—$C_{1-4}$-alkylene-, —$SO_2$—$C_{1-4}$-alkylene-$X^{12}$—$C_{1-4}$-alkylene-, or —CO—$C_{1-4}$-alkylene-$X^{12}$—$C_{0-4}$-alkylene-$C_{3-6}$-cycloalkylene-$C_{0-4}$-alkylene-; wherein $X^{12}$ independently represents oxygen, or a nitrogen atom which is independently unsubstituted, or mono-substituted with $C_{1-4}$-alkyl, $C_{3-6}$-cycloalkyl, —CO—O—$C_{1-4}$-alkyl, or $C_{1-3}$-alkoxy-$C_{2-4}$-alkyl;
—$C_{2-4}$-alkylene-$X^{13}$—$C_{1-4}$-alkylene-; wherein $X^{13}$ represents —NH—CO—, and wherein said $C_{2-4}$-alkylene independently is unsubstituted, or mono-substituted with hydroxy;
—CO—$C_{2-6}$-alkenylene- or —$SO_2$—$C_{2-6}$-alkenylene-; or
—CO—$C_{2-6}$-fluoroalkylene-;
-$L^2$-hydroxy; wherein -$L^2$- represents
—CO—$C_{1-6}$-alkylene- or —$SO_2$—$C_{1-6}$-alkylene-; wherein in the above groups said $C_{1-6}$-alkylene independently is unsubstituted, or mono-substituted with hydroxy, $C_1$-fluoroalkyl, or —$NR^{N21}R^{N22}$ wherein independently $R^{N21}$ is hydrogen or $C_{1-4}$-alkyl, and $R^{N22}$ is hydrogen, $C_{1-4}$-alkyl or —CO—O—$C_{1-4}$-alkyl;
—$C_{2-6}$-alkylene-, —CO—O—$C_{2-6}$-alkylene-, —CO—NH—$C_{2-6}$-alkylene-, or —$SO_2$—NH—$C_{2-6}$-alkylene-, wherein in the above groups said $C_{2-6}$-alkylene independently is unsubstituted, or mono-substituted with hydroxy, $C_1$-fluoroalkyl, or —$NR^{N23}R^{N24}$ wherein independently $R^{N23}$ is hydrogen or $C_{1-4}$-alkyl, and $R^{N24}$ is hydrogen, $C_{1-4}$-alkyl or —CO—O—$C_{1-4}$-alkyl;
—$C_{0-4}$-alkylene-$C_{3-6}$-cycloalkylene-$C_{0-4}$-alkylene-, —CO—$C_{0-4}$-alkylene-$C_{3-6}$-cycloalkylene-$C_{0-4}$-alkylene-, or —$SO_2$—$C_{0-4}$-alkylene-$C_{3-6}$-cycloalkylene-$C_{0-4}$-alkylene-;
—$C_{0-4}$-alkylene-$Cy^2$-$C_{0-4}$-alkylene-, —CO—$C_{0-4}$-alkylene-$Cy^2$-$C_{0-4}$-alkylene-, or —$SO_2$—$C_{0-4}$-alkylene-$Cy^2$-$C_{0-4}$-alkylene-; wherein $Cy^2$ independently represents a $C_{3-6}$-heterocycloalkylene group containing one ring oxygen atom, or one ring nitrogen atom; wherein said ring nitrogen, in case it has a free valency, is independently unsubstituted, or mono-substituted with $C_{1-4}$-alkyl or —CO—O—$C_{1-4}$-alkyl;

—CO—$C_{1-4}$-alkylene-$X^{22}$—$C_{2-4}$-alkylene-, —CO—$C_{1-4}$-alkylene-$X^{22}$—$C_{1-4}$-alkylene-$C_{3-6}$-cycloalkylene-, or —$SO_2$—$C_{1-4}$-alkylene-$X^{22}$—$C_{2-4}$-alkylene-; wherein $X^{22}$ represents a nitrogen atom which is independently unsubstituted, or mono-substituted with $C_{1-4}$-alkyl, $C_{3-6}$-cycloalkyl, or —CO—O—$C_{1-4}$-alkyl;

—$C_{2-4}$-alkylene-$X^{23}$—$C_{1-4}$-alkylene-; wherein $X^{23}$ represents —NH—CO—, and wherein said $C_{2-4}$-alkylene independently is unsubstituted, or mono-substituted with hydroxy; or 3,4-dioxocyclobut-1-ene-1,2-diyl;

-$L^3$-O—$R^{O31}$ wherein $R^{O31}$ is —$C_{1-4}$-alkyl, —CO—$C_{1-4}$-alkyl or —CO—$C_{2-4}$-alkenyl; and -$L^3$- independently represents —$C_{2-6}$-alkylene-, —CO—$C_{1-6}$-alkylene- or —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-;

-$L^4$-$NR^{N1}R^{N2}$ wherein independently $R^{N1}$ is hydrogen or $C_{1-4}$-alkyl; and $R^{N2}$ is hydrogen; $C_{1-4}$-alkyl; $C_{1-3}$-fluoroalkyl; $C_{3-6}$-cycloalkyl; $C_{1-3}$-alkoxy-$C_{2-4}$-alkylene; —CO—$C_{1-4}$-alkyl; —$SO_2$—$C_{1-4}$-alkyl; or —$SO_2$—$C_1$-fluoroalkyl; and -$L^4$- independently represents —$C_{2-6}$-alkylene-, —CO—$C_{1-6}$-alkylene-, —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-; or —$C_{0-4}$-alkylene-$Cy^4$-$C_{0-4}$-alkylene-, —CO—$C_{0-4}$-alkylene-$Cy^4$-$C_{0-4}$-alkylene-, or —$SO_2$—$C_{0-4}$-alkylene-$Cy^4$-$C_{0-4}$-alkylene-; wherein $Cy^4$ independently represents a $C_{3-6}$-heterocycloalkylene group containing one ring oxygen atom;

-$L^5$-$NR^{N3}R^{N4}$ wherein $R^{N3}$ is hydrogen, $C_{1-4}$-alkyl, or $C_{1-3}$-alkoxy-$C_{2-4}$-alkylene; and $R^{N4}$ is —CO—O—$C_{1-4}$-alkyl; —CO—$NR^{N51}R^{N52}$ wherein $R^{N5}1$ and $R^{N52}$ are independently selected from hydrogen and $C_{1-4}$-alkyl; or —$SO_2$—$NR^{N53}R^{N54}$ wherein independently $R^{N53}$ is hydrogen or $C_{1-4}$-alkyl, and $R^{N54}$ is hydrogen, $C_{1-4}$-alkyl, or —CO—$C_{1-4}$-alkyl;

and -$L^5$- independently represents

—$C_{2-6}$-alkylene-, —CO—$C_{1-6}$-alkylene- or —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-;

-$L^6$-$N(R^{N61})$—O—$R^{O61}$ wherein $R^{N61}$ is hydrogen, —CO—$C_{1-4}$-alkyl, or —CO—O—$C_{1-4}$-alkyl; and $R^{O61}$ independently represents hydrogen, $C_{1-6}$-alkyl, or benzyl;

and -$L^6$- independently represents

—$C_{2-6}$-alkylene-, —CO—$C_{1-6}$-alkylene-, —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-;

-$L^7$-$NR^{N5}R^{N6}$ wherein $R^{N5}$ is hydrogen or $C_{1-4}$-alkyl (especially hydrogen); $R^{N6}$ is hydrogen, $C_{1-4}$-alkyl, —CO—$C_{1-4}$-alkyl, $C_{1-3}$-fluoroalkyl, or $C_{3-6}$-cycloalkyl (especially hydrogen); and -$L^7$- independently represents —CO—, or —$SO_2$—;

-$L^8$—$SO_2$—$R^{S81}$ wherein $R^{S81}$ independently represents —$C_{1-6}$-alkyl; $C_1$-fluoroalkyl; hydroxy; —$NR^{N81}R^{N82}$ wherein independently $R^{N81}$ is hydrogen or $C_{1-4}$-alkyl, and $R^{N82}$ is hydrogen, $C_{1-4}$-alkyl, —CO—$C_{1-6}$-alkyl; and -$L^8$- independently represents —$C_{1-6}$-alkylene-, —CO—$C_{1-6}$-alkylene-, —$SO_2$—$C_{1-6}$-alkylene-, —CO—O—$C_{2-6}$-alkylene-, —CO—NH—$C_{1-6}$-alkylene-, or —$SO_2$—NH—$C_{1-6}$-alkylene-;

-$L^9$-$HET^1$, wherein $HET^1$ represents 5- or 6-membered heteroaryl (especially pyrrolyl, pyrazolyl, imidazolyl, triazolyl, tetrazolyl, furanyl, oxazolyl, isoxazolyl; thiazolyl, isothiazolyl, oxadiazolyl, thiadiazolyl, pyridinyl, pyrimidinyl, pyridazinyl, pyrazinyl), wherein said $HET^1$ independently is unsubstituted or mono-, or di-substituted wherein the substituents are independently selected from $C_{1-4}$-alkyl (especially methyl); halogen; cyano; hydroxy; hydroxymethyl; —$C_{0-2}$-alkylene-$Cy^{91}$—$COOR^{O91}$ wherein $R^{O91}$ is hydrogen or $C_{1-4}$-alkyl, and wherein $Cy^{91}$ represents a $C_{3-6}$-cycloalkylene group; or —$C_{0-2}$-alkylene-CO-$OR^{O92}$ wherein $R^{O92}$ is hydrogen or $C_{1-4}$-alkyl; and -$L^9$- independently represents —$C_{0-6}$-alkylene-, —CO—$C_{0-6}$-alkylene-, —$SO_2$—$C_{0-6}$-alkylene-, —CO—O—$C_{1-6}$-alkylene-, —CO—NH—$C_{1-6}$-alkylene-, or —$SO_2$—NH—$C_{1-6}$-alkylene-;

-$L^{10}$-$C_{4-6}$-heterocyclyl, wherein the $C_{4-6}$-heterocyclyl independently contains one or two ring heteroatoms independently selected from nitrogen, sulfur and oxygen; wherein in the above groups said $C_{4-6}$-heterocyclyl independently is unsubstituted, or mono-, di-, or tri-substituted wherein the substituents are independently selected from:

one or two oxo substituents each attached to a ring carbon atom in alpha position to a ring nitrogen atom (thus forming together with the nitrogen an amide group, or, in case a ring oxygen is additionally adjacent, a carbamate group, or, in case second ring nitrogen is additionally adjacent, a urea group); and/or two methyl substituents attached to a ring carbon atom in alpha position to a ring nitrogen atom or a ring oxygen atom (thus forming together with the nitrogen a —$C(CH_3)_2$—N— or with the oxygen a —$C(CH_3)_2$—O-group); and/or two oxo substituents at a ring sulfur ring atom (thus forming a —$SO_2$— group); and/or $C_{1-4}$alkyl, $C_{1-3}$-alkoxy-$C_{2-4}$-alkyl, $C_{2-3}$-fluoroalkyl, or —CO—$C_{1-4}$-alkyl attached to a ring nitrogen atom having a free valency; and -$L^{10}$- independently represents —$C_{0-6}$-alkylene-, —CO—$C_{0-6}$-alkylene-, —$SO_2$—$C_{0-6}$-alkylene-;

-$L^{13}$-$C_{1-4}$-alkyl; wherein -$L^{13}$- represents —CO—, —CO—O—, or —$SO_2$—.

14) Another embodiment relates to compounds according to any one of embodiments 1) to 12), wherein the group -L-$R^5$ represents hydrogen;

—$C_{1-4}$-alkyl;

—$C_{0-6}$-alkylene-$C_{3-6}$-cycloalkyl; wherein the $C_{3-6}$-cycloalkyl independently is unsubstituted or mono-substituted with halogen (especially fluoro);

—CO—H;

-$L^1$—CO—$R^{C11}$ wherein $R^{C11}$ independently represents hydroxy; —O—$C_{1-6}$-alkyl; or $C_1$-fluoroalkyl; and -$L^1$-independently represents
- —$C_{1-6}$-alkylene-, —CO—$C_{1-6}$-alkylene-, —$SO_2$—$C_{1-6}$-alkylene-, —CO—O—$C_{1-6}$-alkylene-, —CO—NH—$C_{1-6}$-alkylene-, or —$SO_2$—NH—$C_{1-6}$-alkylene-;

-$L^2$ hydroxy; wherein -$L^2$- represents
- —CO—$C_{1-6}$-alkylene- or —$SO_2$—$C_{1-6}$-alkylene-; wherein in the above groups said $C_{1-6}$-alkylene independently is unsubstituted, or mono-substituted with hydroxy, $C_1$-fluoroalkyl, or —$NR^{N21}R^{N22}$ wherein independently $R^{N21}$ is hydrogen or $C_{1-4}$-alkyl, and $R^{N22}$ is hydrogen, $C_{1-4}$-alkyl or —CO—O—$C_{1-4}$-alkyl;
- —$C_{2-6}$-alkylene-, —CO—O—$C_{2-6}$-alkylene-, —CO—NH—$C_{2-6}$-alkylene-, or —$SO_2$—NH—$C_{2-6}$-alkylene-, wherein in the above groups said $C_{2-6}$-alkylene independently is unsubstituted, or mono-substituted with hydroxy, or $C_1$-fluoroalkyl; or
- 3,4-dioxocyclobut-1-ene-1,2-diyl;

-$L^3$-O—$R^{O31}$ wherein $R^{O31}$ is —$C_{1-4}$-alkyl, —CO—$C_{1-4}$-alkyl or —CO—$C_{2-4}$-alkenyl; and -$L^3$- independently represents
- —$C_{2-6}$-alkylene-, —CO—$C_{1-6}$-alkylene- or —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-;

-$L^4$-$NR^{N1}R^{N2}$ wherein independently $R^{N1}$ is hydrogen or $C_{1-4}$-alkyl; and $R^{N2}$ is hydrogen; $C_{1-4}$-alkyl; $C_{1-3}$-fluoroalkyl; $C_{3-6}$-cycloalkyl; $C_{1-3}$-alkoxy-$C_{2-4}$-alkylene; —CO—$C_{1-4}$-alkyl; —$SO_2$—$C_{1-4}$-alkyl; or —$SO_2$—$C_1$-fluoroalkyl; and -$L^4$- independently represents
- —$C_{2-6}$-alkylene-, —CO—$C_{1-6}$-alkylene-, —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-;

-$L^5$-$NR^{N3}R^{N4}$ wherein $R^{N3}$ is hydrogen, $C_{1-4}$-alkyl, or $C_{1-3}$-alkoxy-$C_{2-4}$-alkylene; and $R^{N4}$ is —CO—O—$C_{1-4}$-alkyl; —CO—$NR^{N51}R^{N52}$ wherein $R^{N51}$ and $R^{N52}$ are independently selected from hydrogen and $C_{1-4}$-alkyl; or —$SO_2$—$NR^{N53}R^{N54}$ wherein independently $R^{N53}$ is hydrogen or $C_{1-4}$-alkyl, and $R^{N54}$ is hydrogen, $C_{1-4}$-alkyl, or —CO—$C_{1-4}$-alkyl;

and -$L^5$- independently represents
- —$C_{2-6}$-alkylene-, —CO—$C_{1-6}$-alkylene- or —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-;

-$L^7$-$NR^{N5}R^{N6}$ wherein $R^{N5}$ is hydrogen or $C_{1-4}$-alkyl (especially hydrogen); $R^{N6}$ is hydrogen, $C_{1-4}$-alkyl, —CO—$C_{1-4}$-alkyl, $C_{1-3}$-fluoroalkyl, or $C_{3-6}$-cycloalkyl (especially hydrogen); and -$L^7$- independently represents
- —CO—, or —$SO_2$—;

-$L^8$—$SO_2$—$R^{S81}$ wherein $R^{S81}$ independently represents —$C_{1-6}$-alkyl; $C_1$-fluoroalkyl; hydroxy; —$NR^{N81}R^{N82}$ wherein independently $R^{N81}$ is hydrogen or $C_{1-4}$-alkyl, and $R^{N82}$ is hydrogen, $C_{1-4}$-alkyl, —CO—$C_{1-6}$-alkyl; and -$L^8$- independently represents
- —$C_{1-6}$-alkylene-, —CO—$C_{1-6}$-alkylene-, —$SO_2$—$C_{1-6}$-alkylene-, —CO—O—$C_{2-6}$-alkylene-, —CO—NH—$C_{1-6}$-alkylene-, or —$SO_2$—NH—$C_{1-6}$-alkylene-;

-$L^9$-$HET^1$, wherein $HET^1$ represents 5- or 6-membered heteroaryl (especially pyrrolyl, pyrazolyl, imidazolyl, triazolyl, tetrazolyl, furanyl, oxazolyl, isoxazolyl; thiazolyl, isothiazolyl, oxadiazolyl, thiadiazolyl, pyridinyl, pyrimidinyl, pyridazinyl, pyrazinyl), wherein said $HET^1$ independently is unsubstituted or mono-, or di-substituted wherein the substituents are independently selected from $C_{1-4}$-alkyl (especially methyl); halogen; cyano; hydroxy; hydroxymethyl; —$C_{0-2}$-alkylene-$Cy^{91}$—$COOR^{O91}$ wherein $R^{O91}$ is hydrogen or $C_{1-4}$-alkyl, and wherein $Cy^{91}$ represents a $C_{3-6}$-cycloalkylene group; or —$C_{0-2}$-alkylene-CO-$OR^{O92}$ wherein $R^{O92}$ is hydrogen or $C_{1-4}$-alkyl; and -$L^9$- independently represents
- —$C_{0-6}$-alkylene-, —CO—$C_{0-6}$-alkylene-, —$SO_2$—$C_{0-6}$-alkylene-, —CO—O—$C_{1-6}$-alkylene-, —CO—NH—$C_{1-6}$-alkylene-, or —$SO_2$—NH—$C_{1-6}$-alkylene-;

-$L^{10}$-$C_{4-6}$-heterocyclyl, wherein the $C_{4-6}$-heterocyclyl independently contains one or two ring heteroatoms independently selected from nitrogen and oxygen; wherein in the above groups said $C_{4-6}$-heterocyclyl independently is unsubstituted, or mono-, or di-substituted wherein the substituents are independently selected from:
- one or two oxo substituents each attached to a ring carbon atom in alpha position to a ring nitrogen atom (thus forming together with the nitrogen an amide group, or, in case a ring oxygen is additionally adjacent, a carbamate group, or, in case second ring nitrogen is additionally adjacent, a urea group); and/or
- two methyl substituents attached to a ring carbon atom in alpha position to a ring nitrogen atom or a ring oxygen atom (thus forming together with the nitrogen a —$C(CH_3)_2$—N— or with the oxygen a —$C(CH_3)_2$—O-group); and -$L^{10}$- independently represents
- —$C_{0-6}$-alkylene-, —CO—$C_{0-6}$-alkylene-, —$SO_2$—$C_{0-6}$-alkylene-; or -$L^{13}$-$C_{1-4}$-alkyl; wherein -$L^{13}$- represents —CO—, —CO—O—, or —$SO_2$—.

15) Another embodiment relates to compounds according to any one of embodiments 1) to 12), wherein the group -L-$R^5$ represents hydrogen;
—$C_{1-4}$-alkyl;
—$C_{0-6}$-alkylene-$C_{3-6}$-cycloalkyl; wherein the $C_{3-6}$-cycloalkyl independently is unsubstituted or mono-substituted with halogen (especially fluoro);
—CO—H;

-$L^1$—CO—$R^{C11}$ wherein $R^{C11}$ independently represents hydroxy; or —O—$C_{1-6}$-alkyl; and -$L^1$- independently represents
- —$C_{1-6}$-alkylene-, —CO—$C_{1-6}$-alkylene-, or —CO—NH—$C_{1-6}$-alkylene-;

-$L^2$-hydroxy; wherein -$L^2$- represents
- —CO—$C_{1-6}$-alkylene- or —$SO_2$—$C_{1-6}$-alkylene-;
- —$C_{2-6}$-alkylene-, —CO—NH—$C_{2-6}$-alkylene-, or —$SO_2$—NH—$C_{2-6}$-alkylene-, wherein in the above groups said $C_{2-6}$-alkylene independently is unsubstituted, or mono-substituted with hydroxy; or
- 3,4-dioxocyclobut-1-ene-1,2-diyl;

-$L^3$-O—$R^{O31}$ wherein $R^{O31}$ is —$C_{1-4}$-alkyl or —CO—$C_{2-4}$-alkenyl; and -$L^3$- independently represents
- —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-;

-L$^4$-NR$^{N1}$R$^{N2}$ wherein independently R$^{N1}$ is hydrogen or C$_{1-4}$-alkyl; and R$^{N2}$ is hydrogen; C$_{1-4}$-alkyl; or —SO$_2$—C$_{1-4}$-alkyl; and -L$^4$- independently represents
—C$_2$-alkylene-, —CO—C$_{1-6}$-alkylene-, or —SO$_2$—C$_{1-6}$-alkylene-;

-L$^5$-NR$^{N3}$R$^{N4}$ wherein R$^{N3}$ is hydrogen, or C$_{1-4}$-alkyl; and R$^{N4}$ is —SO$_2$—NR$^{N53}$R$^{N54}$ wherein independently R$^{N53}$ is hydrogen or C$_{1-4}$-alkyl, and R$^{N54}$ is hydrogen, or C$_{1-4}$-alkyl;

and -L$^5$- independently represents
—C$_{2-6}$-alkylene-, —CO—C$_{1-6}$-alkylene- or —SO$_2$—C$_{1-6}$-alkylene-;

-L$^7$-NR$^{N5}$R$^{N6}$ wherein R$^{N5}$ is hydrogen or C$_{1-4}$-alkyl (especially hydrogen); R$^{N6}$ is hydrogen, C$_{1-4}$-alkyl, or C$_{3-6}$-cycloalkyl (especially hydrogen); and -L$^7$- independently represents
—CO—, or —SO$_2$—;

-L$^8$—SO$_2$—R$^{S81}$ wherein R$^{S81}$ independently represents
—C$_{1-6}$-alkyl; C$_1$-fluoroalkyl; or hydroxy; and -L$^8$- independently represents
—C$_{1-6}$-alkylene-, —CO—C$_{1-6}$-alkylene-, —SO$_2$—C$_{1-6}$-alkylene-;

-L$^9$-HET$^1$, wherein HET$^1$ represents 5- or 6-membered heteroaryl (especially pyrrolyl, pyrazolyl, imidazolyl, triazolyl, tetrazolyl, furanyl, oxazolyl, isoxazolyl; thiazolyl, isothiazolyl, oxadiazolyl, thiadiazolyl, pyridinyl, pyrimidinyl, pyridazinyl, pyrazinyl), wherein said HET$^1$ independently is unsubstituted or mono-, or di-substituted wherein the substituents are independently selected from C$_{1-4}$-alkyl (especially methyl); halogen; cyano; hydroxy; hydroxymethyl; —C$_{0-2}$-alkylene-CO-OR$^{O92}$ wherein R$^{O92}$ is hydrogen or C$_{1-4}$-alkyl; and -L$^9$- independently represents
—C$_{0-6}$-alkylene-, —CO—C$_{0-6}$-alkylene-, —SO$_2$—C$_{0-6}$-alkylene-;

-L$^{10}$-C$_{4-6}$-heterocyclyl, wherein the C$_{4-6}$-heterocyclyl independently contains one or two ring heteroatoms independently selected from nitrogen and oxygen; wherein in the above groups said C$_{4-6}$-heterocyclyl independently is unsubstituted, or mono-, or di-substituted wherein the substituents are independently selected from:
one or two oxo substituents each attached to a ring carbon atom in alpha position to a ring nitrogen atom (thus forming together with the nitrogen an amide group, or, in case a ring oxygen is additionally adjacent, a carbamate group, or, in case second ring nitrogen is additionally adjacent, a urea group); and/or
two methyl substituents attached to a ring carbon atom in alpha position to a ring nitrogen atom or a ring oxygen atom (thus forming together with the nitrogen a —C(CH$_3$)$_2$—N— or with the oxygen a —C(CH$_3$)$_2$—O-group); and -L$^{10}$- independently represents
—C$_{0-6}$-alkylene-, —CO—C$_{0-6}$-alkylene-, —SO$_2$—C$_{0-6}$-alkylene-; or -L$^{13}$-C$_{1-4}$-alkyl; wherein -L$^{13}$- represents —CO—, —CO—O—, or —SO$_2$—.

16) Another embodiment relates to compounds according to any one of embodiments 1) to 12), wherein the group -L-R$^5$ represents
hydrogen;
isopropyl, isobutyl;
cyclobutyl;
—CO—H;

-L$^1$—COOH; wherein -L$^1$- represents
*—CH$_2$—C(CH$_3$)$_2$—, *—CH$_2$—CH$_2$—C(CH$_3$)$_2$—, *—CH$_2$—CH$_2$—CH$_2$—C(CH$_3$)$_2$—, or *—CO—CH$_2$—C(CH$_3$)$_2$—;

-L$^2$-hydroxy; wherein -L$^2$- represents
—CH$_2$—CH$_2$—, *—CH$_2$—CH(OH)—CH$_2$—;
*—CO—NH—CH$_2$—CH$_2$—; or
*—SO$_2$—CH$_2$—CH$_2$—, -L$^3$-O—CH$_3$, or -L$^3$-O—CO—C(CH$_3$)=CH$_2$; wherein -L$^3$- represents
*—CO—NH—CH$_2$—CH$_2$—;

-L$^7$-NH$_2$, -L$^7$-NH—CH$_3$, -L$^7$-NH—CH$_2$—CH$_3$, -L$^7$-NH—CH(CH$_3$)$_2$, or -L$^7$-NH-cyclopropyl; wherein -L$^7$- represents
—CO—, or —SO$_2$—;

-L$^9$-HET$^1$; wherein -L$^9$-HET$^1$ represents

-L$^{10}$-C$_{4-6}$-heterocyclyl; wherein -L$^{10}$-C$_{4-6}$-heterocyclyl represents

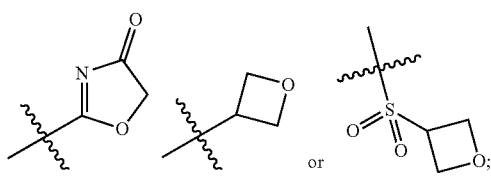 [SMILES: *C1=NC(=O)CO1 ; *C1COC1 ; *S(=O)(=O)C1COC1]

-L$^{13}$-methyl; wherein -L$^{13}$- represents —CO—, or —SO$_2$—;

wherein in the above groups the asterisks indicate the bond which is connected to the rest of the molecule.

17) Another embodiment relates to compounds according to any one of embodiments 1) to 12), wherein the group -L-R$^5$ represents —SO$_2$—NH$_2$.

18) The invention, thus, relates to compounds of the Formula (I) as defined in embodiment 1), or to such compounds further limited by the characteristics of any one of embodiments 2) to 17), under consideration of their respective dependencies; to pharmaceutically acceptable salts thereof; and to the use of such compounds as further described herein below. For avoidance of any doubt, especially the following embodiments relating to the compounds of Formula (I) are thus possible and intended and herewith specifically disclosed in individualized form:

1, 2+1, 4+1, 4+2+1, 5+1, 5+2+1, 5+4+1, 5+4+2+1, 7+1, 7+2+1, 7+4+1, 7+4+2+1, 7+5+1, 7+5+2+1, 7+5+4+1, 7+5+4+2+1, 8+1, 8+2+1, 8+4+1, 8+4+2+1, 8+5+1, 8+5+2+1, 8+5+4+1, 8+5+4+2+1, 8+7+1, 8+7+2+1, 8+7+4+1, 8+7+4+2+1, 8+7+5+1, 8+7+5+2+1, 8+7+5+4+1, 8+7+5+4+2+1, 9+1, 9+2+1, 9+4+1, 9+4+2+1, 9+5+1, 9+5+2+1, 9+5+4+1, 9+5+4+2+1, 9+7+1, 9+7+2+1, 9+7+4+1, 9+7+4+2+1, 9+7+5+1, 9+7+5+2+1, 9+7+5+4+1, 9+7+5+4+2+1, 10+1, 10+2+1, 10+4+1, 10+4+2+1, 11+1, 11+2+1, 11+4+1, 11+4+2+1, 11+5+1, 11+5+2+1, 11+5+4+1, 11+5+4+2+1, 11+7+1, 11+7+2+1, 11+7+4+1, 11+7+4+2+1, 11+7+5+1, 11+7+5+2+1, 11+7+5+4+1, 11+7+5+4+2+1, 11+8+1, 11+8+2+1, 11+8+4+1, 11+8+4+2+1, 11+8+5+1, 11+8+5+2+1, 11+8+5+4+1, 11+8+5+4+2+1, 11+8+7+1, 11+8+7+2+1, 11+8+7+4+1, 11+8+7+4+2+1, 11+8+7+5+1, 11+8+7+5+2+1, 11+8+7+5+4+1, 11+8+7+5+4+2+1, 11+9+1, 11+9+2+1, 11+9+4+1, 11+9+4+2+1, 11+9+5+1, 11+9+5+2+1, 11+9+5+4+1, 11+9+5+4+2+1, 11+9+7+1, 11+9+7+2+1, 11+9+7+4+1, 11+9+7+4+2+1, 11+9+7+5+1, 11+9+7+5+2+1, 11+9+7+5+4+1, 11+9+7+5+4+2+1, 11+10+1, 11+10+2+1, 11+10+4+1, 11+10+4+2+1, 12+1, 12+2+1, 12+4+1, 12+4+2+1, 12+5+1, 12+5+2+1, 12+5+4+1, 12+5+4+2+1, 12+7+1, 12+7+2+1, 12+7+4+1, 12+7+4+2+1, 12+7+5+1, 12+7+5+2+1, 12+7+5+4+1, 12+7+5+4+2+1, 12+8+1, 12+8+2+1, 12+8+4+1, 12+8+4+2+1, 12+8+5+1, 12+8+5+2+1, 12+8+5+4+1, 12+8+5+4+2+1, 12+8+7+1, 12+8+7+2+1, 12+8+7+4+1, 12+8+7+4+2+1, 12+8+7+5+1, 12+8+7+5+2+1, 12+8+7+5+4+1, 12+8+7+5+4+2+1, 12+9+1, 12+9+2+1, 12+9+4+1, 12+9+4+2+1, 12+9+5+1, 12+9+5+2+1, 12+9+5+4+1, 12+9+5+4+2+1, 12+9+7+1, 12+9+7+2+1, 12+9+7+4+1, 12+9+7+4+2+1, 12+9+7+5+1, 12+9+7+5+2+1, 12+9+7+5+4+1, 12+9+7+5+4+2+1, 12+10+1, 12+10+2+1, 12+10+4+1, 12+10+4+2+1, 14+1, 14+2+1, 14+4+1, 14+4+2+1, 14+5+1, 14+5+2+1, 14+5+4+1, 14+5+4+2+1, 14+7+1, 14+7+2+1, 14+7+4+1, 14+7+4+2+1, 14+7+5+1, 14+7+5+2+1, 14+7+5+4+1, 14+7+5+4+2+1, 14+8+1, 14+8+2+1, 14+8+4+1, 14+8+4+2+1, 14+8+5+1, 14+8+5+2+1, 14+8+5+4+1, 14+8+5+4+2+1, 14+8+7+1, 14+8+7+2+1, 14+8+7+4+1, 14+8+7+4+2+1, 14+8+7+5+1, 14+8+7+5+2+1, 14+8+7+5+4+1, 14+8+7+5+4+2+1, 14+9+1, 14+9+2+1, 14+9+4+1, 14+9+4+2+1, 14+9+5+1, 14+9+5+2+1, 14+9+5+4+1, 14+9+5+4+2+1, 14+9+7+1, 14+9+7+2+1, 14+9+7+4+1, 14+9+7+4+2+1, 14+9+7+5+1, 14+9+7+5+2+1, 14+9+7+5+4+1, 14+9+7+5+4+2+1, 14+10+1, 14+10+2+1, 14+10+4+1, 14+10+4+2+1, 14+11+1, 14+11+2+1, 14+11+4+1, 14+11+4+2+1, 14+11+5+1, 14+11+5+2+1, 14+11+5+4+1, 14+11+5+4+2+1, 14+11+7+1, 14+11+7+2+1, 14+11+7+4+1, 14+11+7+4+2+1, 14+11+7+5+1, 14+11+7+5+2+1, 14+11+7+5+4+1, 14+11+7+5+4+2+1, 14+11+8+1, 14+11+8+2+1, 14+11+8+4+1, 14+11+8+4+2+1, 14+11+8+5+1, 14+11+8+5+2+1, 14+11+8+5+4+1, 14+11+8+5+4+2+1, 14+11+8+7+1, 14+11+8+7+2+1, 14+11+8+7+4+1, 14+11+8+7+4+2+1, 14+11+8+7+5+1, 14+11+8+7+5+2+1, 14+11+8+7+5+4+1, 14+11+8+7+5+4+2+1, 14+11+9+1, 14+11+9+2+1, 14+11+9+4+1, 14+11+9+4+2+1, 14+11+9+5+1, 14+11+9+5+2+1, 14+11+9+5+4+1, 14+11+9+5+4+2+1, 14+11+9+7+1, 14+11+9+7+2+1, 14+11+9+7+4+1, 14+11+9+7+4+2+1, 14+11+9+7+5+1, 14+11+9+7+5+2+1, 14+11+9+7+5+4+1, 14+11+9+7+5+4+2+1, 14+11+10+1, 14+11+10+2+1, 14+11+10+4+1, 14+11+10+4+2+1, 14+12+1, 14+12+2+1, 14+12+4+1, 14+12+4+2+1, 14+12+5+1, 14+12+5+2+1, 14+12+5+4+1, 14+12+5+4+2+1, 14+12+7+1, 14+12+7+2+1, 14+12+7+4+1, 14+12+7+4+2+1, 14+12+7+5+1, 14+12+7+5+2+1, 14+12+7+5+4+1, 14+12+7+5+4+2+1, 14+12+8+1, 14+12+8+2+1, 14+12+8+4+1, 14+12+8+4+2+1, 14+12+8+5+1, 14+12+8+5+2+1, 14+12+8+5+4+1, 14+12+8+5+4+2+1, 14+12+8+7+1, 14+12+8+7+2+1, 14+12+8+7+4+1, 14+12+8+7+4+2+1, 14+12+8+7+5+1, 14+12+8+7+5+2+1, 14+12+8+7+5+4+1, 14+12+8+7+5+4+2+1, 14+12+9+1, 14+12+9+2+1, 14+12+9+4+1, 14+12+9+4+2+1, 14+12+9+5+1, 14+12+9+5+2+1, 14+12+9+5+4+1, 14+12+9+5+4+2+1, 14+12+9+7+1, 14+12+9+7+2+1, 14+12+9+7+4+1, 14+12+9+7+4+2+1, 14+12+9+7+5+1, 14+12+9+7+5+2+1, 14+12+9+7+5+4+1, 14+12+9+7+5+4+2+1, 14+12+10+1, 14+12+10+2+1, 14+12+10+4+1, 14+12+10+4+2+1, 15+1, 15+2+1, 15+4+1, 15+4+2+1, 15+5+1, 15+5+2+1, 15+5+4+1, 15+5+4+2+1, 15+7+1, 15+7+2+1, 15+7+4+1, 15+7+4+2+1, 15+7+5+1, 15+7+5+2+1, 15+7+5+4+1, 15+7+5+4+2+1, 15+8+1, 15+8+2+1, 15+8+4+1, 15+8+4+2+1, 15+8+5+1, 15+8+5+2+1, 15+8+5+4+1, 15+8+5+4+2+1, 15+8+7+1, 15+8+7+2+1, 15+8+7+4+1, 15+8+7+4+2+1, 15+8+7+5+1, 15+8+7+5+2+1, 15+8+7+5+4+1, 15+8+7+5+4+2+1, 15+9+1, 15+9+2+1, 15+9+4+1, 15+9+4+2+1, 15+9+5+1, 15+9+5+2+1, 15+9+5+4+1, 15+9+5+4+2+1, 15+9+7+1, 15+9+7+2+1, 15+9+7+4+1, 15+9+7+4+2+1, 15+9+7+5+1, 15+9+7+5+2+1, 15+9+7+5+4+1, 15+9+7+5+4+2+1, 15+10+1, 15+10+2+1, 15+10+4+1, 15+10+4+2+1, 15+11+1, 15+11+2+1, 15+11+4+1, 15+11+4+2+1, 15+11+5+1, 15+11+5+2+1, 15+11+5+4+1, 15+11+5+4+2+1, 15+11+7+1, 15+11+7+2+1, 15+11+7+4+1, 15+11+7+4+2+1, 15+11+7+5+1, 15+11+7+5+2+1, 15+11+7+5+4+1, 15+11+7+5+4+2+1, 15+11+8+1, 15+11+8+2+1, 15+11+8+4+1, 15+11+8+4+2+1, 15+11+8+5+1, 15+11+8+5+2+1, 15+11+8+5+4+1, 15+11+8+5+4+2+1, 15+11+8+7+1, 15+11+8+7+2+1, 15+11+8+7+4+1, 15+11+8+7+4+2+1, 15+11+8+7+5+1, 15+11+8+7+5+2+1, 15+11+8+7+5+4+1, 15+11+8+7+5+4+2+1, 15+11+9+1, 15+11+9+2+1, 15+11+9+4+1, 15+11+9+4+2+1, 15+11+9+5+1, 15+11+9+5+2+1, 15+11+9+5+4+1, 15+11+9+5+4+2+1, 15+11+9+7+1, 15+11+9+7+2+1, 15+11+9+7+4+1, 15+11+9+7+4+2+1, 15+11+9+7+5+1, 15+11+9+7+5+2+1, 15+11+9+7+5+4+1, 15+11+9+7+5+4+2+1, 15+11+10+1, 15+11+10+2+1, 15+11+10+4+1, 15+11+10+4+2+1, 15+12+1, 15+12+2+1, 15+12+4+1, 15+12+4+2+1, 15+12+5+1, 15+12+5+2+1, 15+12+5+4+1, 15+12+5+4+2+1, 15+12+7+1, 15+12+7+2+1, 15+12+7+4+1, 15+12+7+4+2+1, 15+12+7+5+1, 15+12+7+5+2+1, 15+12+7+5+4+1, 15+12+7+5+4+2+1, 15+12+8+1, 15+12+8+2+1, 15+12+8+4+1, 15+12+8+4+2+1, 15+12+8+5+1, 15+12+8+5+2+1,

15+12+8+5+4+1, 15+12+8+5+4+2+1, 15+12+8+7+1, 15+12+8+7+2+1, 15+12+8+7+4+1, 15+12+8+7+4+2+1, 15+12+8+7+5+1, 15+12+8+7+5+2+1, 15+12+8+7+5+4+1, 15+12+8+7+5+4+2+1, 15+12+9+1, 15+12+9+2+1, 15+12+9+4+1, 15+12+9+4+2+1, 15+12+9+5+1, 15+12+9+5+2+1, 15+12+9+5+4+1, 15+12+9+5+4+2+1, 15+12+9+7+1, 15+12+9+7+2+1, 15+12+9+7+4+1, 15+12+9+7+4+2+1, 15+12+9+7+5+1, 15+12+9+7+5+2+1, 15+12+9+7+5+4+1, 15+12+9+7+5+4+2+1, 15+12+10+1, 15+12+10+2+1, 15+12+10+4+1, 15+12+10+4+2+1, 16+1, 16+2+1, 16+4+1, 16+4+2+1, 16+5+1, 16+5+2+1, 16+5+4+1, 16+5+4+2+1, 16+7+1, 16+7+2+1, 16+7+4+1, 16+7+4+2+1, 16+7+5+1, 16+7+5+2+1, 16+7+5+4+1, 16+7+5+4+2+1, 16+8+1, 16+8+2+1, 16+8+4+1, 16+8+4+2+1, 16+8+5+1, 16+8+5+2+1, 16+8+5+4+1, 16+8+5+4+2+1, 16+8+7+1, 16+8+7+2+1, 16+8+7+4+1, 16+8+7+4+2+1, 16+8+7+5+1, 16+8+7+5+2+1, 16+8+7+5+4+1, 16+8+7+5+4+2+1, 16+9+1, 16+9+2+1, 16+9+4+1, 16+9+4+2+1, 16+9+5+1, 16+9+5+2+1, 16+9+5+4+1, 16+9+5+4+2+1, 16+9+7+1, 16+9+7+2+1, 16+9+7+4+1, 16+9+7+4+2+1, 16+9+7+5+1, 16+9+7+5+2+1, 16+9+7+5+4+1, 16+9+7+5+4+2+1, 16+10+1, 16+10+2+1, 16+10+4+1, 16+10+4+2+1, 16+11+1, 16+11+2+1, 16+11+4+1, 16+11+4+2+1, 16+11+5+1, 16+11+5+2+1, 16+11+5+4+1, 16+11+5+4+2+1, 16+11+7+1, 16+11+7+2+1, 16+11+7+4+1, 16+11+7+4+2+1, 16+11+7+5+1, 16+11+7+5+2+1, 16+11+7+5+4+1, 16+11+7+5+4+2+1, 16+11+8+1, 16+11+8+2+1, 16+11+8+4+1, 16+11+8+4+2+1, 16+11+8+5+1, 16+11+8+5+2+1, 16+11+8+5+4+1, 16+11+8+5+4+2+1, 16+11+8+7+1, 16+11+8+7+2+1, 16+11+8+7+4+1, 16+11+8+7+4+2+1, 16+11+8+7+5+1, 16+11+8+7+5+2+1, 16+11+8+7+5+4+1, 16+11+8+7+5+4+2+1, 16+11+9+1, 16+11+9+2+1, 16+11+9+4+1, 16+11+9+4+2+1, 16+11+9+5+1, 16+11+9+5+2+1, 16+11+9+5+4+1, 16+11+9+5+4+2+1, 16+11+9+7+1, 16+11+9+7+2+1, 16+11+9+7+4+1, 16+11+9+7+4+2+1, 16+11+9+7+5+1, 16+11+9+7+5+2+1, 16+11+9+7+5+4+1, 16+11+9+7+5+4+2+1, 16+11+10+1, 16+11+10+2+1, 16+11+10+4+1, 16+11+10+4+2+1, 16+12+1, 16+12+2+1, 16+12+4+1, 16+12+4+2+1, 16+12+5+1, 16+12+5+2+1, 16+12+5+4+1, 16+12+5+4+2+1, 16+12+7+1, 16+12+7+2+1, 16+12+7+4+1, 16+12+7+4+2+1, 16+12+7+5+1, 16+12+7+5+2+1, 16+12+7+5+4+1, 16+12+7+5+4+2+1, 16+12+8+1, 16+12+8+2+1, 16+12+8+4+1, 16+12+8+4+2+1, 16+12+8+5+1, 16+12+8+5+2+1, 16+12+8+5+4+1, 16+12+8+5+4+2+1, 16+12+8+7+1, 16+12+8+7+2+1, 16+12+8+7+4+1, 16+12+8+7+4+2+1, 16+12+8+7+5+1, 16+12+8+7+5+2+1, 16+12+8+7+5+4+1, 16+12+8+7+5+4+2+1, 16+12+9+1, 16+12+9+2+1, 16+12+9+4+1, 16+12+9+4+2+1, 16+12+9+5+1, 16+12+9+5+2+1, 16+12+9+5+4+1, 16+12+9+5+4+2+1, 16+12+9+7+1, 16+12+9+7+2+1, 16+12+9+7+4+1, 16+12+9+7+4+2+1, 16+12+9+7+5+1, 16+12+9+7+5+2+1, 16+12+9+7+5+4+1, 16+12+9+7+5+4+2+1, 16+12+10+1, 16+12+10+2+1, 16+12+10+4+1, 16+12+10+4+2+1, 17+1, 17+2+1, 17+4+1, 17+4+2+1, 17+5+1, 17+5+2+1, 17+5+4+1, 17+5+4+2+1, 17+7+1, 17+7+2+1, 17+7+4+1, 17+7+4+2+1, 17+7+5+1, 17+7+5+2+1, 17+7+5+4+1, 17+7+5+4+2+1, 17+8+1, 17+8+2+1, 17+8+4+1, 17+8+4+2+1, 17+8+5+1, 17+8+5+2+1, 17+8+5+4+1, 17+8+5+4+2+1, 17+8+7+1, 17+8+7+2+1, 17+8+7+4+1, 17+8+7+4+2+1, 17+8+7+5+1, 17+8+7+5+2+1, 17+8+7+5+4+1, 17+8+7+5+4+2+1, 17+9+1, 17+9+2+1, 17+9+4+1, 17+9+4+2+1, 17+9+5+1, 17+9+5+2+1, 17+9+5+4+1, 17+9+5+4+2+1, 17+9+7+1, 17+9+7+2+1, 17+9+7+4+1, 17+9+7+4+2+1, 17+9+7+5+1, 17+9+7+5+2+1, 17+9+7+5+4+1, 17+9+7+5+4+2+1, 17+10+1, 17+10+2+1, 17+10+4+1, 17+10+4+2+1, 17+11+1, 17+11+2+1, 17+11+4+1, 17+11+4+2+1, 17+11+5+1, 17+11+5+2+1, 17+11+5+4+1, 17+11+5+4+2+1, 17+11+7+1, 17+11+7+2+1, 17+11+7+4+1, 17+11+7+4+2+1, 17+11+7+5+1, 17+11+7+5+2+1, 17+11+7+5+4+1, 17+11+7+5+4+2+1, 17+11+8+1, 17+11+8+2+1, 17+11+8+4+1, 17+11+8+4+2+1, 17+11+8+5+1, 17+11+8+5+2+1, 17+11+8+5+4+1, 17+11+8+5+4+2+1, 17+11+8+7+1, 17+11+8+7+2+1, 17+11+8+7+4+1, 17+11+8+7+4+2+1, 17+11+8+7+5+1, 17+11+8+7+5+2+1, 17+11+8+7+5+4+1, 17+11+8+7+5+4+2+1, 17+11+9+1, 17+11+9+2+1, 17+11+9+4+1, 17+11+9+4+2+1, 17+11+9+5+1, 17+11+9+5+2+1, 17+11+9+5+4+1, 17+11+9+5+4+2+1, 17+11+9+7+1, 17+11+9+7+2+1, 17+11+9+7+4+1, 17+11+9+7+4+2+1, 17+11+9+7+5+1, 17+11+9+7+5+2+1, 17+11+9+7+5+4+1, 17+11+9+7+5+4+2+1, 17+11+10+1, 17+11+10+2+1, 17+11+10+4+1, 17+11+10+4+2+1, 17+12+1, 17+12+2+1, 17+12+4+1, 17+12+4+2+1, 17+12+5+1, 17+12+5+2+1, 17+12+5+4+1, 17+12+5+4+2+1, 17+12+7+1, 17+12+7+2+1, 17+12+7+4+1, 17+12+7+4+2+1, 17+12+7+5+1, 17+12+7+5+2+1, 17+12+7+5+4+1, 17+12+7+5+4+2+1, 17+12+8+1, 17+12+8+2+1, 17+12+8+4+1, 17+12+8+4+2+1, 17+12+8+5+1, 17+12+8+5+2+1, 17+12+8+5+4+1, 17+12+8+5+4+2+1, 17+12+8+7+1, 17+12+8+7+2+1, 17+12+8+7+4+1, 17+12+8+7+4+2+1, 17+12+8+7+5+1, 17+12+8+7+5+2+1, 17+12+8+7+5+4+1, 17+12+8+7+5+4+2+1, 17+12+9+1, 17+12+9+2+1, 17+12+9+4+1, 17+12+9+4+2+1, 17+12+9+5+1, 17+12+9+5+2+1, 17+12+9+5+4+1, 17+12+9+5+4+2+1, 17+12+9+7+1, 17+12+9+7+2+1, 17+12+9+7+4+1, 17+12+9+7+4+2+1, 17+12+9+7+5+1, 17+12+9+7+5+2+1, 17+12+9+7+5+4+1, 17+12+9+7+5+4+2+1, 17+12+10+1, 17+12+10+2+1, 17+12+10+4+1, 17+12+10+4+2+1.

In the list above the numbers refer to the embodiments according to their numbering provided hereinabove whereas "+" indicates the dependency from another embodiment. The different individualized embodiments are separated by commas. In other words, "16+11+9+1" for example refers to embodiment 16) depending on embodiment 11), depending on embodiment 9), depending on embodiment 1), i.e. embodiment "16+11+9+1" corresponds to the compounds of Formula (I) as defined in embodiment 1), further limited by all the structural features of the embodiments 9), 11), and 16).

19) Another embodiment relates to compounds of Formula (I) according to embodiment 1), which are selected from the following compounds:

N-(6-fluoro-4-methoxypyridin-3-yl)-3-(2-isopropylphenyl) azetidine-3-carboxamide;

3-(2-isopropylphenyl)-N-(4-methoxypyridin-3-yl)azetidine-3-carboxamide;

N-(6-chloro-4-methoxypyridin-3-yl)-3-(2-isopropylphenyl) azetidine-3-carboxamide;

N-(6-bromo-4-methoxypyridin-3-yl)-3-(2-isopropylphenyl) azetidine-3-carboxamide;

N-(6-chloro-4-ethoxypyridin-3-yl)-3-(2-isopropylphenyl) azetidine-3-carboxamide;

N-(6-chloro-4-isopropoxypyridin-3-yl)-3-(2-isopropylphenyl)azetidine-3-carboxamide;

N-(6-chloro-4-cyclopropoxypyridin-3-yl)-3-(2-isopropylphenyl)azetidine-3-carboxamide;

N-(6-chloro-4-(2-methoxyethoxy)pyridin-3-yl)-3-(2-isopropylphenyl)azetidine-3-carboxamide;

(S)—N-(6-chloro-4-((1-methoxypropan-2-yl)oxy)pyridin-3-yl)-3-(2-isopropylphenyl)azetidine-3-carboxamide;

N-(6-chloro-4-methoxypyridin-3-yl)-4-(2-isopropylphenyl) piperidine-4-carboxamide;

3-(2-isopropylphenyl)-N-(4-methoxy-6-methylpyridin-3-yl) azetidine-3-carboxamide;

3-(2-isopropylphenyl)-N-(4-methoxy-6-(trifluoromethyl) pyridin-3-yl)azetidine-3-carboxamide;

N-(6-chloro-4-methoxypyridin-3-yl)-3-(2-fluoro-6-isopropylphenyl)azetidine-3-carboxamide;

N-(6-chloro-4-methoxypyridin-3-yl)-3-(5-fluoro-2-isopropylphenyl)azetidine-3-carboxamide;

N-(6-chloro-4-methoxypyridin-3-yl)-3-(3-isopropylpyridin-2-yl)azetidine-3-carboxamide;

N-(6-chloro-4-methoxypyridin-3-yl)-3-(6-fluoro-3-isopropylpyridin-2-yl)azetidine-3-carboxamide;

N-(6-chloro-4-methoxypyridin-3-yl)-3-(2-cyclopentylphenyl)azetidine-3-carboxamide;

N-(6-chloro-4-methoxypyridin-3-yl)-1-isopropyl-3-(2-isopropylphenyl)azetidine-3-carboxamide;

N-(6-chloro-4-methoxypyridin-3-yl)-1-isobutyl-3-(2-isopropylphenyl)azetidine-3-carboxamide;

N-(6-chloro-4-methoxypyridin-3-yl)-1-(2-hydroxyethyl)-3-(2-isopropylphenyl)azetidine-3-carboxamide;

1-(2-(1H-tetrazol-5-yl)ethyl)-N-(6-chloro-4-methoxypyridin-3-yl)-3-(2-isopropylphenyl)azetidine-3-carboxamide;

1-(3-(1H-tetrazol-5-yl)propyl)-N-(6-chloro-4-methoxypyridin-3-yl)-3-(2-isopropylphenyl)azetidine-3-carboxamide;

2-(3-((6-chloro-4-methoxypyridin-3-yl)carbamoyl)-3-(2-isopropylphenyl)azetidin-1-yl)acetic acid;

1-(2-aminoethyl)-N-(6-chloro-4-methoxypyridin-3-yl)-3-(2-isopropylphenyl)azetidine-3-carboxamide;

N-(6-chloro-4-methoxypyridin-3-yl)-1-cyclobutyl-3-(2-isopropylphenyl)azetidine-3-carboxamide;

N-(6-chloro-4-methoxypyridin-3-yl)-3-(2-isopropylphenyl)-1-(oxetan-3-yl)azetidine-3-carboxamide;

N-(6-chloro-4-methoxypyridin-3-yl)-1-((1-fluorocyclopropyl)methyl)-3-(2-isopropylphenyl)azetidine-3-carboxamide;

(R)—N-(6-chloro-4-methoxypyridin-3-yl)-1-((2,2-dimethyl-1,3-dioxolan-4-yl)methyl)-3-(2-isopropylphenyl)azetidine-3-carboxamide;

(R)—N-(6-chloro-4-methoxypyridin-3-yl)-1-(2,3-dihydroxypropyl)-3-(2-isopropylphenyl)azetidine-3-carboxamide;

1-((1H-pyrazol-3-yl)methyl)-N-(6-chloro-4-methoxypyridin-3-yl)-3-(2-isopropylphenyl)azetidine-3-carboxamide;

1-((1H-pyrazol-4-yl)methyl)-N-(6-chloro-4-methoxypyridin-3-yl)-3-(2-isopropylphenyl)azetidine-3-carboxamide;

1-((1H-1,2,3-triazol-4-yl)methyl)-N-(6-chloro-4-methoxypyridin-3-yl)-3-(2-isopropylphenyl)azetidine-3-carboxamide;

methyl 4-(3-((6-chloro-4-methoxypyridin-3-yl)carbamoyl)-3-(2-isopropylphenyl)azetidin-1-yl)-2,2-dimethylbutanoate;

4-(3-((6-chloro-4-methoxypyridin-3-yl)carbamoyl)-3-(2-isopropylphenyl)azetidin-1-yl)-2,2-dimethylbutanoic acid; methyl 4-(3-((6-chloro-4-ethoxypyridin-3-yl)carbamoyl)-3-(2-isopropylphenyl)azetidin-1-yl)-2,2-dimethylbutanoate;

4-(3-((6-chloro-4-ethoxypyridin-3-yl)carbamoyl)-3-(2-isopropylphenyl)azetidin-1-yl)-2,2-dimethylbutanoic acid;

4-(3-((6-chloro-4-isopropoxypyridin-3-yl)carbamoyl)-3-(2-isopropylphenyl)azetidin-1-yl)-2,2-dimethylbutanoic acid;

methyl 4-(4-((6-chloro-4-methoxypyridin-3-yl)carbamoyl)-4-(2-isopropylphenyl)piperidin-1-yl)-2,2-dimethylbutanoate;

4-(4-((6-chloro-4-methoxypyridin-3-yl)carbamoyl)-4-(2-isopropylphenyl)piperidin-1-yl)-2,2-dimethylbutanoic acid;

4-(3-((6-bromo-4-methoxypyridin-3-yl)carbamoyl)-3-(2-isopropylphenyl)azetidin-1-yl)-2,2-dimethylbutanoic acid;

ethyl 5-(3-((6-chloro-4-methoxypyridin-3-yl)carbamoyl)-3-(2-isopropylphenyl)azetidin-1-yl)-2,2-dimethylpentanoate;

5-(3-((6-chloro-4-methoxypyridin-3-yl)carbamoyl)-3-(2-isopropylphenyl)azetidin-1-yl)-2,2-dimethylpentanoic acid;

ethyl 5-(3-((6-chloro-4-ethoxypyridin-3-yl)carbamoyl)-3-(2-isopropylphenyl)azetidin-1-yl)-2,2-dimethylpentanoate;

5-(3-((6-chloro-4-ethoxypyridin-3-yl)carbamoyl)-3-(2-isopropylphenyl)azetidin-1-yl)-2,2-dimethylpentanoic acid;

N-(6-chloro-4-methoxypyridin-3-yl)-3-(2-isopropylphenyl)-1-(2-(sulfamoylamino)ethyl)azetidine-3-carboxamide;

N-(6-chloro-4-methoxypyridin-3-yl)-1-(3-hydroxypropanoyl)-3-(2-isopropylphenyl)azetidine-3-carboxamide;

1-acetyl-N-(6-chloro-4-methoxypyridin-3-yl)-3-(2-isopropylphenyl)azetidine-3-carboxamide;

N-(6-chloro-4-methoxypyridin-3-yl)-1-formyl-3-(2-isopropylphenyl)azetidine-3-carboxamide;

N-(6-chloro-4-methoxypyridin-3-yl)-3-(2-isopropylphenyl)-1-(oxetane-3-carbonyl)azetidine-3-carboxamide;

N-(6-chloro-4-methoxypyridin-3-yl)-1-(3-hydroxyisoxazole-5-carbonyl)-3-(2-isopropylphenyl)azetidine-3-carboxamide;

N-(6-chloro-4-methoxypyridin-3-yl)-1-(5-hydroxy-1,2,4-oxadiazole-3-carbonyl)-3-(2-isopropylphenyl)azetidine-3-carboxamide;

1-(2-(2H-1,2,3-triazol-2-yl)acetyl)-N-(6-chloro-4-methoxypyridin-3-yl)-3-(2-isopropylphenyl)azetidine-3-carboxamide;

N-(6-chloro-4-methoxypyridin-3-yl)-3-(2-isopropylphenyl)-1-(2-(4-methyl-1H-1,2,3-triazol-1-yl)acetyl)azetidine-3-carboxamide;

N-(6-chloro-4-methoxypyridin-3-yl)-1-(2-(4-(hydroxymethyl)-1H-1,2,3-triazol-1-yl)acetyl)-3-(2-isopropylphenyl)azetidine-3-carboxamide;

1-(2-(2H-tetrazol-2-yl)acetyl)-N-(6-chloro-4-methoxypyridin-3-yl)-3-(2-isopropylphenyl)azetidine-3-carboxamide;

1-(2-(1H-1,2,3-triazol-1-yl)acetyl)-N-(6-chloro-4-methoxypyridin-3-yl)-3-(2-isopropylphenyl)azetidine-3-carboxamide;

N-(6-chloro-4-methoxypyridin-3-yl)-1-(2-(3-hydroxy-1H-pyrazol-4-yl)acetyl)-3-(2-isopropylphenyl)azetidine-3-carboxamide;

N-(6-chloro-4-methoxypyridin-3-yl)-1-(2-(3-hydroxy-1H-pyrazol-5-yl)acetyl)-3-(2-isopropylphenyl)azetidine-3-carboxamide;

N-(6-chloro-4-methoxypyridin-3-yl)-3-(2-isopropylphenyl)-1-(sulfamoylglycyl)azetidine-3-carboxamide;

N-(6-chloro-4-methoxypyridin-3-yl)-3-(2-isopropylphenyl)-1-((methylsulfonyl)glycyl)azetidine-3-carboxamide;

N-(6-chloro-4-methoxypyridin-3-yl)-3-(2-isopropylphenyl)-1-(2-(methylsulfonyl)acetyl)azetidine-3-carboxamide; methyl 4-(3-((6-chloro-4-methoxypyridin-3-yl)carbamoyl)-3-(2-isopropylphenyl)azetidin-1-yl)-2,2-dimethyl-4-oxobutanoate;

4-(3-((6-chloro-4-methoxypyridin-3-yl)carbamoyl)-3-(2-isopropylphenyl)azetidin-1-yl)-2,2-dimethyl-4-oxobutanoic acid;

4-(3-((6-bromo-4-methoxypyridin-3-yl)carbamoyl)-3-(2-isopropylphenyl)azetidin-1-yl)-2,2-dimethyl-4-oxobutanoic acid;

4-(4-((6-chloro-4-methoxypyridin-3-yl)carbamoyl)-4-(2-isopropylphenyl)piperidin-1-yl)-2,2-dimethyl-4-oxobutanoic acid;

4-(3-((6-chloro-4-ethoxypyridin-3-yl)carbamoyl)-3-(2-isopropylphenyl)azetidin-1-yl)-2,2-dimethyl-4-oxobutanoic acid;
4-(3-((6-fluoro-4-methoxypyridin-3-yl)carbamoyl)-3-(2-isopropylphenyl)azetidin-1-yl)-2,2-dimethyl-4-oxobutanoic acid;
N-(6-chloro-4-methoxypyridin-3-yl)-3-(2-isopropylphenyl)-1-(methylsulfonyl)azetidine-3-carboxamide;
N-(6-chloro-4-methoxypyridin-3-yl)-3-(2-isopropylphenyl)-1-((2-methoxyethyl)sulfonyl)azetidine-3-carboxamide;
N-(6-chloro-4-methoxypyridin-3-yl)-1-((2-(dimethylamino)ethyl)sulfonyl)-3-(2-isopropylphenyl)azetidine-3-carboxamide;
N-(6-chloro-4-methoxypyridin-3-yl)-3-(2-isopropylphenyl)-1-(oxetan-3-ylsulfonyl)azetidine-3-carboxamide;
N-(6-fluoro-4-methoxypyridin-3-yl)-3-(2-isopropylphenyl)-1-sulfamoylazetidine-3-carboxamide;
N-(6-chloro-4-methoxypyridin-3-yl)-3-(2-isopropylphenyl)-1-sulfamoylazetidine-3-carboxamide;
N-(6-chloro-4-ethoxypyridin-3-yl)-3-(2-isopropylphenyl)-1-sulfamoylazetidine-3-carboxamide;
N-(6-chloro-4-isopropoxypyridin-3-yl)-3-(2-isopropylphenyl)-1-sulfamoylazetidine-3-carboxamide;
N-(6-chloro-4-cyclopropoxypyridin-3-yl)-3-(2-isopropylphenyl)-1-sulfamoylazetidine-3-carboxamide;
N-(6-chloro-4-(2-methoxyethoxy)pyridin-3-yl)-3-(2-isopropylphenyl)-1-sulfamoylazetidine-3-carboxamide;
(S)—N-(6-chloro-4-((1-methoxypropan-2-yl)oxy)pyridin-3-yl)-3-(2-isopropylphenyl)-1-sulfamoylazetidine-3-carboxamide;
N-(6-chloro-4-methoxypyridin-3-yl)-4-(2-isopropylphenyl)-1-sulfamoylpiperidine-4-carboxamide;
N-(6-bromo-4-methoxypyridin-3-yl)-3-(2-isopropylphenyl)-1-sulfamoylazetidine-3-carboxamide;
3-(2-isopropylphenyl)-N-(4-methoxy-6-methylpyridin-3-yl)-1-sulfamoylazetidine-3-carboxamide;
3-(2-isopropylphenyl)-N-(4-methoxy-6-(trifluoromethyl)pyridin-3-yl)-1-sulfamoylazetidine-3-carboxamide;
N-(6-chloro-4-methoxypyridin-3-yl)-3-(2-cyclopentylphenyl)-1-sulfamoylazetidine-3-carboxamide
N-(6-chloro-4-methoxypyridin-3-yl)-3-(2-isopropylphenyl)-1-(N-methylsulfamoyl)azetidine-3-carboxamide;
N-(6-chloro-4-methoxypyridin-3-yl)-1-(N-cyclopropylsulfamoyl)-3-(2-isopropylphenyl)azetidine-3-carboxamide;
N-(6-chloro-4-methoxypyridin-3-yl)-3-(2-fluoro-6-isopropylphenyl)-1-sulfamoylazetidine-3-carboxamide;
N-(6-chloro-4-methoxypyridin-3-yl)-3-(5-fluoro-2-isopropylphenyl)-1-sulfamoylazetidine-3-carboxamide;
N-(6-chloro-4-methoxypyridin-3-yl)-3-(3-isopropylpyridin-2-yl)-1-sulfamoylazetidine-3-carboxamide;
N-(6-chloro-4-methoxypyridin-3-yl)-3-(6-fluoro-3-isopropylpyridin-2-yl)-1-sulfamoylazetidine-3-carboxamide;
3-(2-isopropylphenyl)-N-(4-methoxypyridin-3-yl)-1-sulfamoylazetidine-3-carboxamide;
N-(6-chloro-4-methoxypyridin-3-yl)-3-(2-isopropylphenyl)-1-(N-(2-methoxyethyl)sulfamoyl)azetidine-3-carboxamide;
N-(6-chloro-4-methoxypyridin-3-yl)-1-(N-(2-hydroxyethyl)sulfamoyl)-3-(2-isopropylphenyl)azetidine-3-carboxamide;
N3-(6-chloro-4-methoxypyridin-3-yl)-3-(2-isopropylphenyl)azetidine-1,3-dicarboxamide;
N3-(6-chloro-4-methoxypyridin-3-yl)-3-(2-isopropylphenyl)-N1-methylazetidine-1,3-dicarboxamide;
N3-(6-chloro-4-methoxypyridin-3-yl)-N1-ethyl-3-(2-isopropylphenyl)azetidine-1,3-dicarboxamide;
N3-(6-chloro-4-methoxypyridin-3-yl)-N1-isopropyl-3-(2-isopropylphenyl)azetidine-1,3-dicarboxamide;
(S)—N3-(6-chloro-4-((1-methoxypropan-2-yl)oxy)pyridin-3-yl)-N1-cyclopropyl-3-(2-isopropylphenyl)azetidine-1,3-dicarboxamide;
(S)—N3-(6-chloro-4-((1-methoxypropan-2-yl)oxy)pyridin-3-yl)-N1-cyclopropyl-3-(2-isopropylphenyl)azetidine-1,3-dicarboxamide;
N3-(6-chloro-4-methoxypyridin-3-yl)-N1-cyclopropyl-3-(3-isopropylpyridin-2-yl)azetidine-1,3-dicarboxamide;
2-(3-((6-chloro-4-methoxypyridin-3-yl)carbamoyl)-3-(2-isopropylphenyl)azetidine-1-carboxamido)ethyl methacrylate;
N3-(6-chloro-4-methoxypyridin-3-yl)-N1-(2-hydroxyethyl)-3-(2-isopropylphenyl)azetidine-1,3-dicarboxamide;
N3-(6-chloro-4-methoxypyridin-3-yl)-3-(2-isopropylphenyl)-N1-(2-methoxyethyl)azetidine-1,3-dicarboxamide;
ethyl (3-((6-chloro-4-methoxypyridin-3-yl)carbamoyl)-3-(2-isopropylphenyl)azetidine-1-carbonyl)glycinate;
(3-((6-chloro-4-methoxypyridin-3-yl)carbamoyl)-3-(2-isopropylphenyl)azetidine-1-carbonyl)glycine;
ethyl 3-(3-((6-chloro-4-methoxypyridin-3-yl)carbamoyl)-3-(2-isopropylphenyl)azetidine-1-carboxamido)propanoate;
3-(3-((6-chloro-4-methoxypyridin-3-yl)carbamoyl)-3-(2-isopropylphenyl)azetidine-1-carboxamido)propanoic acid;
N3-(6-chloro-4-methoxypyridin-3-yl)-3-(2-isopropylphenyl)-N1,N1-dimethylazetidine-1,3-dicarboxamide;
N-(6-chloro-4-methoxypyridin-3-yl)-3-(2-isopropylphenyl)-1-(morpholine-4-carbonyl)azetidine-3-carboxamide;
methyl 3-((6-chloro-4-methoxypyridin-3-yl)carbamoyl)-3-(2-isopropylphenyl)azetidine-1-carboxylate;
2-methoxyethyl 3-((6-chloro-4-methoxypyridin-3-yl)carbamoyl)-3-(2-isopropylphenyl)azetidine-1-carboxylate;
N-(6-chloro-4-methoxypyridin-3-yl)-3-(2-isopropylphenyl)-1-(3-methylpyridin-4-yl)azetidine-3-carboxamide;
N-(6-chloro-4-methoxypyridin-3-yl)-1-(3-fluoropyridin-4-yl)-3-(2-isopropylphenyl)azetidine-3-carboxamide;
N-(6-chloro-4-methoxypyridin-3-yl)-1-(3-fluoro-2-methylpyridin-4-yl)-3-(2-isopropylphenyl)azetidine-3-carboxamide;
N-(6-chloro-4-methoxypyridin-3-yl)-1-(5-fluoro-2-methylpyridin-4-yl)-3-(2-isopropylphenyl)azetidine-3-carboxamide;
N-(6-chloro-4-methoxypyridin-3-yl)-3-(2-isopropylphenyl)-1-(2-methylpyridin-4-yl)azetidine-3-carboxamide;
N-(6-chloro-4-methoxypyridin-3-yl)-1-(2,6-dimethylpyridin-4-yl)-3-(2-isopropylphenyl)azetidine-3-carboxamide;
N-(6-chloro-4-methoxypyridin-3-yl)-1-(4-fluoropyridin-2-yl)-3-(2-isopropylphenyl)azetidine-3-carboxamide;
N-(6-chloro-4-methoxypyridin-3-yl)-1-(5-cyanopyrimidin-2-yl)-3-(2-isopropylphenyl)azetidine-3-carboxamide;
N-(6-chloro-4-methoxypyridin-3-yl)-1-(5-fluoropyrimidin-2-yl)-3-(2-isopropylphenyl)azetidine-3-carboxamide;
N-(6-chloro-4-methoxypyridin-3-yl)-1-(5-fluoropyrimidin-4-yl)-3-(2-isopropylphenyl)azetidine-3-carboxamide;
N-(6-chloro-4-methoxypyridin-3-yl)-3-(2-isopropylphenyl)-1-(pyrimidin-4-yl)azetidine-3-carboxamide;
N-(6-chloro-4-methoxypyridin-3-yl)-3-(2-isopropylphenyl)-1-(2-methylpyrimidin-4-yl)azetidine-3-carboxamide;
N-(6-chloro-4-methoxypyridin-3-yl)-3-(2-isopropylphenyl)-1-(5-methylpyrimidin-4-yl)azetidine-3-carboxamide;

N-(6-chloro-4-methoxypyridin-3-yl)-3-(2-isopropylphenyl)-1-(6-methylpyrimidin-4-yl)azetidine-3-carboxamide;

1-(6-chloro-2-methylpyrimidin-4-yl)-N-(6-chloro-4-methoxypyridin-3-yl)-3-(2-isopropylphenyl)azetidine-3-carboxamide;

N-(6-chloro-4-methoxypyridin-3-yl)-1-(5-fluoro-2-methylpyrimidin-4-yl)-3-(2-isopropylphenyl)azetidine-3-carboxamide;

N-(6-chloro-4-methoxypyridin-3-yl)-1-(5-fluoropyrimidin-4-yl)-4-(2-isopropylphenyl)piperidine-4-carboxamide;

N-(6-chloro-4-methoxypyridin-3-yl)-1-(5-fluoro-2-methylpyrimidin-4-yl)-4-(2-isopropylphenyl)piperidine-4-carboxamide:

methyl 5-(3-((6-chloro-4-methoxypyridin-3-yl)carbamoyl)-3-(2-isopropylphenyl)azetidin-1-yl)pyrazine-2-carboxylate;

5-(3-((6-chloro-4-methoxypyridin-3-yl)carbamoyl)-3-(2-isopropylphenyl)azetidin-1-yl)pyrazine-2-carboxylic acid;

methyl 6-(3-((6-chloro-4-methoxypyridin-3-yl)carbamoyl)-3-(2-isopropylphenyl)azetidin-1-yl)nicotinate;

methyl 2-(3-((6-chloro-4-methoxypyridin-3-yl)carbamoyl)-3-(2-isopropylphenyl)azetidin-1-yl)pyrimidine-5-carboxylate;

2-(3-((6-chloro-4-methoxypyridin-3-yl)carbamoyl)-3-(2-isopropylphenyl)azetidin-1-yl)pyrimidine-5-carboxylic acid;

methyl 6-(3-((6-chloro-4-methoxypyridin-3-yl)carbamoyl)-3-(2-isopropylphenyl)azetidin-1-yl)pyridazine-3-carboxylate;

ethyl 2-(3-((6-chloro-4-methoxypyridin-3-yl)carbamoyl)-3-(2-isopropylphenyl)azetidin-1-yl)oxazole-4-carboxylate;

ethyl 2-(3-((6-chloro-4-methoxypyridin-3-yl)carbamoyl)-3-(2-isopropylphenyl)azetidin-1-yl)oxazole-4-carboxylate;

N-(6-chloro-4-methoxypyridin-3-yl)-3-(2-isopropylphenyl)-1-(1H-tetrazol-5-yl)azetidine-3-carboxamide;

N-(6-chloro-4-methoxypyridin-3-yl)-3-(2-isopropylphenyl)-1-(4-oxo-4,5-dihydrooxazol-2-yl)azetidine-3-carboxamide; and N-(6-chloro-4-methoxypyridin-3-yl)-1-(2-hydroxy-3,4-dioxocyclobut-1-en-1-yl)-3-(2-isopropylphenyl)azetidine-3-carboxamide.

The compounds of Formula (I) according to embodiments 1) to 19) and their pharmaceutically acceptable salts can be used as medicaments, e.g. in the form of pharmaceutical compositions for enteral (such especially oral e.g. in form of a tablet or a capsule) or parenteral administration (including topical application or inhalation).

The production of the pharmaceutical compositions can be effected in a manner which will be familiar to any person skilled in the art (see for example Remington, *The Science and Practice of Pharmacy,* 21st Edition (2005), Part 5, "Pharmaceutical Manufacturing" [published by Lippincott Williams & Wilkins]) by bringing the described compounds of Formula (I) or their pharmaceutically acceptable salts, optionally in combination with other therapeutically valuable substances, into a galenical administration form together with suitable, non-toxic, inert, therapeutically compatible solid or liquid carrier materials and, if desired, usual pharmaceutical adjuvants.

The present invention also relates to a method for the prevention/prophylaxis or treatment of a disease or disorder mentioned herein comprising administering to a subject a pharmaceutically active amount of a compound of Formula (I) according to embodiments 1) to 19).

For avoidance of any doubt, if compounds are described as useful for the prevention/prophylaxis or treatment of certain diseases, such compounds are likewise suitable for use in the preparation of a medicament for the prevention/prophylaxis or treatment of said diseases. Likewise, such compounds are also suitable in a method for the prevention/prophylaxis or treatment of such diseases, comprising administering to a subject (a mammal, especially a human) in need thereof, an effective amount of such compound.

The compounds of Formula (I) according to embodiments 1) to 19) are useful for the prevention and/or treatment of fibrosis (and diseases or disorders associated with fibrosis), or of other disorders mediated by $LPA_1$ receptor signalling.

The terms "fibrosis" refers to conditions that are associated with the abnormal accumulation of cells and/or fibronectin and/or collagen and/or increased fibroblast recruitment in an organ; including fibrosis of individual organs or tissues such as the heart, kidney, liver, joints, lung, pleural tissue, peritoneal tissue, skin, cornea, retina, musculoskeletal and digestive tract.

The term fibrosis may in particular be defined as comprising pulmonary fibrosis including lung diseases associated with fibrosis, including idiopathic pulmonary fibrosis; pulmonary fibrosis secondary to systemic inflammatory disease such as rheumatoid arthritis, scleroderma (systemic sclerosis; SSc), lupus (systemic lupus erythematosus; SLE); cryptogenic fibrosing alveolitis; pulmonary fibrosis secondary to sarcoidosis; iatrogenic pulmonary fibrosis including radiation induced fibrosis; silicosis (silicosis-induced pulmonary fibrosis); asbestos induced pulmonary fibrosis; and pleural fibrosis;

renal fibrosis; including renal fibrosis associated with CKD, chronic renal failure, tubulointerstitial nephritis, and/or chronic nephropathies such as (primary) glomerulonephritis and glomerulonephritis secondary to systemic inflammatory diseases such as lupus and scleroderma, diabetes, focal segmental glomerular sclerosis, IgA nephropathy, hypertension, renal allograft, and Alport syndrome;

gut fibrosis, including gut fibrosis secondary to scleroderma, and radiation induced gut fibrosis;

liver fibrosis, including cirrhosis, alcohol induced liver fibrosis, nonalcoholic steatohepatitis, biliary duct injury, primary biliary cirrhosis (also known as primary biliary cholangitis), infection or viral induced liver fibrosis (e.g. chronic HCV infection), and autoimmune hepatitis;

head and neck fibrosis, including radiation induced head and neck fibrosis;

corneal scarring, including sequelae of LASIK (laser-assisted in situ keratomileusis), corneal transplant, and trabeculectomy;

hypertrophic scarring and keloids, including burn induced or surgical hypertrophic scarring and keloids;

and other fibrotic diseases, e.g. endometriosis, spinal cord fibrosis, myelofibrosis, cardiac fibrosis, perivascular fibrosis; as well as formation of scar tissue, Peyronie's disease, abdominal or bowel adhesions, bladder fibrosis, fibrosis of the nasal passages, and fibrosis mediated by fibroblasts.

The term "prevention/prophylaxis of fibrosis" includes the prevention of fibrosis in a subject that has been exposed to one or more environmental conditions that are known to increase the risk of fibrosis of an organ or tissue, especially the risk of lung, liver or kidney fibrosis; or in a subject that has a genetic predisposition of developing fibrosis of an organ or tissue; as well as the prevention or minimization of scarring following injury including surgery.

Other disorders mediated by $LPA_1$ receptor signalling notably comprise dermatological disorders, pain, malignant and benign proliferative diseases, respiratory diseases, nervous system disorders, cardiovascular diseases, and inflammatory disorders, obesity, and insulin resistance.

The term "dermatological disorder," refers to a skin disorder. Such dermatological disorders include proliferative or inflammatory disorders of the skin such as systemic sclerosis, atopic dermatitis, bullous disorders, collagenosis, psoriasis, scleroderma, psoriatic lesions, dermatitis, contact dermatitis, eczema, urticaria, rosacea, wound healing, scarring, hypertrophic scarring, keloids, Kawasaki Disease, Sjogren-Larsso syndrome; especially systemic sclerosis.

The term "pain" refers to acute pain, chronic pain, and neuropathic pain. A particular example is fibromyalgia, especially fibromyalgia that stems from the formation of fibrous scar tissue in contractile muscles, and cancer pain.

The term "malignant and benign proliferative disease" especially refers to cancer, and the control of proliferation of tumor cells, invasion and/or metastasis of carcinomas.

The term "cancer," refers to all sorts of cancers such as carcinomas; adenocarcinomas; leukemias; sarcomas; lymphomas; myelomas; metastatic cancers; brain tumors; neuroblastomas; pancreatic cancers; gastro-intestinal cancers; lung cancers; breast cancers; prostate cancers; endometrial cancers; skin cancers; bladder cancers; head and neck cancers; neuroendocrine tumors; ovarian cancers; cervical cancers; oral tumors; nasopharyngeal tumors; thoracic cancers; and virally induced tumors. Notably the term refers to pleural mesothelioma, peritoneal mesothelioma, and bone metastases, as well as brain tumors including brain metastases, malignant gliomas, glioblastoma multiforme, medulloblastoma, meningiomas; neuroblastoma; pancreatic cancer including pancreatic adenocarcinoma/pancreatic ductal adenocarcinoma; gastro-intestinal cancers including colon carcinoma, colorectal adenoma, colorectal adenocarcinoma, metastatic colorectal cancer, familial adenomatous polyposis (FAP), gastric cancer, gallbladder cancer, cholangiocarcinoma, hepatocellular carcinoma; Kaposi's sarcoma; leukemias including acute myeloid leukemia, adult T-cell leukemia; lymphomas including Burkitt's lymphoma, Hodgkin's lymphoma, MALT lymphoma, and primary intraocular B-Cell lymphoma; lung cancer including non-small cell lung cancer; breast cancer including triple negative breast carcinoma; rhabdomyosarcoma; prostate cancer including castrate-resistant prostate cancer; esophageal squamous cancer; (oral) squamous cell carcinoma; endometrial cancer; thyroid carcinoma including papillary thyroid carcinoma; metastatic cancers; lung metastasis; skin cancer including melanoma and metastatic melanoma; bladder cancer including urinary bladder cancer, urothelial cell carcinoma; multiple myelomas; osteosarcoma; head and neck cancer; and renal carcinomas including renal cell carcinoma renal clear cell carcinoma, metastatic renal cell carcinoma, metastatic renal clear cell carcinoma; as well as neuroendocrine tumors; ovarian cancer; cervical cancer; oral tumors; nasopharyngeal tumors; thoracic cancer; choriocarcinoma; Ewing's sarcoma; and virally induced tumors.

The term "respiratory disease," refers to diseases affecting the organs that are involved in breathing, such as the nose, throat, larynx, eustachian tubes, trachea, bronchi, lungs, related muscles (e.g. diaphragm and intercostals), and nerves. Respiratory diseases include interstitial pneumonia, asthma referring to any disorder of the lungs characterized by variations in pulmonary gas flow associated with airway constriction of whatever cause (intrinsic, extrinsic, or both; allergic or non-allergic) including adult respiratory distress syndrome and allergic (extrinsic) asthma, non-allergic (intrinsic) asthma, acute severe asthma, chronic asthma, clinical asthma, nocturnal asthma, allergen-induced asthma, aspirin-sensitive asthma, exercise-induced asthma, isocapnic hyperventilation, child-onset asthma, adult-onset asthma, cough-variant asthma, occupational asthma, steroid-resistant asthma, seasonal asthma; rhinitis including seasonal allergic rhinitis, perennial allergic rhinitis; chronic obstructive pulmonary disease (COPD) including chronic bronchitis or emphysema; airway inflammation, sarcoidosis, cystic fibrosis, hypoxia, and acute lung injury and acute respiratory distress (including bacterial pneumonia induced, trauma induced, viral pneumonia induced, ventilator induced, non-pulmonary sepsis induced, and aspiration induced).

The term "nervous system disorder" refers to conditions that alter the structure or function of the brain, spinal cord or peripheral nervous system, including but not limited to Alzheimer's Disease, cerebral edema, multiple sclerosis, neuropathies, Parkinson's Disease, nervous system disorders resulting from blunt or surgical trauma (including post-surgical cognitive dysfunction and spinal cord or brain stem injury, and head injury), migraine, as well as the neurological aspects of disorders such as degenerative disk disease and sciatica.

The term "cardiovascular disease," as used herein refers to diseases affecting the heart or blood vessels or both, including but not limited to: arrhythmia (atrial or ventricular or both); atherosclerosis and its sequelae; cerebral ischemia, stroke, angina; cardiac rhythm disturbances; myocardial ischemia; myocardial infarction; cardiac or vascular aneurysm including aortic aneurysm; retinal ischemia; reperfusion injury following ischemia of the brain, heart or other organ or tissue; restenosis; peripheral obstructive arteriopathy of a limb, an organ, or a tissue; endotoxic, surgical, or traumatic shock; hypertension, valvular heart disease, heart failure, abnormal blood pressure; shock; vasoconstriction (including that associated with migraines); vascular abnormality, thrombosis, insufficiency limited to a single organ or tissue.

The term "inflammatory disorder" include psoriasis, rheumatoid arthritis, vasculitis, inflammatory bowel disease, dermatitis, osteoarthritis, inflammatory muscle disease, vaginitis, interstitial cystitis, scleroderma, eczema, allogeneic or xenogeneic transplantation (organ, bone marrow, stem cells and other cells and tissues) graft rejection, graft-versus-host disease, mixed connective tissue disease, lupus erythematosus, type I diabetes, dermatomyositis, phlebitis, Sjogren's syndrome, granulomatosis with polyangiitis (GPA, Wegener's granulomatosis), thyroiditis (e.g., Hashimoto's and autoimmune thyroiditis), myasthenia gravis, autoimmune hemolytic anemia, chronic relapsing hepatitis, allergic conjunctivitis, atopic dermatitis, sinusitis, and inflammation mediated by neutrophils.

Further disorders in which $LPA_1$ receptor plays a role notably comprise prostate and bladder disorders such as benign prostatic hyperplasia, diseases linked to eosinophil and/or basophil and/or dendritic cell and/or neutrophil and/or monocyte and/or T-cell recruitment, cardiomyopathy, myocardial remodeling, vascular remodeling, vascular permeability disorders, renal diseases, renal papillary necrosis, renal failure, tumor growth, metabolic diseases, pruritus, ocular diseases, macular degeneration, endocrine disorders, hyperthyroidism, osteoporosis, diabetes-related disease (nephropathy, retinopathy).

The present invention further relates to the compounds of the Formula (I) for use in the treatment of the diseases and disorders mentioned herein (especially for the treatment of fibrosis) wherein the compound of Formula (I) is intended to be used in combination (whether in a single pharmaceutical composition, or in separate treatment) with one or several antifibrotic agents. Examples of such antifibrotic agents include corticosteroids, immunosuppressants, B-cell antagonists, and uteroglobin.

Preparation of Compounds of Formula (I):

The compounds of Formula (I) can be prepared by well-known literature methods, by the methods given below, by the methods given in the experimental part below or by analogous methods. Optimum reaction conditions may vary with the particular reactants or solvents used, but such conditions can be determined by a person skilled in the art by routine optimisation procedures. In some cases, the order of carrying out the following reaction schemes, and/or reaction steps, may be varied to facilitate the reaction or to avoid unwanted reaction products. In the general sequence of reactions outlined below, the generic groups $R^1$, $R^2$, $R^3$, $R^4$, and L-$R^5$, are as defined for Formula (I). Other abbreviations used herein are explicitly defined, or are as defined in the experimental section. In some instances, the generic groups $R^1$, $R^2$, $R^3$, $R^4$, and L-$R^5$ might be incompatible with the assembly illustrated in the schemes below and so will require the use of protecting groups (PG). The use of protecting groups is well known in the art (see for example "Protective Groups in Organic Synthesis", T. W. Greene, P. G. M. Wuts, Wiley-Interscience, 1999; P. J. Kocienski, Protecting Groups, Thieme Stuttgart, 1994). For the purposes of this discussion, it will be assumed that such protecting groups as necessary are in place. In some cases, the final product may be further modified, for example, by manipulation of substituents to give a new final product. These manipulations may include, but are not limited to, reduction, oxidation, alkylation, acylation, hydrolysis and transition-metal catalysed cross-coupling reactions which are commonly known to those skilled in the art. The compounds obtained may also be converted into salts, especially pharmaceutically acceptable salts, in a manner known per se.

The compounds of Formula (I) can be manufactured by the methods given below, by the methods given in the experimental part or by analogous methods. Optimum reaction conditions may vary with the particular reactants or solvents used, but such conditions can be determined by a person skilled in the art by routine optimisation procedures.

Compounds of the Formula (I) of the present invention can be prepared according to the general sequence of reactions outlined below. Only a few of the synthetic possibilities leading to compounds of Formula (I) are described.

Compounds of Formula (I) are prepared by reacting a compound of Structure 1 with a compound of Structure 2 in a solvent such as DMF, THF, DCM, EtOAc etc. in the presence of one or more carboxylate activating agents such as $SOCl_2$, $(COCl)_2$, $POCl_3$, EDC, HOBt, HBTU, TBTU, DCC, CDI, T3P etc. and in the presence or absence of a base such as TEA, DIPEA, NaH, $K_2CO_3$, etc. (Montalbetti C A., Falque V. *Tetrahedron* 2005 (46) 10827-10852; Valeur E., Bradley M. *Chem. Soc. Rev.* 2009 (389) 606-31). Residue $R^3$ can be present at coupling stage or introduced at a later stage by replacing Br or Cl by an alkyl group under Negishi conditions or via a Suzuki/Hydrogenation sequence known to a person skilled in the art. (Matsushita L H., Negishi E. *J. Org. Chem.* 1982 (47) 4161-4165; Kerins, F. et al. *J. Org. Chem.* 2002 (67) 4968-4971).

In compound of Formula (I), the couplings of Structure 1 with Structure 2 may be carried out with side chain L-$R^5$=X already present or with a Structure 2 wherein N bears a protecting group =X. Functionality $R^5$ is then introduced, after deprotection, by the formation of an amine, amide, sulfonamide, carbamate, urea or sulfamide linker (L), for example, in a manner known to a person skilled in the art.

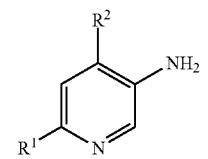

Structure 1

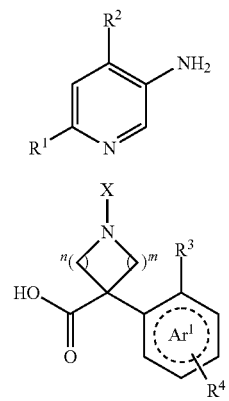

Structure 2

Compounds of Structure 1 may be commercially available or may be prepared by reducing a compound of Structure 3 in a solvent such as THF, MeOH, EtOH, iPrOH etc. in the presence of $H_2$/Pd/C or $H_2$/Pt+V/C or Fe etc. (Dolle V. et al. Tetrahedron 1997 (53) 12505-12524; Möbus K. et al. Top. Catal. 2010 (53), 1126-1131; WO2012/055995).

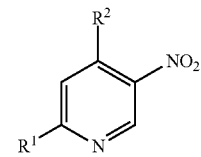

Structure 3

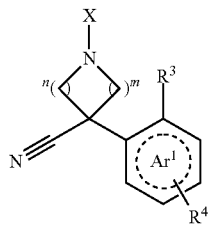

Structure 4

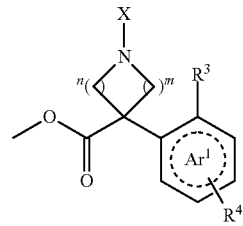

Structure 5

Compounds of Structure 2 may be prepared by reacting a compound of Structure 4 with 25% NaOH or concentrated $H_2SO_4$/AcOH or concentrated HCl at elevated temperature in a solvent such as water, EtOH etc (US20120232026; WO2005/049605; US20080319188). Compounds of Structure 2 may also be prepared by hydrolyzing a compound of Structure 5 with aqueous solution of NaOH, or LiOH etc. in a solvent such as water, MeOH, EtOH, THF etc.

Structure 6

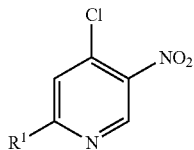

Compounds of Structure 3 may be commercially available or may be prepared (where R$^1$ represents H, halogen, methyl, trifluoromethyl) by reacting compounds of Structure 6 with alcoholate such as NaOMe, NaOiPr in a solvent such as THF, DMF etc.

Structure 7

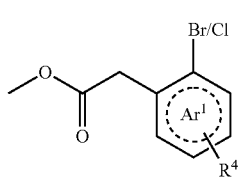

Structure 8

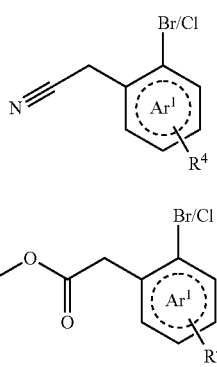

Structure 9

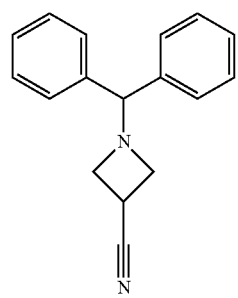

Structure 10

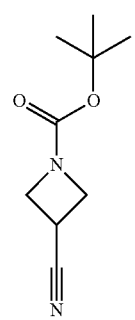

Structure 11

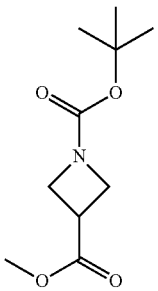

Compounds of Structure 4 and Structure 5 may be commercially available or may be prepared (for n and/or m>1) by reacting the appropriate 2-(2-halo-(hetero)aryl)acetonitrile (Structure 7) or methyl 2-(2-halo-(hetero)aryl)acetate (Structure 8), respectively, with N-benzyl-N,N-bis(2-chloroethyl)amine or N-boc-N,N-bis(2-chloroethyl)amine at 60° C. or more in a solvent such as THF and in the presence of a base such as NaOH, NaH etc. Compounds of Structure 4 and Structure 5 may also be prepared by reacting 2-(2-bromophenyl)acetonitrile with paraformaldehyde in a solvent such as DMF in the presence of a base such as K$_2$CO$_3$ followed by a TFA-catalyzed 1,3-dipolar cycloaddition with commercially available N-(methoxymethyl)-N-(trimethylsilylmethyl)benzylamine in DCM (Lit: JP2008110971). For n=m=1, compounds of Structure 4 may be synthesized by reacting a compound of Structure 9, 10 or 11 with a 1,2-dihalo-(hetero)aryl, such as 1-bromo-2-fluorobenzene, in a solvent such as THF in the presence of a base such as KHMDS (WO2012/017359). Alternatively, the bromo substituent can be replaced by R$^3$=alkyl in a following step under Negishi conditions or via a Suzuki-hydrogenation sequence known to a person skilled in the art. Structures 7 and 8 may be commercially available or may be prepared in a manner known to a person skilled in the art.

Depending on the nature of the functionalities present in residue L-R$^5$ in Formula (I), these functionalities may require temporary protection. Appropriate protecting groups are known to a person skilled in the art and include e.g. a benzyl, an acetyl, or a trialkylsilyl group to protect an alcohol, a ketal to protect a diol, an ester to protect an acid etc. These protecting groups may be employed according to standard methodology.

Whenever the compounds of Formula (I) are obtained in the form of mixtures of stereoisomers such as especially enantiomers, the stereoisomers can be separated using methods known to one skilled in the art: e.g. by formation and separation of diastereomeric salts or by HPLC over a chiral stationary phase such as a Daicel ChiralPak AD-H (5 µm) column, a Daicel ChiralCel OD-H (5 µm) column, a Daicel ChiralCel OD (10 µm) column, a Daicel ChiralPak IA or IB or IC or ID or IE (5 µm) column, Daicel ChiralPak AS-H (5 µm) column or a (R,R)-Whelk-01 (5 µm) column. Typical conditions of chiral HPLC are an isocratic mixture of eluent A (EtOH, in presence or absence of a base like TEA and/or diethylamine or of an acid like TFA) and eluent B (heptane). In Supercritical Fluid Chromatography (SFC) conditions, eluent A is CO$_2$ and eluent B is isopropanol.

Experimental Part

The following examples illustrate the invention but do not at all limit the scope thereof.

All temperatures are stated in ° C. Commercially available starting materials were used as received without further purification. Unless otherwise specified, all reactions were carried out under an atmosphere of nitrogen or argon. Compounds were purified by flash chromatography on silica gel (Biotage), by preparative TLC (TLC-plates from Merck, Silica gel 60 $F_{254}$) or by preparative HPLC. Compounds described in the invention are characterized by $^1$H-NMR (400 MHz or 500 MHz Bruker; chemical shifts are given in ppm relative to the solvent used; multiplicities: s=singlet, d=doublet, t=triplet, q=quadruplet, quint=quintuplet, hex=hexet, hept=heptet, m=multiplet, br=broad, coupling constants are given in Hz) and/or by LC-MS (retention time $t_R$ is given in min; molecular weight obtained for the mass spectrum is given in g/mol) using the conditions listed below.

LC-MS with Acidic Conditions

LCMS-1: Waters Acquity Binary, Solvent Manager, MS: Waters SQ Detector, DAD: Acquity UPLC PDA Detector, ELSD: Acquity UPLC ELSD. Columns: Acquity UPLC CSH C18 1.7 um 2.1×50 mm from Waters, thermostated in the Acquity UPLC Column Manager at 60° C. Eluents: A: H2O+0.05% formic acid; B: AcCN+0.045% FA. Method: Gradient: 2% B 98% B over 2.0 min. Flow: 1.0 mL/min. Detection: UV 214 nm and ELSD.

LCMS-2: Aligent 1100 series with mass spectrometry detection (MS: Finnigan single quadrupole). Column: Zorbax RRHD SB-Aq (1.8 um, 3.0×50 mm). Conditions: MeCN [eluent A]; water+0.04% TFA [eluent B]. Gradient: 95% B→5% B over 5 min (flow: 4.5 mL/min)

Preparative HPLC with Acidic Conditions

Prep-HPLC-1: Column: Waters Zorbax SB-Aq (5 um, 75×30 mm). Conditions: MeCN [eluent A]; water+0.5% formic acid [eluent B]. Gradient: 95% B→5% B over 5 min (flow: 75 mL/min). Detection: UV/Vis+MS Preparative HPLC with Basic Conditions Prep-HPLC-2: Column: Waters XBridge C18 (10 um, 75×30 mm). Conditions: MeCN [eluent A]; water+0.5% NH4OH [eluent B]. Gradient: 90% B→5% B over 6.5 min (flow: 75 mL/min). Detection: UV/Vis+MS Abbreviations (as Used Herein)

AcOH acetic acid
aq. aqueous
Boc tert-butoxycarbonyl
BSA bovine serum albumin
Bu butyl such as in tert.-Bu (=tertiary butyl)
CDI carbonyl diimidazole
$Cs_2CO_3$ cesium carbonate
DBU 1,8-diazabicyclo[5.4.0]undec-7-ene
DCC dicyclohexyl carbodiimide
DCM dichloromethane
DIPEA diisopropyl-ethylamine, Hünig's base, ethyl-diisopropylamine
DMA dimethylacetamide
DMF dimethylformamide
DMSO dimethylsulfoxide
EDC N-(3-dimethylaminopropyl)-N'-ethyl-carbodiimide
Et ethyl (such as in OEt: ethoxy)
EtOAc ethyl acetate
EtOH ethanol
Ex. example(s)
h hour(s)
HBTU O-(benzotriazol-1-yl)-N,N,N',N'-tetramethyluronium hexafluorophosphate
HCl hydrochloric acid
HOBt 1-hydroxybenzotriazole
HPLC high performance liquid chromatography
$H_2SO_4$ sulfuric acid
iPr isopropyl
$K_2CO_3$ potassium carbonate
LC-MS liquid chromatography-mass spectrometry
LPA lysophosphatidic acid
$LPAR_1$ lysophosphatidic receptor 1
Me methyl (such as in OMe: methoxy)
MeCN acetonitrile
MeOH methanol
$MgSO_4$ magnesium sulfate
NaH sodium hydride
NaOtBu sodium tert-butoxide
$POCl_3$ phosphoryl chloride
$Pd(OH)_2$/C palladium hydroxide in charcoal
prep. preparative
r.t. room temperature
sat. saturated
TBME tert-butyl methyl ether
TBTU 2-(1H-benzotriazole-1-yl)-1,2,3,3-tetramethyluronium tetrafluoroborate
TEA triethylamine
TFA trifluoroacetic acid
THF tetrahydrofuran
TLC thin layer chromatography
T3P propylphosphonic anhydride
$t_R$ retention time Preparation of Intermediates Intermediate 1.A:
6-chloro-4-methoxypyridin-3-amine A mixture of 2-chloro-4-methoxy-5-nitropyridine (440 mg, 2.33 mmol), ammonium chloride (624 mg, 11.7 mmol) and iron powder (526 mg, 11.7 mmol) in EtOH (12 mL) and water (1.2 mL) is heated at 80° C. for 2 days. The reaction mixture is cooled down, filtered through a Whatmann glass filter and evaporated. The residue is partitioned between EtOAc and an aq. sat. $NaHCO_3$ solution. The phases are separated. The aqueous phase is extracted with EtOAc and combined organic extracts are dried over $MgSO_4$, filtered and evaporated to give the title compound 1.A as a brownish solid (253 mg, 72%). $^1$H NMR (400 MHz, DMSO D6) δ: 7.61 (s, 1H), 6.89 (s, 1H), 5.02 (s, 2H), 3.86 (s, 3H).

Intermediate 1.B:
6-chloro-4-isopropoxypyridin-3-amine

To a solution of 2-chloro-4-isopropoxy-5-nitropyridine (1 g, 4.62 mmol) in EtOAc (40 mL) are added platinum 1% and vanadium 2%, on activated carbon (50-70% wetted powder) (75 mg) and platinum 3% on activated carbon (25 mg). The reaction mixture is hydrogenated at rt for 5 days, then filtered though a Celite pad, dried over $MgSO_4$, filtered and evaporated to give the title compound I-1.B as a yellow oil (0.87 g, quantitative yield). $^1$H NMR (400 MHz, DMSO D6) δ: 7.61 (s, 1H), 6.89 (s, 1H), 4.92 (s, 2H), 4.74 (hept, J=6.0 Hz, 1H), 1.29 (d, J=6.0 Hz, 6H).

Intermediate 1.C: (S)-6-chloro-4-((1-methoxypropan-2-yl)oxy)pyridin-3-amine

Step 1. To a solution of (S)-(+)-1-methoxy-2-propanol (162 ul, 1.63 mmol) in THF (5 mL) is added NaH (60 wt %, 93 mg, 2.33 mol). After 10 min, a solution of 2,4-dichloronitropyridine (300 m g, 1.55 mmol) is added to the suspension and the mixture is stirred at rt for 3 h. Volatiles are evaporated and the residue is taken up in EtOAc (50 mL), washed with NaHCO$_3$ (25 mL), followed with brine (25 mL), is dried over MgSO$_4$, filtered and evaporated. The crude compound is purified by prep. HLPC (Prep-HPLC-2 conditions) to give (S)-2-chloro-4-((1-methoxypropan-2-yl)oxy)-5-nitropyridine as a brown solid (198 mg, 52% yield). $^1$H NMR (400 MHz, DMSO D6) δ: 8.86 (s, 1H), 7.73 (s, 1H), 5.14 (td, J$_1$=3.6 Hz, J$_2$=6.3 Hz, 1H), 3.58-3.47 (m, 2H), 3.28 (s, 3H), 1.28 (d, J=6.3 Hz, 3H).

Step 2. (S)-2-chloro-4-((1-methoxypropan-2-yl)oxy)-5-nitropyridine (198 mg, 0.80 mmol) is reduced in analogy to intermediate I-1.A to afford (S)-6-chloro-4-((1-methoxypropan-2-yl)oxy)pyridin-3-amine I-1.C as a pale brown oil (160 mg, 92%). $^1$H NMR (400 MHz, CDCl3) δ: 7.94 (s, 1H), 6.84 (s, 1H), 4.71-4.62 (m, 1H), 3.62 (dd, J$_1$=6.4 Hz, J$_2$=10.5 Hz, 1H), 3.56 (dd, J$_1$=3.8 Hz, J$_2$=10.5 Hz, 1H), 3.41 (s, 3H), 1.40 (d, J=6.3 Hz, 3H).

Intermediate 1.D:
6-chloro-4-(2-methoxyethoxy)pyridin-3-amine

6-Chloro-4-(2-methoxyethoxy)pyridin-3-amine I-1.D is prepared in analogy to intermediate I-1.C. $^1$H NMR (400 MHz, CDCl3) δ: 7.80 (s, 1H), 6.74 (s, 1H), 4.24-4.19 (m, 2H), 3.83-3.77 (m, 2H), 3.41 (s, 3H).

Intermediate 1.E:
6-chloro-4-cyclopropoxypyridin-3-amine

6-Chloro-4-cyclopropoxypyridin-3-amine I-1.E is prepared in analogy to intermediate I-1.C. $^1$H NMR (400 MHz, CDCl3) δ: 7.69 (s, 1H), 7.02 (s, 1H), 3.85-3.65 (m, 3H), 0.90-0.75 (m, 4H).

Intermediate 1.F:
4-methoxy-6-methylpyridin-3-amine

To a solution of 6-chloro-4-methoxy-6-methyl-3-nitropyridine (190 mg, 0.92 mmol) in MeOH/THF 1:1 (20 mL) is added 10% palladium on carbon-50% wet (30 mg). The reaction mixture is hydrogenated at r.t. for 1 h, degassed with argon, then filtered though a Celite pad, dried over MgSO$_4$, filtered and evaporated. The crude material is crystallized in MeCN to give the title compound I-1.F as an off-white solid (121 mg, 95% yield). $^1$H NMR (400 MHz, DMSO D6) δ: 7.76 (s, 1H), 7.30 (s, 1H), 5.82 (s, 2H), 4.03 (s, 3H).

Intermediate 2: 1-benzhydryl-3-(2-bromophenyl)azetidine-3-carboxylic acid

Step 1. To a solution of commercially available 1-bromo-2-fluorobenzene (5 g, 28.6 mmol) in THF (60 mL) is added 1-benzhydrylazetidine-3-carbonitrile (10.6 g, 42.9 mmol) and KHMDS 95% (10.3 mL, 42.9 mmol). The reaction mixture is left stirring at r.t. overnight. The reaction mixture is then concentrated to an oil under vacuum, diluted with EtOAc (100 mL) and washed with water (2×50 mL). The organic phase is dried over MgSO$_4$ and concentrated under vacuum. The crude material is purified by prep. HPLC (Prep-HPLC-1 conditions) to afford 1-benzhydryl-3-(2-bromophenyl)azetidine-3-carbonitrile as a beige solid (7.64 g, 66% yield). $^1$H NMR (400 MHz, DMSO D6) δ: 7.70 (d, J=7.9 Hz, 1H), 7.47-7.42 (m, 6H), 7.36-7.31 (m, 5H), 7.25-7.21 (m, 2H), 4.56 (s, 1H), 3.98 (d, J=8.0 Hz, 2H), 3.49-3.42 (m, 2H).

Step 2. To a solution of 1-benzhydryl-3-(2-bromophenyl)azetidine-3-carbonitrile (7.2 g, 17.9 mmol) in ethanol (80 mL) is added NaOH 25% (40 mL). The reaction mixture is stirred at 80° C. for 3-4 days (reaction monitored by LCMS) and is then cooled down to 0° C. and acidified by aq. 2M HCl. The mixture is extracted with EtOAc (2×200 mL), dried over MgSO$_4$, filtered and evaporated. The crude material is purified by column chromatography (eluent: DCM/MeOH 9:1) to give 1-benzhydryl-3-(2-bromophenyl)azetidine-3-carboxylic acid I-2 as yellow foam (6.37 g, 84% yield). LCMS-2: t$_R$=0.83 min, [M+1]$^+$ 423.99; $^1$H NMR (400 MHz, DMSO D6) δ: 7.54 (d, J=7.8 Hz, 1H), 7.43-7.41 (m, 4H), 7.37 (d, J=4.2 Hz, 2H), 7.29 (t, J=7.3 Hz, 4H), 7.21-7.17 (m, 3H), 4.47 (s, 1H), 3.88 (d, J=7.8 Hz, 2H), 3.36 (d, J=7.7 Hz, 2H).

Intermediate 3:
1-benzhydryl-3-(2-bromophenyl)azetidine-3-carbonyl chloride

1-Benzhydryl-3-(2-bromophenyl)azetidine-3-carboxylic acid I-3 (538 mg, 1.38 mmol) is dissolved in DCM (10 mL). Three drops of DMF are added followed by thionyl chloride (0.5 mL, 6.9 mmol) and the reaction is stirred at 50° C. for 1 h (monitored by LCMS). The reaction mixture is then evaporated to give crude 1-benzhydryl-3-(2-bromophenyl)azetidine-3-carbonyl chloride I-3 as a wax (620 mg) that is used a such.

Intermediate 4: 1-(tert-butoxycarbonyl)-4-(2-isopropylphenyl)piperidine-4-carboxylic acid Step 1. A mixture of commercially available 2-bromophenylacetonitrile (10 g, 51 mmol) and tetrabutylammonium hydrogen sulfate (1.77 g, 5.1 mmol) in 60 mL of THF and 90 mL of 50% aqueous NaOH solution is heated at reflux for 10 min. Thereafter N-benzyl-N,N-bis(2-chloroethyl)amine hydrochloride (15 g, 56.1 mmol) are added at r.t. and the mixture is refluxed overnight. Cooling to r.t. is followed by dilution with water (120 mL) and extraction with EtOAc (2×200 mL). The combined organic extracts are washed with brine (100 mL), dried with MgSO$_4$, and concentrated in vacuo. The crude compound is crystallized in acetonitrile to give 1-benzyl-4-(2-bromophenyl)piperidine-4-carbonitrile (12.6 g, 69% yield) as white crystalline solid. $^1$H NMR (500 MHz, DMSO D6) δ: 7.75 (dd, J$_1$=1.3 Hz, J$_2$=7.9 Hz, 1H), 7.55 (dd, J$_1$=1.6 Hz, J$_2$=8.1 Hz, 1H), 7.48 (td, J$_1$=1.3 Hz, J$_2$=7.4 Hz, 1H), 7.35-7.32 (m, 5H), 7.30-7.25 (m, 1H), 3.58 (s, 2H), 3.01-2.98 (m, 1H), 2.98-2.95 (m, 1H), 2.54-2.52 (m, 2H), 2.43-2.39 (m, 2H), 2.00 (td, J$_1$=3.4 Hz, J$_2$=12.8 Hz, 2H).

Step 2. A mixture of 1-benzyl-4-(2-bromophenyl)piperidine-4-carbonitrile (29.4 g, 82.9 mmol), acetic acid (75 mL) and concentrated sulfuric acid (75 mL) in water (75 mL) is stirred at reflux for 4 days (reaction monitored by LCMS). The reaction mixture is then diluted with water (50 mL) and 25% aqueous solution HCl (50 mL) and is stirred for 15 min. TBME (100 mL) is added. The mixture is stirred for another 15 min and is stored at 4° C. overnight. The white precipitate is filtered, rinsed with TBME and dried in vacuo to give 1-benzyl-4-(2-bromophenyl)piperidine-4-carboxylic acid (22.1 g, 71% yield) as a white powder. LCMS-2: t$_R$=0.72 min, [M+1]+374.17 and 376.18.

Step 3. 1-Benzyl-4-(2-bromophenyl)piperidine-4-carboxylic acid (10 g, 26.7 mmol) and isopropenyl boronic acid pinacolester (15.1 mL, 80.2 mmol) are dissolved in dioxane (120 mL) and water (60 mL). Tripotassium phosphate (29.9 g, 134 mmol) is then added followed by palladium acetate (300 mg, 1.34 mmol) and di(1-adamantyl)-n-butylphosphine (969 mg, 2.67 mmol). The degassed reaction mixture is heated at 100° C. overnight (reaction monitored by LCMS). The reaction is diluted with EtOAc (200 mL) and extracted with 2N HCl (20 mL). The acidic aqueous phase is extracted with EtOAc (3×150 mL). All organic phases are combined (650 mL), washed with brine (20 mL), dried over $MgSO_4$, filtered and evaporated to give the crude compound that is purified by prep. HPLC (Prep-HPLC-2 conditions) to give 1-benzyl-4-(2-(prop-1-en-2-yl)phenyl)piperidine-4-carboxylic acid as a beige solid (8.4 g, 93% yield). $^1$H NMR (400 MHz, DMSO D6) δ: 12.70 (s, 1H), 7.44 (d, J=7.9 Hz, 1H), 7.33-7.18 (m, 7H), 7.01 (dd, $J_1$=1.2 Hz, $J_2$=7.3 Hz, 1H), 5.10 (s, 1H), 4.71 (s, 1H), 2.43-2.38 (m, 4H), 2.34-2.31 (m, 2H), 2.13-2.11 (m, 2H), 2.01 (s, 3H).

Step 4. A degassed mixture of 1-benzyl-4-(2-(prop-1-en-2-yl)phenyl)piperidine-4-carboxylic acid (8.4 g, 24.8 mmol) and Pd/C 10%-50% water (2 g) in MeOH/THF 1:1 (200 mL) is hydrogenated at r.t. for 4 days (reaction monitored by LC-MS). The mixture is degassed with argon, filtered on Celite pad, rinsed with THF, dried over $MgSO_4$ and evaporated to give 4-(2-isopropylphenyl)piperidine-4-carboxylic acid (5.6 g, 92% yield) as a white solid. $^1$H NMR (400 MHz, DMSO D6) δ: 9.06 (s br, 1H), 7.38 (dd, $J_1$=1.4 Hz, $J_2$=7.8 Hz, 1H), 7.31-7.27 (m, 2H), 7.24-7.16 (m, 1H), 3.44 (s br, 1H), 3.27-3.12 (m, 5H), 2.38 (m, 2H), 2.20-2.12 (m, 2H), 1.14 (d, J=6.7 Hz, 6H).

Step 5. A mixture of 4-(2-isopropylphenyl)piperidine-4-carboxylic acid (5.65 g, 23.2 mmol), DIPEA (13.6 mL, 79.7 mmol) and Boc$_2$O (4.8 g, 21.9 mmol) is stirred at r.t. for 24 h. Water is then added followed by 1N HCl in order to adjust the pH to 1. The reaction mixture is extracted four times with DCM (4×200 mL). The combined extracts are dried over $MgSO_4$, dried, filtered and evaporated to give 1-(tert-butoxycarbonyl)-4-(2-isopropylphenyl)piperidine-4-carboxylic acid I-4 (9 g, quantitative yield) as a yellow oil. $^1$H NMR (400 MHz, DMSO D6) δ: 12.73 (s, 1H), 7.36-7.31 (m, 2H), 7.26-7.23 (m, 1H), 7.18-7.14 (m, 1H), 3.75-3.65 (m, 2H), 3.32-3.25 (m, 3H), 2.28-2.20 (m, 2H), 1.89-1.77 (m, 2H), 1.41 (s, 9H), 1.14 (d, J=6.6 Hz, 6H).

Alternatively, I-4 can be prepared from commercial available 4-(2-bromophenyl)-1-(tert-butoxycarbonyl)piperidine-4-carboxylic acid Step 1. 1-(tert-Butoxycarbonyl)-4-(2-(prop-1-en-2-yl)phenyl)piperidine-4-carboxylic acid is prepared from commercial available 4-(2-bromophenyl)-1-(tert-butoxycarbonyl)piperidine-4-carboxylic acid following the methodology described for I-4 in step 3 (59% yield). $^1$H NMR (400 MHz, DMSO D6) δ: 7.44 (dd, $J_1$=1.5 Hz, $J_2$=8.0 Hz, 1H), 7.30-7.22 (m, 2H), 7.05 (dd, $J_1$=1.8 Hz, $J_2$=7.2 Hz, 1H), 5.14 (t, J=1.6 Hz, 1H), 4.75 (d, J=1.0 Hz, 1H), 3.54-3.48 (m, 2H), 3.32-3.15 (m, 2H), 2.27-2.23 (m, 2H), 2.06-2.00 (m, 5H).

Step 2. A degassed mixture of 1-(tert-butoxycarbonyl)-4-(2-(prop-1-en-2-yl)phenyl)piperidine-4-carboxylic acid (986 mg, 2.85 mmol) and Pd/C 10%-50% water (100 mg) in MeOH/THF 1:1 (60 mL) is hydrogenated at r.t. for 1 h (reaction monitored by LC-MS). The mixture is degassed with argon, filtered on Celite pad, rinsed with THF, dried over $MgSO_4$ and evaporated to give 1-(tert-butoxycarbonyl)-4-(2-isopropylphenyl)piperidine-4-carboxylic acid I-4 as a white foam (923 mg, 93% yield).

Intermediate 5: 1-benzyl-3-(2-bromophenyl)pyrrolidine-3-carboxylic acid

Step 1. Paraformaldehyde (2.17 ml, 14.8 mmol) and $K_2CO_3$ (1.37 g, 9.9 mmol) are added to a solution of commercially available 2-bromophenylacetonitrile (1.32 mL, 9.9 mmol) in DMF (60 mL). The reaction is stirred at 80° C. for 1 night. After cooling to r.t., water (100 mL) is added and the aqueous layer is extracted with EtOAc (150 mL, 50 mL). The combined organic extracts are washed with brine, dried over $MgSO_4$, filtered and evaporated. The crude compound is purified by prep. HLPC (Prep-HPLC-2 conditions) to give 2-(2-bromophenyl)acrylonitrile (561 mg, 27% yield) as an orange oil. $^1$H NMR (400 MHz, DMSO D6) δ: 7.77-7.74 (m, 1H), 7.53-7.48 (m, 2H), 7.42 (ddd, $J_1$=2.9 Hz, $J_2$=6.3 Hz, $J_3$=8.0 Hz, 1H), 6.61 (s, 1H), 6.36 (s, 1H).

Step 2. 2-(2-Bromophenyl)acrylonitrile (461 mg, 2.22 mmol) and N-(methoxymethyl)-N-(trimethylsilylmethyl)benzylamine (1.18 mL, 4.43 mmol) are dissolved in DCM (10 mL). To this solution TFA (208 uL, 2.66 mmol) is added under ice-cooling. After returning to rt, the reaction is stirred for overnight. The reaction mixture is then poured into water (25 mL) and extracted with DCM (2×50 mL). The combined organic extracts are washed with $NaHCO_3$, followed with brine, is dried over $MgSO_4$, filtered and evaporated. The crude compound is purified by prep. HLPC (Prep-HPLC-2 conditions) to give 1-benzyl-3-(2-bromophenyl)pyrrolidine-3-carbonitrile (495 mg, 65% yield) as a yellow oil. LCMS-2: $t_R$=0.74 min, [M+1]$^+$ 341.22 and 343.20.

Step 3. 1-Benzyl-3-(2-bromophenyl)pyrrolidine-3-carbonitrile (495 mg, 1.45 mmol) is subjected to the hydrolysis conditions described for I-4 to give 1-benzyl-3-(2-bromophenyl)pyrrolidine-3-carboxylic acid I-5 as a beige solid (293 mg, 56% yield). LCMS-2: $t_R$=0.64 min, [M+1]$^+$ 360.16 and 362.16.

Intermediate 6: 1-(tert-butoxycarbonyl)-3-(2-isopropylphenyl)azetidine-3-carboxylic acid Step 1. To a solution of I-2 (5.0 g, 11.8 mmol) in MeOH (30 mL) is added conc. sulfuric acid (10 mL). The reaction mixture is stirred at 75° C. for 24 h and is then evaporated. The residue is dissolved in EtOAc (100 mL) and washed with sat. $NaHCO_3$. The phases are separated and the organic phase is washed with brine (50 mL), dried over $MgSO_4$, filtered and evaporated. The crude compound is purified by chromatography (CombiFlash Hept/EtOAc 9:1) to methyl 1-benzhydryl-3-(2-bromophenyl)azetidine-3-carboxylate as yellow oil (4.12 g, 80% yield). $^1$H NMR (400 MHz, CDCl3) δ: 7.54 (dd, $J_1$=1.1 Hz, $J_2$=8.0 Hz, 1H), 7.49-7.41 (m, 4H), 7.38-7.32 (m, 1H), 7.32-7.26 (m, 5H), 7.24-7.19 (m, 2H), 7.17 (td, $J_1$=1.9 Hz, $J_2$=7.9 Hz, 1H), 4.43 (s, 1H), 4.08 (d, J=8.3 Hz, 2H), 3.74 (s, 3H), 3.51 (d, J=8.2 Hz, 2H).

Step 2. To a solution of methyl 1-benzhydryl-3-(2-bromophenyl)azetidine-3-carboxylate (4.12 g, 9.44 mmol) in dioxane (50 mL) is added isopropenyl boronic acid pinacolester (2.5 g, 14.2 mmol) followed by $K_2CO_3$ (6.5 g) and water (25 mL). Pd(PPh$_3$)$_4$ (327 mg, 0.28 mmol) is then added and the reaction mixture is stirred at 80° C. for 15 h. Water is added at r.t. and the reaction mixture is extracted with EtOAc. The organic extract is dried over $MgSO_4$, filtered and evaporated. Crude product is purified by chromatography (Combiflash, Hept/EtOAc 9:1) to give methyl 1-benzhydryl-3-(2-(prop-1-en-2-yl)phenyl)azetidine-3-carboxylate as a yellow oil (3.64 g, 97% yield). $^1$H NMR (400 MHz, DMSO D6) δ: 7.40-7.38 (m, 4H), 7.30-7.23 (m, 7H), 7.21-7.17 (m, 2H), 7.12-7.10 (m, 1H), 5.06 (s, 1H), 4.59 (s, 1H), 4.42 (s, 1H), 3.82 (d, J=7.7 Hz, 2H), 3.66 (s, 3H), 3.21 (d, J=7.7 Hz, 2H), 1.92 (s, 3H).

Step 3. To a solution of methyl 1-benzhydryl-3-(2-(prop-1-en-2-yl)phenyl)azetidine-3-carboxylate (3.64 g, 9.16 mmol) in MeOH/THF 1:1 (20 mL) is added aq. 2M LiOH (10 mL). The reaction mixture is stirred at 50° C. for 2 days, then cooled to 5° C. and acidified to pH 4 with 2M HCl. The reaction mixture is extracted with EtOAc. The organic extract is dried over MgSO$_4$, filtered and evaporated to give 1-benzhydryl-3-(2-(prop-1-en-2-yl)phenyl)azetidine-3-carboxylic acid as a beige solid (3.35 g, 95% yield). $^1$H NMR (400 MHz, DMSO D6) δ: 7.39 (d, J=7.3 Hz, 4H), 7.28 (t, J=7.4 Hz, 4H), 7.23-7.17 (m, 5H), 7.11-7.09 (m, 1H), 5.06 (s, 1H), 4.71 (s, 1H), 4.39 (s, 1H), 3.82 (d, J=7.6 Hz, 2H), 3.14 (d, J=7.5 Hz, 2H), 1.95 (s, 3H).

Step 4. A mixture of 1-benzhydryl-3-(2-(prop-1-en-2-yl)phenyl)azetidine-3-carboxylic acid (3.35 g, 8.74 mmol), 25% HCl solution (18 mL) and Pd(OH)$_2$/C 20% (1.6 g) in MeOH (100 mL) is degassed and is then hydrogenated at 1 bar for 18 h (reaction monitored by LCMS). The reaction mixture is then degassed with argon and is filtered on Celite pad which is rinsed with MeOH. Volatiles are evaporated and the residue is crystallized in MeCN to give hydrochloride of 3-(2-isopropylphenyl)azetidine-3-carboxylic acid as a white solid (1.17 g, 61% yield). $^1$H NMR (400 MHz, DMSO D6) δ: 13.55 (s br, 1H), 9.40 (s br, 1H), 9.15 (s br, 1H), 7.39 (d, J=6.9 Hz, 1H), 7.34 (t, J=7.2 Hz, 1H), 7.24 (t, J=7.0 Hz, 1H), 7.18 (d, J=7.6 Hz, 1H), 4.57-4.54 (m, 2H), 4.39-4.35 (m, 2H), 1.13 (d, J=6.7 Hz, 6H).

Step 5. To a suspension of 3-(2-isopropylphenyl)azetidine-3-carboxylic acid hydrochloride (1.17 g, 4.57 mmol) in DCM (25 mL) is added DIPEA (5.9 mL, 34.4 mmol) followed by Boc$_2$O (1.1 g, 5.02 mmol). The mixture stirred at room temperature for 24 h. 1N HCl is added at 5° C. in order to adjust the pH to 1, and the reaction mixture is extracted with DCM (4 times). The combined organic extracts are dried over MgSO$_4$, filtered and evaporated. The residue is purified by chromatography (CombiFlash Hept/EtOAc 1.5:1) to give 1-(tert-butoxycarbonyl)-3-(2-isopropylphenyl)azetidine-3-carboxylic acid I-6 as a white solid (0.85 g, 58% yield). $^1$H NMR (400 MHz, CDCl3) δ: 7.36-7.31 (m, 2H), 7.26-7.21 (m, 1H), 7.18 (d, J=7.0 Hz, 1H), 4.64 (d, J=8.5 Hz, 2H), 4.37 (d, J=8.5 Hz, 2H), 2.61-2.51 (m, 1H), 1.46 (s, 9H), 1.19 (d, J=6.7 Hz, 6H).

Intermediate 7: 1-(tert-butoxycarbonyl)-3-(2-fluoro-6-isopropylphenyl)azetidine-3-carboxylic acid Intermediate I-7 is prepared from 1-bromo-2,3-difluorobenzene according to the method described for intermediate I-6. $^1$H NMR (400 MHz, CDCl3) δ: 7.24 (dd, J$_1$=13.8 Hz, J$_2$=7.9 Hz, 1H), 7.10 (d, J=7.8 Hz, 1H), 6.86 (dd, J$_1$=11.3 Hz, J$_2$=8.3 Hz, 1H), 4.58 (d, J=8.6 Hz, 2H), 4.32 (d, J=8.6 Hz, 2H), 2.64-2.54 (m, 1H), 1.45 (s, 9H), 1.19 (d, J=6.6 Hz, 6H).

Intermediate 8: 1-(tert-butoxycarbonyl)-3-(5-fluoro-2-isopropylphenyl)azetidine-3-carboxylic acid Intermediate I-8 is prepared from 1-bromo-2,4-difluorobenzene according to the method described for intermediate I-6. $^1$H NMR (400 MHz, CDCl3) δ: 10.30 (s br, 1H), 7.30-7.24 (m, 1H), 7.02 (td, J$_1$=2.5 Hz, J$_2$=8.3 Hz, 1H), 6.87 (dd, J$_1$=2.6 Hz, J$_2$=10.1 Hz, 1H), 4.62 (d, J=8.6 Hz, 2H), 4.31 (d, J=8.6 Hz, 2H), 2.61-2.51 (m, 1H), 1.45 (s, 9H), 1.15 (d, J=6.7 Hz, 6H).

Intermediate 9: 1-(tert-butoxycarbonyl)-3-(2-cyclopentylphenyl)azetidine-3-carboxylic acid 1-(tert-Butoxycarbonyl)-3-(2-cyclopentylphenyl)azetidine-3-carboxylic acid I-9 is prepared in analogy to I-6 starting from 1-benzhydryl-3-(2-bromophenyl)azetidine-3-carbonitrile and cyclopenten-1-ylboronic acid. $^1$H NMR (400 MHz, DMSO D6) δ: 13.15-12.90 (s br, 1H), 7.33 (d, J=7.6 Hz, 1H), 7.30-7.24 (m, 1H), 7.22 (d, J=7.6 Hz, 1H), 7.20-7.14 (m, 1H), 4.42 (d, J=7.9 Hz, 2H), 4.21 (d, J=7.9 Hz, 2H), 2.63-2.53 (m, 1H), 1.98-1.89 (m, 2H), 1.83-1.74 (m, 2H), 1.65-1.59 (m, 2H), 1.52-1.45 (m, 2H), 1.39 (s, 9H).

Intermediate 10: 3-(3-bromopyridin-2-yl)-1-(tert-butoxycarbonyl)azetidine-3-carboxylic acid 3-(3-Bromopyridin-2-yl)-1-(tert-butoxycarbonyl)azetidine-3-carboxylic acid I-10 is prepared in analogy to the procedure described for I-6 starting from 1-Boc-3-cyanoazetidine and 3-bromo-2-fluoropyridine. $^1$H NMR (400 MHz, DMSO D6) δ: 8.45 (dd, J$_1$=1.4 Hz, J$_2$=4.7 Hz, 1H), 7.91 (dd, J$_1$=1.4 Hz, J$_2$=7.9 Hz, 1H), 7.14 (dd, J$_1$=4.7 Hz, J$_2$=7.9 Hz, 1H), 4.31-4.16 (m, 4H), 1.37 (s, 9H).

Intermediate 11: 1-(tert-butoxycarbonyl)-3-(6-fluoro-3-isopropylpyridin-2-yl)azetidine-3-carboxylic acid 1-(tert-Butoxycarbonyl)-3-(6-fluoro-3-isopropylpyridin-2-yl)azetidine-3-carboxylic acid I-11 is prepared in analogy to I-6 starting from ethyl 1-Boc-azetidine-3-carboxylate and 3-bromo-2,6-difluoropyridine. $^1$H NMR (400 MHz, DMSO D6) δ: 8.02 (t, J=8.3 Hz, 1H), 7.15 (dd, J$_1$=2.5 Hz, J$_2$=8.8 Hz, 1H), 4.42-4.27 (m, 4H), 2.48-2.42 (m, 1H), 1.39 (s, 9H), 1.14 (d, J=6.6 Hz, 6H).

Intermediate 12: 1-(tert-butoxycarbonyl)-3-(3-chloropyridin-4-yl)azetidine-3-carboxylic acid 1-(Tert-butoxycarbonyl)-3-(3-chloropyridin-4-yl)azetidine-3-carboxylic acid I-12 is prepared in analogy to the procedure described for I-6 starting from 1-Boc-3-cyanoazetidine and 3-chloro-4-cyanopyridine. $^1$H NMR (400 MHz, DMSO D6) δ: 8.42 (s, 1H), 8.38 (d, J=4.9 Hz, 1H), 7.33 (d, J=4.9 Hz, 1H), 4.44-4.19 (m, 4H), 1.37 (s, 9H).

Intermediate 13: 1-benzyl-4-(2-bromopyridin-3-yl)piperidine-4-carboxylic acid

1-Benzyl-4-(2-bromopyridin-3-yl)piperidine-4-carboxylic acid I-13 is prepared according to the procedure described for intermediate I-4. LCMS-2: t$_R$=0.55 min, [M+1]$^+$ 374.99 and 377.06.

Intermediate 14: 1-benzyl-4-(4-chloropyridin-3-yl)piperidine-4-carboxylic acid

1-Benzyl-4-(4-chloropyridin-3-yl)piperidine-4-carboxylic acid I-14 is prepared according to the procedure described for intermediate I-4. LCMS-2: t$_R$=0.49 min, [M+1]$^+$ 331.11.

Intermediate 15: 1-(tert-butoxycarbonyl)-3-(3-chloropyrazin-2-yl)azetidine-3-carboxylic acid 1-(tert-Butoxycarbonyl)-3-(3-chloropyrazin-2-yl)azetidine-3-carboxylic acid I-15 is prepared in analogy to procedure described for I-6 starting from 1-Boc-3-cyanoazetidine and 2,3-dichloropyrazine. $^1$H NMR (400 MHz, DMSO D6) δ: 8.70 (d, J=2.5 Hz, 1H), 8.52 (d, J=2.5 Hz, 1H), 4.49 (d, J=8.6 Hz, 2H), 4.41-4.25 (m, 2H), 1.37 (s, 9H).

Intermediate 16: 4-(5-bromopyrimidin-4-yl)-1-(tert-butoxycarbonyl)piperidine-4-carboxylic acid 4-(5-Bromopyrimidin-4-yl)-1-(tert-butoxycarbonyl)piperidine-4-carboxylic acid I-16 can be prepared in analogy to the procedure described in WO2009051715 starting from tert-butyl bis(2-chloroethyl)carbamate and 2-(5-chloropyrimidin-4-yl)acetonitrile.

Intermediate 17: 4-(4-bromopyrimidin-5-yl)-1-(tert-butoxycarbonyl)piperidine-4-carboxylic acid 4-(4-Bromopyrimidin-5-yl)-1-(tert-butoxycarbonyl)piperidine-4-carboxylic acid I-17 can be prepared in analogy to the procedure described in WO2009051715 starting from tert-butyl bis(2-chloroethyl)carbamate and 2-(4-bromopyrimidin-5-yl)acetonitrile. 2-(4-Bromopyrimidin-5-yl)acetonitrile can be synthesized by nucleophilic substitution of sodium cyanide on 4-bromo-5-(bromomethyl)pyrimidine.

EXAMPLES

Example 1: N-(6-fluoro-4-methoxypyridin-3-yl)-3-(2-isopropylphenyl)azetidine-3-carboxamide Step 1. To a solution of 1-(tert-butoxycarbonyl)-3-(2-isopropylphenyl)azetidine-3-carboxylic acid I-6 (110 mg, 0.34 mmol) and DMF (0.3 mL) in pyridine (3 mL) is added POCl$_3$ (47 uL, 0.52 mmol) drop wise over 35 min (complete conversion into its acyl chloride is monitored by LCMS with MeOH quench). Next, a solution of 6-fluoro-4-methoxypyridin-3-amine (50.5 mg, 0.34 mmol) in pyridine (1 mL) is added to the reaction mixture. After a few hours, the mixture is quenched with water, followed by NaHCO$_3$. The aqueous solution is then extracted with EtOAc twice. The combined organic extracts are dried over MgSO$_4$, filtered and evaporated. The crude product is purified by prep. HPLC (Prep-HPLC-2 conditions) to give tert-butyl 3-((6-fluoro-4-methoxypyridin-3-yl)carbamoyl)-3-(2-isopropylphenyl)azetidine-1-carboxylate (77 mg, 50% yield) as a pale yellow oil. LCMS-1: $t_R$=1.28 min, [M+1]$^+$ 444.20.

Step 2. To a solution of tert-butyl 3-((6-fluoro-4-methoxypyridin-3-yl)carbamoyl)-3-(2-isopropylphenyl)azetidine-1-carboxylate (76 mg, 0.17 mmol) in dioxane (2 mL) is added HCl 4N in dioxane (0.5 mL). The reaction mixture is stirred at r.t. overnight. Volatiles are evaporated to give the hydrochloride of the title compound Ex 1 as a white solid (70 mg, quantitative yield). LCMS-1: $t_R$=0.58 min, [M+1]$^+$ 344.28. $^1$H NMR (400 MHz, DMSO D6) δ: 8.58 (s, 1H), 8.21 (s, 1H), 7.49-7.40 (m, 3H), 7.34 (t, J=7.3 Hz, 1H), 6.90 (s, 1H), 4.66 (d, J=10.4 Hz, 2H), 4.40 (d, J=10.4 Hz, 2H), 3.74 (s, 3H), 2.50-2.40 (m, 1H), 1.12 (d, J=6.5 Hz, 6H).

TABLE 1

Examples 2 to 17
Examples 2 to 17 are prepared in analogy to the methodology described for Ex 1 using commercially available or synthesized pyridin-3-amine and intermediate I-4, I-6, I-7, I-8, I-9, I-10, or I-11. In case I-10 is used, the Suzuki/Hydrogenation (PtO$_2$/H$_2$) sequence is performed to introduce the iPr unit after the amide coupling.

| Example | Name | Analytics LCMS-1 |
| --- | --- | --- |
| Ex 2 | 3-(2-isopropylphenyl)-N-(4-methoxypyridin-3-yl)azetidine-3-carboxamide | [M + 1]$^+$ 326.21 $t_R$ 0.35 |
| Ex 3 | N-(6-chloro-4-methoxypyridin-3-yl)-3-(2-isopropylphenyl)azetidine-3-carboxamide | [M + 1]$^+$ 360.24 $t_R$ 0.62 |
| Ex 4 | N-(6-bromo-4-methoxypyridin-3-yl)-3-(2-isopropylphenyl)azetidine-3-carboxamide | [M + 1]$^+$ 404.22 and 406.22 $t_R$ 0.64 |
| Ex 5 | N-(6-chloro-4-ethoxypyridin-3-yl)-3-(2-isopropylphenyl)azetidine-3-carboxamide | [M + 1]$^+$ 374.27 $t_R$ 0.69 |
| Ex 6 | N-(6-chloro-4-isopropoxypyridin-3-yl)-3-(2-isopropylphenyl)azetidine-3-carboxamide | [M + 1]$^+$ 388.32 $t_R$ 0.73 |
| Ex 7 | N-(6-chloro-4-cyclopropoxypyridin-3-yl)-3-(2-isopropylphenyl)azetidine-3-carboxamide | [M + 1]$^+$ 386.30 $t_R$ 0.71 |
| Ex 8 | N-(6-chloro-4-(2-methoxyethoxy)pyridin-3-yl)-3-(2-isopropylphenyl)azetidine-3-carboxamide | [M + 1]$^+$ 404.31 $t_R$ 0.64 |
| Ex 9 | (S)-N-(6-chloro-4-((1-methoxypropan-2-yl)oxy)pyridin-3-yl)-3-(2-isopropylphenyl)azetidine-3-carboxamide | [M + 1]$^+$ 418.32 $t_R$ 0.69 |
| Ex 10 | N-(6-chloro-4-methoxypyridin-3-yl)-4-(2-isopropylphenyl)piperidine-4-carboxamide | [M + 1]$^+$ 388.28 $t_R$ 0.66 |
| Ex 11 | 3-(2-isopropylphenyl)-N-(4-methoxy-6-methylpyridin-3-yl)azetidine-3-carboxamide | [M + 1]$^+$ 340.29 $t_R$ 0.35 |
| Ex 12 | 3-(2-isopropylphenyl)-N-(4-methoxy-6-(trifluoromethyl)pyridin-3-yl)azetidine-3-carboxamide | [M + 1]$^+$ 394.30 $t_R$ 0.69 |
| Ex 13 | N-(6-chloro-4-methoxypyridin-3-yl)-3-(2-fluoro-6-isopropylphenyl)azetidine-3-carboxamide | [M + 1]$^+$ 378.22 $t_R$ 0.62 |
| Ex 14 | N-(6-chloro-4-methoxypyridin-3-yl)-3-(5-fluoro-2-isopropylphenyl)azetidine-3-carboxamide | [M + 1]$^+$ 378.22 $t_R$ 0.62 |
| Ex 15 | N-(6-chloro-4-methoxypyridin-3-yl)-3-(3-isopropylpyridin-2-yl)azetidine-3-carboxamide | [M + 1]$^+$ 361.25 $t_R$ 0.55 |
| Ex 16 | N-(6-chloro-4-methoxypyridin-3-yl)-3-(6-fluoro-3-isopropylpyridin-2-yl)azetidine-3-carboxamide | [M + 1]$^+$ 379.23 $t_R$ 0.57 |

TABLE 1-continued

Examples 2 to 17
Examples 2 to 17 are prepared in analogy to the methodology described for Ex 1 using
commercially available or synthesized pyridin-3-amine and intermediate I-4, I-6, I-7,
I-8, I-9, I-10, or I-11. In case I-10 is used, the Suzuki/Hydrogenation (PtO$_2$/H$_2$)
sequence is performed to introduce the iPr unit after the amide coupling.

| Example | Name | Analytics LCMS-1 |
|---|---|---|
| Ex 17 | N-(6-chloro-4-methoxypyridin-3-yl)-3-(2-cyclopentylphenyl)azetidine-3-carboxamide | [M + 1]$^+$ 386.28 t$_R$ 0.71 |

Example 18-1: N-(6-chloro-4-methoxypyridin-3-yl)-1-isopropyl-3-(2-isopropylphenyl)azetidine-3-carboxamide To a solution of Ex 3 (50 mg, 0.14 mmol) and 2-iodopropane (15.6 uL, 0.15 mmol) in dry MeOH (2 mL), is added Cs$_2$CO$_3$ (90 mg. 0.28 mmol). The reaction is stirred at r.t. for 18 h. The mixture is then evaporated and purified by prep. HPLC (Prep-HPLC-2 conditions) to give the title compound Ex 18-1 as a white powder (17 mg, 30% yield). LCMS-1: t$_R$=0.68 min [M+1]$^+$ 402.30.

TABLE 2

Example 18-2 to 18-7:
Examples 18-2 to 18-7 are synthesized by nucleophilic substitution using the methodology
described for example Ex 18-1 starting from Ex 3 and various haloalkanes. Functional groups,
such as acid, amine or alcohol, may be protected with an appropriate protecting group. For
example benzylesters are saponified by 2N LiOH after the N-alkylation step.

| Example | Name | Analytics LCMS-1 |
|---|---|---|
| Ex 18-2 | N-(6-chloro-4-methoxypyridin-3-yl)-1-isobutyl-3-(2-isopropylphenyl)azetidine-3-carboxamide | [M + 1]$^+$ 416.33 t$_R$ 0.74 |
| Ex 18-3 | N-(6-chloro-4-methoxypyridin-3-yl)-1-(2-hydroxyethyl)-3-(2-isopropylphenyl)azetidine-3-carboxamide | [M + 1]$^+$ 404.29 t$_R$ 0.62 |
| Ex 18-4 | 1-(2-(1H-tetrazol-5-yl)ethyl)-N-(6-chloro-4-methoxypyridin-3-yl)-3-(2-isopropylphenyl)azetidine-3-carboxamide | [M + 1]$^+$ 456.32 t$_R$ 0.67 |
| Ex 18-5 | 1-(3-(1H-tetrazol-5-yl)propyl)-N-(6-chloro-4-methoxypyridin-3-yl)-3-(2-isopropylphenyl)azetidine-3-carboxamide | [M + 1]$^+$ 470.33 t$_R$ 0.65 |
| Ex 18-6 | 2-(3-((6-chloro-4-methoxypyridin-3-yl)carbamoyl)-3-(2-isopropylphenyl)azetidin-1-yl)acetic acid | [M + 1]$^+$ 418.30 t$_R$ 0.74 |
| Ex 18-7 | 1-(2-aminoethyl)-N-(6-chloro-4-methoxypyridin-3-yl)-3-(2-isopropylphenyl)azetidine-3-carboxamide | [M + 1]$^+$ 403-02 t$_R$ 0.88 |

Example 18-8: N-(6-chloro-4-methoxypyridin-3-yl)-1-cyclobutyl-3-(2-isopropylphenyl)azetidine-3-carboxamide A solution of Ex 3 (50 mg, 0.14 mmol) and cyclobutanone (29.5 mg, 0.42 mmol) in dry MeOH (2 mL) is stirred under inert atmosphere for 2 h. Cyanoborohydride (43 mg, 0.70 mmol) is then added. The reaction mixture is stirred at 50° C. for 2 h (reaction monitored by LCMS) and is then quenched with water (2 mL). The mixture is diluted with MeCN (2 mL) and is purified by prep. HPLC (Prep-HPLC-2 conditions) to give the title compound Ex 18-8 as a white solid (14 mg, 24% yield). LCMS-1: t$_R$=0.70 min, [M+1]$^+$ 414.32.

TABLE 3

Examples 18-9 to 18-27:
Examples 18-9 to 18-27 are synthesized from Ex 3, Ex 4, Ex 5, Ex 6 or Ex 10 by reductive amination as described for Ex 18-8. Functional groups, such as acid or alcohol, may be protected with an appropriate protecting group. For example, esters are saponified by 2N LiOH after the reductive amination step.

| Example | Name | Analytics LCMS-1 |
| --- | --- | --- |
| Ex 18-9 | N-(6-chloro-4-methoxypyridin-3-yl)-3-(2-isopropylphenyl)-1-(oxetan-3-yl)azetidine-3-carboxamide | $[M + 1]^+$ 416.29 $t_R$ 0.70 |
| Ex 18-10 | N-(6-chloro-4-methoxypyridin-3-yl)-1-((1-fluorocyclopropyl)methyl)-3-(2-isopropylphenyl)azetidine-3-carboxamide | $[M + 1]^+$ 432.32 $t_R$ 0.73 |
| Ex 18-11 | (R)-N-(6-chloro-4-methoxypyridin-3-yl)-1-((2,2-dimethyl-1,3-dioxolan-4-yl)methyl)-3-(2-isopropylphenyl)azetidine-3-carboxamide | $[M + 1]^+$ 474.34 $t_R$ 0.75 |
| Ex 18-12 | (R)-N-(6-chloro-4-methoxypyridin-3-yl)-1-(2,3-dihydroxypropyl)-3-(2-isopropylphenyl)azetidine-3-carboxamide | $[M + 1]^+$ 434.32 $t_R$ 0.61 |
| Ex 18-13 | 1-((1H-pyrazol-3-yl)methyl)-N-(6-chloro-4-methoxypyridin-3-yl)-3-(2-isopropylphenyl)azetidine-3-carboxamide | $[M + 1]^+$ 440.32 $t_R$ 0.65 |
| Ex 18-14 | 1-((1H-pyrazol-4-yl)methyl)-N-(6-chloro-4-methoxypyridin-3-yl)-3-(2-isopropylphenyl)azetidine-3-carboxamide | $[M + 1]^+$ 440.31 $t_R$ 0.64 |
| Ex 18-15 | 1-((1H-1,2,3-triazol-4-yl)methyl)-N-(6-chloro-4-methoxypyridin-3-yl)-3-(2-isopropylphenyl)azetidine-3-carboxamide | $[M + 1]^+$ 441.31 $t_R$ 0.63 |
| Ex 18-16 | methyl 4-(3-((6-chloro-4-methoxypyridin-3-yl)carbamoyl)-3-(2-isopropylphenyl)azetidin-1-yl)-2,2-dimethylbutanoate | $[M + 1]^+$ 488.31 $t_R$ 0.77 |
| Ex 18-17 | 4-(3-((6-chloro-4-methoxypyridin-3-yl)carbamoyl)-3-(2-isopropylphenyl)azetidin-1-yl)-2,2-dimethylbutanoic acid | $[M + 1]^+$ 474.34 $t_R$ 0.71 |
| Ex 18-18 | methyl 4-(3-((6-chloro-4-ethoxypyridin-3-yl)carbamoyl)-3-(2-isopropylphenyl)azetidin-1-yl)-2,2-dimethylbutanoate | $[M + 1]^+$ 502.37 $t_R$ 0.83 |
| Ex 18-19 | 4-(3-((6-chloro-4-ethoxypyridin-3-yl)carbamoyl)-3-(2-isopropylphenyl)azetidin-1-yl)-2,2-dimethylbutanoic acid | $[M + 1]^+$ 488.34 $t_R$ 0.77 |
| Ex 18-20 | 4-(3-((6-chloro-4-isopropoxypyridin-3-yl)carbamoyl)-3-(2-isopropylphenyl)azetidin-1-yl)-2,2-dimethylbutanoic acid | $[M + 1]^+$ 502.34 $t_R$ 0.82 |
| Ex 18-21 | methyl 4-(4-((6-chloro-4-methoxypyridin-3-yl)carbamoyl)-4-(2-isopropylphenyl)piperidin-1-yl)-2,2-dimethylbutanoate | $[M + 1]^+$ 516.38 $t_R$ 0.79 |
| Ex 18-22 | 4-(4-((6-chloro-4-methoxypyridin-3-yl)carbamoyl)-4-(2-isopropylphenyl)piperidin-1-yl)-2,2-dimethylbutanoic acid | $[M + 1]^+$ 502.36 $t_R$ 0.74 |
| Ex 18-23 | 4-(3-((6-bromo-4-methoxypyridin-3-yl)carbamoyl)-3-(2-isopropylphenyl)azetidin-1-yl)-2,2-dimethylbutanoic acid | $[M + 1]^+$ 518.28 and 520.28 $t_R$ 0.73 |
| Ex 18-24 | ethyl 5-(3-((6-chloro-4-methoxypyridin-3-yl)carbamoyl)-3-(2-isopropylphenyl)azetidin-1-yl)-2,2-dimethylpentanoate | $[M + 1]^+$ 516.36 $t_R$ 0.85 |
| Ex 18-25 | 5-(3-((6-chloro-4-methoxypyridin-3-yl)carbamoyl)-3-(2-isopropylphenyl)azetidin-1-yl)-2,2-dimethylpentanoic acid | $[M + 1]^+$ 488.36 $t_R$ 0.73 |
| Ex-18-26 | ethyl 5-(3-((6-chloro-4-ethoxypyridin-3-yl)carbamoyl)-3-(2-isopropylphenyl)azetidin-1-yl)-2,2-dimethylpentanoate | $[M + 1]^+$ 530.42 $t_R$ 0.89 |
| Ex 18-27 | 5-(3-((6-chloro-4-ethoxypyridin-3-yl)carbamoyl)-3-(2-isopropylphenyl)azetidin-1-yl)-2,2-dimethylpentanoic acid | $[M + 1]^+$ 502.36 $t_R$ 0.79 |

Ex 18-28: N-(6-chloro-4-methoxypyridin-3-yl)-3-(2-isopropylphenyl)-1-(2-(sulfamoylamino)ethyl)azetidine-3-carboxamide To a solution of 1-(2-aminoethyl)-N-(6-chloro-4-methoxypyridin-3-yl)-3-(2-isopropylphenyl)azetidine-3-carboxamide Ex 18-7 (25 mg, 0.05 mmol) in dioxane (1 mL) is added TEA (22 uL, 0.16 mmol) followed by sulfamide (10 mg, 0.10 mmol). The reaction mixture is stirred at 100° C. for two days. The volatiles are evaporated and the residue is purified by prep. HPLC (Prep-HPLC-1 conditions) to give the title compound Ex 18-28 as a pale yellow oil (10 mg, 39% yield). LCMS-1: $t_R$=0.63 min, $[M+1]^+$ 482.30.

Example 19-1: N-(6-chloro-4-methoxypyridin-3-yl)-1-(3-hydroxypropanoyl)-3-(2-isopropylphenyl)azetidine-3-carboxamide To a solution of N-(6-chloro-4-methoxypyridin-3-yl)-3-(2-isopropylphenyl)azetidine-3-carboxamide Ex 3 (30 mg, 0.08 mmol) and 3-hydroxypropionic acid (37.5 mg, 0.12 mmol) in DMF (2 mL), EDC (21 mg, 0.11 mmol), HOBt (17 mg, 0.11 mmol) and DIPEA (43 uL, 0.25 mmol) are added. The mixture is stirred at r.t. for 18 h before it is diluted with sat. aq. NaHCO$_3$ and extracted twice with EtOAc. The combined org. extracts are dried over MgSO$_4$, filtered and concentrated. The crude product is purified by prep. HPLC (Prep-HPLC-2 conditions) to give the title compound Ex 19-1 (7 mg, 19% yield) as a white solid; LCMS-1: $t_R$=0.92 min, $[M+1]^+$ 432.29. $^1$H NMR (400 MHz, CDCl3) δ: 9.23 (s, 1H), 7.51-7.42 (m, 2H), 7.41-7.35 (m, 1H), 7.34 (d, J=7.3 Hz, 1H), 7.26 (s, 1H), 6.73 (s, 1H), 5.10-4.98 (m, 1H), 7.73-4.63 (m, 1H), 4.62-4.52 (m, 1H), 4.49-4.37 (m, 1H), 4.00-–3.93 (m, 1H), 3.91-3.84 (m, 1H), 3.68 (s, 3H), 2.55-2.43 (m, 1H), 2.42-2.34 (m, 2H), 1.19 (d, J=6.6 Hz, 3H), 1.12 (d, J=6.6 Hz, 3H).

TABLE 4

Examples 19-2 to 19-23:
Examples 19-2 to 19-23 are synthesized from Ex 1, Ex 3, Ex 4, Ex 5 or Ex 10 by amide coupling with an acylchloride or a carboxylic acid in the presence of EDC/HOBt, or T3P and an organic base (DIPEA, pyridine for ex.), as exemplified for Ex 19-1. Functional groups, such as acid or alcohol, may be protected with an appropriate protecting group. For example esters are saponified by 2N LiOH after the reductive amination step.

| Example | Name | Analytics LCMS-1 |
|---|---|---|
| Ex 19-2 | 1-acetyl-N-(6-chloro-4-methoxypyridin-3-yl)-3-(2-isopropylphenyl)azetidine-3-carboxamide | $[M+1]^+$ 402.27 $t_R$ 0.99 |
| Ex 19-3 | N-(6-chloro-4-methoxypyridin-3-yl)-1-formyl-3-(2-isopropylphenyl)azetidine-3-carboxamide | $[M+1]^+$ 388.26 $t_R$ 0.99 |
| Ex 19-4 | N-(6-chloro-4-methoxypyridin-3-yl)-3-(2-isopropylphenyl)-1-(oxetane-3-carbonyl)azetidine-3-carboxamide | $[M+1]^+$ 444.30 $t_R$ 0.98 |
| Ex 19-5 | N-(6-chloro-4-methoxypyridin-3-yl)-1-(3-hydroxyisoxazole-5-carbonyl)-3-(2-isopropylphenyl)azetidine-3-carboxamide | $[M+1]^+$ 471.28 $t_R$ 1.04 |
| Ex 19-6 | N-(6-chloro-4-methoxypyridin-3-yl)-1-(5-hydroxy-1,2,4-oxadiazole-3-carbonyl)-3-(2-isopropylphenyl)azetidine-3-carboxamide | $[M+1]^+$ 472.26 $t_R$ 1.09 |
| Ex 19-7 | 1-(2-(2H-1,2,3-triazol-2-yl)acetyl)-N-(6-chloro-4-methoxypyridin-3-yl)-3-(2-isopropylphenyl)azetidine-3-carboxamide | $[M+1]^+$ 469.28 $t_R$ 1.03 |
| Ex 19-8 | N-(6-chloro-4-methoxypyridin-3-yl)-3-(2-isopropylphenyl)-1-(2-(4-methyl-1H-1,2,3-triazol-1-yl)acetyl)azetidine-3-carboxamide | $[M+1]^+$ 483.32 $t_R$ 0.99 |
| Ex 19-9 | N-(6-chloro-4-methoxypyridin-3-yl)-1-(2-(4-(hydroxymethyl)-1H-1,2,3-triazol-1-yl)acetyl)-3-(2-isopropylphenyl)azetidine-3-carboxamide | $[M+1]^+$ 499.30 $t_R$ 0.91 |
| Ex 19-10 | 1-(2-(2H-tetrazol-2-yl)acetyl)-N-(6-chloro-4-methoxypyridin-3-yl)-3-(2-isopropylphenyl)azetidine-3-carboxamide | $[M+1]^+$ 470.31 $t_R$ 0.99 |
| Ex 19-11 | 1-(2-(1H-1,2,3-triazol-1-yl)acetyl)-N-(6-chloro-4-methoxypyridin-3-yl)-3-(2-isopropylphenyl)azetidine-3-carboxamide | $[M+1]^+$ 469.28 $t_R$ 0.96 |
| Ex 19-12 | N-(6-chloro-4-methoxypyridin-3-yl)-1-(2-(3-hydroxy-1H-pyrazol-4-yl)acetyl)-3-(2-isopropylphenyl)azetidine-3-carboxamide | $[M+1]^+$ 484.29 $t_R$ 0.90 |
| Ex 19-13 | N-(6-chloro-4-methoxypyridin-3-yl)-1-(2-(3-hydroxy-1H-pyrazol-5-yl)acetyl)-3-(2-isopropylphenyl)azetidine-3-carboxamide | $[M+1]^+$ 484.31 $t_R$ 0.88 |
| Ex 19-14 | N-(6-chloro-4-methoxypyridin-3-yl)-3-(2-isopropylphenyl)-1-(sulfamoylglycyl)azetidine-3-carboxamide | $[M+1]^+$ 496.29 $t_R$ 0.93 |
| Ex 19-15 | N-(6-chloro-4-methoxypyridin-3-yl)-3-(2-isopropylphenyl)-1-((methylsulfonyl)glycyl)azetidine-3-carboxamide | $[M+1]^+$ 495.25 $t_R$ 0.97 |
| Ex 19-16 | N-(6-chloro-4-methoxypyridin-3-yl)-3-(2-isopropylphenyl)-1-(2-(methylsulfonyl)acetyl)azetidine-3-carboxamide | $[M+1]^+$ 480.26 $t_R$ 0.98 |
| Ex 19-17 | methyl 4-(3-((6-chloro-4-methoxypyridin-3-yl)carbamoyl)-3-(2-isopropylphenyl)azetidin-1-yl)-2,2-dimethyl-4-oxobutanoate | $[M+1]^+$ 502.33 $t_R$ 1.17 |
| Ex 19-18 | 4-(3-((6-chloro-4-methoxypyridin-3-yl)carbamoyl)-3-(2-isopropylphenyl)azetidin-1-yl)-2,2-dimethyl-4-oxobutanoic acid | $[M+1]^+$ 488.34 $t_R$ 1.07 |
| Ex 19-19 | 4-(3-((6-bromo-4-methoxypyridin-3-yl)carbamoyl)-3-(2-isopropylphenyl)azetidin-1-yl)-2,2-dimethyl-4-oxobutanoic acid | $[M+1]^+$ 532.26 and 534.26 $t_R$ 1.09 |
| Ex 19-20 | 4-(4-((6-chloro-4-methoxypyridin-3-yl)carbamoyl)-4-(2-isopropylphenyl)piperidin-1-yl)-2,2-dimethyl-4-oxobutanoic acid | $[M+1]^+$ 498.33 $t_R$ 1.12 |
| Ex 19-21 | methyl 4-(3-((6-chloro-4-ethoxypyridin-3-yl)carbamoyl)-3-(2-isopropylphenyl)azetidin-1-yl)-2,2-dimethyl-4-oxobutanoate | $[M+1]^+$ 516.36 $t_R$ 1.25 |
| Ex 19-22 | 4-(3-((6-chloro-4-ethoxypyridin-3-yl)carbamoyl)-3-(2-isopropylphenyl)azetidin-1-yl)-2,2-dimethyl-4-oxobutanoic acid | $[M+1]^+$ 502.30 $t_R$ 1.15 |
| Ex 19-23 | 4-(3-((6-fluoro-4-methoxypyridin-3-yl)carbamoyl)-3-(2-isopropylphenyl)azetidin-1-yl)-2,2-dimethyl-4-oxobutanoic acid | $[M+1]^+$ 472.40 $t_R$ 1.01 |

Example 20-1: N-(6-chloro-4-methoxypyridin-3-yl)-3-(2-isopropylphenyl)-1-(methylsulfonyl)azetidine-3-carboxamide Methanesulfonyl chloride (22 uL, 0.28 mmol) is added to a solution of Ex 3 (50 mg, 0.14 mmol) and DIPEA (96 uL, 0.56 mmol) in DCM (2 mL). The reaction mixture is stirred at r.t. for 18 h and is then diluted with DCM (50 mL) and washed with sat. NaHCO₃ followed by brine. The organic phase is stirred over MgSO₄, filtered and evaporated. The residue is purified by prep. HPLC (Prep-HPLC-2 conditions) to give the title compound Ex 20-1 as a white powder (41 mg, 67% yield) LCMS-1: $t_R$=1.09 min, $[M+1]^+$ 438.26.

TABLE 5

Examples 20-2 to 20-5:
Examples 20-2 to 20-5 are synthesized in analogy to Ex 20-1 from Ex 3 and various sulfonylchloride.

| Example | Name | Analytics LCMS-1 |
|---|---|---|
| Ex 20-2 | N-(6-chloro-4-methoxypyridin-3-yl)-3-(2-isopropylphenyl)-1-((2-methoxyethyl)sulfonyl)azetidine-3-carboxamide | $[M + 1]^+$ 482.26 $t_R$ 1.13 |
| Ex 20-3 | N-(6-chloro-4-methoxypyridin-3-yl)-1-((2-hydroxyethyl)sulfonyl)-3-(2-isopropylphenyl)azetidine-3-carboxamide | $[M + 1]^+$ 468.23 $t_R$ 1.01 |
| Ex 20-4 | N-(6-chloro-4-methoxypyridin-3-yl)-1-((2-(dimethylamino)ethyl)sulfonyl)-3-(2-isopropylphenyl)azetidine-3-carboxamide | $[M + 1]^+$ 495.30 $t_R$ 0.72 |
| Ex 20-5 | N-(6-chloro-4-methoxypyridin-3-yl)-3-(2-isopropylphenyl)-1-(oxetan-3-ylsulfonyl)azetidine-3-carboxamide | $[M + 1]^+$ 480.27 $t_R$ 1.10 |

Example 21-1: N-(6-fluoro-4-methoxypyridin-3-yl)-3-(2-isopropylphenyl)-1-sulfamoylazetidine-3-carboxamide To a solution of Ex 1 (35 mg, 0.09 mmol) and TEA (39 uL, 0.28 mmol) in dioxane (1 mL) is added sulfamide (18 mg, 0.18 mmol). The reaction mixture is stirred at 100° C. for 18 h and is then evaporated. The crude compound is purified by prep. HPLC (Prep-HPLC-1 conditions) to give the title compound Ex 21-1 as a white solid (15 mg, 39% yield). LCMS-1: $t_R$=0.94 min, $[M+1]^+$ 423.29. $^1$H NMR (400 MHz, DMSO D6) δ: 8.69 (s, 1H), 8.15 (s, 1H), 7.42-7.32 (m, 3H), 7.29-7.24 (m, 1H), 7.05 (s, 2H), 6.89 (s, 1H), 4.41 (d, J=7.6 Hz, 2H), 4.14 (d, J=7.6 Hz, 2H), 3.75 (s, 3H), 2.75-2.64 (m, 1H), 1.11 (d, J=6.6 Hz, 6H).

TABLE 6

Examples 21-2 to 21-19
Examples 21-2 to 21-19 are synthesized according to the methodology described for Ex 21-1 starting from Ex 2 to Ex 17.

| Example | Name | Analytics LCMS-1 |
|---|---|---|
| Ex 21-2 | N-(6-chloro-4-methoxypyridin-3-yl)-3-(2-isopropylphenyl)-1-sulfamoylazetidine-3-carboxamide | $[M + 1]^+$ 439.29 $t_R$ 1.00 |
| Ex 21-3 | N-(6-chloro-4-ethoxypyridin-3-yl)-3-(2-isopropylphenyl)-1-sulfamoylazetidine-3-carboxamide | $[M + 1]^+$ 453.26 $t_R$ 1.08 |
| Ex 21-4 | N-(6-chloro-4-isopropoxypyridin-3-yl)-3-(2-isopropylphenyl)-1-sulfamoylazetidine-3-carboxamide | $[M + 1]^+$ 467.28 $t_R$ 1.13 |
| Ex 21-5 | N-(6-chloro-4-cyclopropoxypyridin-3-yl)-3-(2-isopropylphenyl)-1-sulfamoylazetidine-3-carboxamide | $[M + 1]^+$ 465.27 $t_R$ 1.10 |
| Ex 21-6 | N-(6-chloro-4-(2-methoxyethoxy)pyridin-3-yl)-3-(2-isopropylphenyl)-1-sulfamoylazetidine-3-carboxamide | $[M + 1]^+$ 483.29 $t_R$ 1.01 |
| Ex 21-7 | (S)-N-(6-chloro-4-((1-methoxypropan-2-yl)oxy)pyridin-3-yl)-3-(2-isopropylphenyl)-1-sulfamoylazetidine-3-carboxamide | $[M + 1]^+$ 497.31 $t_R$ 1.07 |
| Ex 21-8 | N-(6-chloro-4-methoxypyridin-3-yl)-4-(2-isopropylphenyl)-1-sulfamoylpiperidine-4-carboxamide | $[M + 1]^+$ 467.30 $t_R$ 1.06 |
| Ex 21-9 | N-(6-bromo-4-methoxypyridin-3-yl)-3-(2-isopropylphenyl)-1-sulfamoylazetidine-3-carboxamide | $[M + 1]^+$ 483.18 and 485.18 $t_R$ 1.03 |
| Ex 21-10 | 3-(2-isopropylphenyl)-N-(4-methoxy-6-methylpyridin-3-yl)-1-sulfamoylazetidine-3-carboxamide | $[M + 1]^+$ 419.31 $t_R$ 0.57 |
| Ex 21-11 | 3-(2-isopropylphenyl)-N-(4-methoxy-6-(trifluoromethyl)pyridin-3-yl)-1-sulfamoylazetidine-3-carboxamide | $[M + 1]^+$ 473.29 $t_R$ 1.08 |
| Ex 21-12 | N-(6-chloro-4-methoxypyridin-3-yl)-3-(2-isopropylphenyl)-1-(N-methylsulfamoyl)azetidine-3-carboxamide | $[M + 1]^+$ 453.26 $t_R$ 1.08 |
| Ex 21-13 | N-(6-chloro-4-methoxypyridin-3-yl)-1-(N-cyclopropylsulfamoyl)-3-(2-isopropylphenyl)azetidine-3-carboxamide | $[M + 1]^+$ 479.26 $t_R$ 1.15 |
| Ex 21-14 | N-(6-chloro-4-methoxypyridin-3-yl)-3-(2-fluoro-6-isopropylphenyl)-1-sulfamoylazetidine-3-carboxamide | $[M + 1]^+$ 457.25 $t_R$ 1.02 |
| Ex 21-15 | N-(6-chloro-4-methoxypyridin-3-yl)-3-(5-fluoro-2-isopropylphenyl)-1-sulfamoylazetidine-3-carboxamide | $[M + 1]^+$ 457.23 $t_R$ 1.01 |
| Ex 21-16 | N-(6-chloro-4-methoxypyridin-3-yl)-3-(3-isopropylpyridin-2-yl)-1-sulfamoylazetidine-3-carboxamide | $[M + 1]^+$ 440.25 $t_R$ 0.91 |
| Ex 21-17 | N-(6-chloro-4-methoxypyridin-3-yl)-3-(6-fluoro-3-isopropylpyridin-2-yl)-1-sulfamoylazetidine-3-carboxamide | $[M + 1]^+$ 458.22 $t_R$ 0.95 |
| Ex 21-18 | 3-(2-isopropylphenyl)-N-(4-methoxypyridin-3-yl)-1-sulfamoylazetidine-3-carboxamide | $[M + 1]^+$ 405.28 $t_R$ 0.57 |
| Ex 21-19 | N-(6-chloro-4-methoxypyridin-3-yl)-3-(2-cyclopentylphenyl)-1-sulfamoylazetidine-3-carboxamide | $[M + 1]^+$ 465.23 $t_R$ 1.09 |

Example 21-20: N-(6-chloro-4-methoxypyridin-3-yl)-3-(2-isopropylphenyl)-1-(N-(2-methoxyethyl)sulfamoyl)azetidine-3-carboxamide Step 1. To a solution of chlorosulfonyl isocyanate (42 uL, 0.48 mmol) in DCM (1 mL) cooled down to 0° C. a solution of 2-bromoethanol (34 uL, 0.48 mmol) in DCM (1 mL) is added. The reaction mixture is stirred for 1 h at 0° C., then a solution of 2-methoxyethylamine (0.48 mmol, 0.42 mmol) in DCM (1 mL) is added followed by TEA (200 uL, 1.43 mmol). The reaction is stirred at r.t. for 2 h then at 35° C. for 14 h. The reaction mixture is evaporated to give crude N-(2-methoxyethyl)-2-oxooxazolidine-3-sulfonamide that is used as such in the next step.

Step 2. To a solution of N-(6-chloro-4-methoxypyridin-3-yl)-3-(2-isopropylphenyl)azetidine-3-carboxamide Ex 3 (49 mg, 0.14 mmol) and TEA (2 mL) in DMF (2.5 mL) is added N-(2-methoxyethyl)-2-oxooxazolidine-3-sulfonamide (86 mg, 0.41 mmol). The reaction mixture is stirred at 95° C. for 18 h and is then evaporated. The residue is purified by prep. HPLC (Prep-HPLC-2 conditions) yielding Ex 21-20 as a yellow oil (15 mg, 22% yield over 2 steps). LCMS-1: $t_R$=1.10 min, [M+1]$^+$ 497.26. $^1$H NMR (400 MHz, CD3OD) δ: 8.83 (s, 1H), 7.47-7.41 (m, 3H), 7.39-7.34 (m, 1H), 7.12 (s, 1H), 4.52 (d, J=8.0 Hz, 2H), 4.34 (d, J=7.9 Hz, 2H), 3.80 (s, 3H), 3.49 (t, J=5.5 Hz, 2H), 3.31 (s, 3H), 3.27 (t, J=5.5 Hz, 2H), 2.57 (hept, J=6.8 Hz, 1H), 1.16 (d, J=6.7 Hz, 6H).

Example 21-21: N-(6-chloro-4-methoxypyridin-3-yl)-1-(N-(2-hydroxyethyl)sulfamoyl)-3-(2-isopropylphenyl)azetidine-3-carboxamide Step 1. A solution of chlorosulfonyl isocyanate (12 uL, 0.14 mmol) in DCM (2 mL) is cooled down to 0° C. and a solution of 2-bromoethanol (10 uL, 0.14 mmol) in DCM (1 mL) is added. The reaction mixture stirred for 1 h at 0° C., then Ex 3 (50 mg, 0.14 mmol) in DCM (1 mL) is added followed by TEA (78 uL, 0.55 mmol). The reaction is stirred at r.t. for 18 h and is then concentrated under reduced pressure to give crude N-(6-chloro-4-methoxypyridin-3-yl)-3-(2-isopropylphenyl)-1-((2-oxooxazolidin-3-yl)sulfonyl)azetidine-3-carboxamide.

Step 2. N-(6-chloro-4-methoxypyridin-3-yl)-3-(2-isopropylphenyl)-1-((2-oxooxazolidin-3-yl)sulfonyl)azetidine-3-carboxamide is dissolved in MeOH (2 mL) and treated with NaOH 1 M (1 mL). The reaction mixture is stirred at r.t. for 18 h, then evaporated and purified by prep HPLC (Prep-HPLC-2 conditions) to afford the title compound Ex 21-21 as a solid (43 mg, 65% yield over 2 steps). LCMS-1: $t_R$=0.99 min, [M+1]$^+$ 483.27. $^1$H NMR (400 MHz, CDCl3) δ: 9.22 (s, 1H), 7.47-7.40 (m, 2H), 7.38-7.33 (m, 2H), 7.27-7.24 (m, 1H), 6.74 (s, 1H), 4.90 (t, J=5.7 Hz, 1H), 4.62-4.52 (m, 2H), 4.49-4.38 (m, 2H), 3.84 (t, J=4.9 Hz, 2H), 3.70 (s, 3H), 3.40-3.35 (m, 2H), 2.42 (hept, J=6.7 Hz, 1H), 1.13 (d, J=6.7 Hz, 6H).

Example 22-1: N3-(6-chloro-4-methoxypyridin-3-yl)-3-(2-isopropylphenyl)azetidine-1,3-dicarboxamide Method A To a solution Ex 3 (40 mg, 0.11 mmol) and DIPEA (56 uL, 0.33 mmol) in THF (5 mL) is added (trimethylsilyl)isocyanate (26 uL, 0.16 mmol) dropwise. The reaction mixture is stirred at r.t. for 1 h (reaction progress monitored by LCMS) and is then concentrated. The residue is purified by prep. HPLC (Prep-HPLC-2 conditions) to give the title compound Ex 22-1 as a white solid (24 mg, 55% yield); LCMS-1: $t_R$=0.91 min, [M+1]$^+$ 403.30.

Example 22-2: N3-(6-chloro-4-methoxypyridin-3-yl)-3-(2-isopropylphenyl)-N1-methylazetidine-1,3-dicarboxamide Method B To a solution Ex 3 (30 mg, 0.08 mmol) and DIPEA (42 uL, 0.25 mmol) in THF (2 mL) is added N-succinimidyl-N-methylcarbamate (22 mg, 0.12 mmol). The reaction mixture is stirred at r.t. for 1 h (reaction progress monitored by LCMS) and is then concentrated. The residue is purified by prep. HPLC (Prep-HPLC-2 conditions) to give the title compound Ex 22-2 as a white solid (9 mg, 28% yield). LCMS-1: $t_R$=0.96 min, [M+1]$^+$ 417.33.

TABLE 7

Examples 22-3 to 22-16
Examples 22-3 to 22-16 are synthesized using either Method A or B described for Ex 22-1 and Ex 22-2 respectively starting from Ex 3, Ex 9 or Ex 15. For Method B, the reagent N-succinimidyl carbamate may be replaced by a carbamoyl chloride, such as dimethylcarbamoyl chloride. Functional groups, such as acid or alcohol, may be protected with an appropriate protecting group. For example esters are saponified by 2N LiOH in a second step.

| Example | Name | Method | Analytics LCMS-1 |
|---|---|---|---|
| Ex 22-3 | N3-(6-chloro-4-methoxypyridin-3-yl)-N1-ethyl-3-(2-isopropylphenyl)azetidine-1,3-dicarboxamide | A | [M + 1]$^+$ 431.30 $t_R$ 1.02 |
| Ex 22-4 | N3-(6-chloro-4-methoxypyridin-3-yl)-N1-isopropyl-3-(2-isopropylphenyl)azetidine-1,3-dicarboxamide | A | [M + 1]$^+$ 445.33 $t_R$ 1.08 |
| Ex 22-5 | N3-(6-chloro-4-methoxypyridin-3-yl)-N1-cyclopropyl-3-(2-isopropylphenyl)azetidine-1,3-dicarboxamide | A | [M + 1]$^+$ 443.32 $t_R$ 1.03 |
| Ex 22-6 | (S)-N3-(6-chloro-4-((1-methoxypropan-2-yl)oxy)pyridin-3-yl)-N1-cyclopropyl-3-(2-isopropylphenyl)azetidine-1,3-dicarboxamide | A | [M + 1]$^+$ 501.32 $t_R$ 1.10 |
| Ex 22-7 | N3-(6-chloro-4-methoxypyridin-3-yl)-N1-cyclopropyl-3-(3-isopropylpyridin-2-yl)azetidine-1,3-dicarboxamide | A | [M + 1]$^+$ 444.10 $t_R$ 0.95 |
| Ex 22-8 | 2-(3-(((6-chloro-4-methoxypyridin-3-yl)carbamoyl)-3-(2-isopropylphenyl)azetidine-1-carboxamido)ethyl methacrylate | A | [M + 1]$^+$ 515.33 $t_R$ 1.11 |

TABLE 7-continued

Examples 22-3 to 22-16
Examples 22-3 to 22-16 are synthesized using either Method A or B described for Ex 22-1 and Ex 22-2 respectively starting from Ex 3, Ex 9 or Ex 15. For Method B, the reagent N-succinimidyl carbamate may be replaced by a carbamoyl chloride, such as dimethylcarbamoyl chloride. Functional groups, such as acid or alcohol, may be protected with an appropriate protecting group. For example esters are saponified by 2N LiOH in a second step.

| Example | Name | Method | Analytics LCMS-1 |
|---|---|---|---|
| Ex 22-9 | N3-(6-chloro-4-methoxypyridin-3-yl)-N1-(2-hydroxyethyl)-3-(2-isopropylphenyl)azetidine-1,3-dicarboxamide | A | $[M+1]^+$ 477.31 $t_R$ 0.90 |
| Ex 22-10 | N3-(6-chloro-4-methoxypyridin-3-yl)-3-(2-isopropylphenyl)-N1-(2-methoxyethyl)azetidine-1,3-dicarboxamide | A | $[M+1]^+$ 461.31 $t_R$ 0.99 |
| Ex 22-11 | ethyl (3-((6-chloro-4-methoxypyridin-3-yl)carbamoyl)-3-(2-isopropylphenyl)azetidine-1-carbonyl)glycinate | A | $[M+1]^+$ 489.33 $t_R$ 1.40 |
| Ex 22-12 | (3-((6-chloro-4-methoxypyridin-3-yl)carbamoyl)-3-(2-isopropylphenyl)azetidine-1-carbonyl)glycine | A | $[M+1]^+$ 461.28 $t_R$ 0.92 |
| Ex 22-13 | ethyl 3-(3-((6-chloro-4-methoxypyridin-3-yl)carbamoyl)-3-(2-isopropylphenyl)azetidine-1-carboxamido)propanoate | A | $[M+1]^+$ 503.33 $t_R$ 1.07 |
| Ex 22-14 | 3-(3-((6-chloro-4-methoxypyridin-3-yl)carbamoyl)-3-(2-isopropylphenyl)azetidine-1-carboxamido)propanoic acid | A | $[M+1]^+$ 476.32 $t_R$ 0.93 |
| Ex 22-15 | $N^3$-(6-chloro-4-methoxypyridin-3-yl)-3-(2-isopropylphenyl)-N1,N1-dimethylazetidine-1,3-dicarboxamide | B | $[M+1]^+$ 431.31 $t_R$ 1.07 |
| Ex 22-16 | N-(6-chloro-4-methoxypyridin-3-yl)-3-(2-isopropylphenyl)-1-(morpholine-4-carbonyl)azetidine-3-carboxamide | B | $[M+1]^+$ 473.33 $t_R$ 1.05 |

Ex 23-1: Methyl 3-((6-chloro-4-methoxypyridin-3-yl)carbamoyl)-3-(2-isopropylphenyl)azetidine-1-carboxylate To a solution Ex 3 (30 mg, 0.08 mmol) and DIPEA (42 uL, 0.25 mmol) in DCM (1 mL) is added methyl chloroformate (10 uL, 0.12 mmol). The reaction mixture is stirred at r.t. for 18 h and is then concentrated. The residue is purified by prep. HPLC (Prep-HPLC-2 conditions) to give the title compound Ex 23-1 as a white solid (33 mg, 95% yield). LCMS-1: $t_R$=1.14 min [M+1]$^+$ 418.30. $^1$H NMR (400 MHz, CDCl3) δ: 9.25 (s, 1H), 7.48-7.42 (m, 2H), 7.38-7.31 (m, 2H), 7.25 (s, 1H), 6.73 (s, 1H), 4.85-4.63 (m, 2H), 4.56-4.32 (m, 2H), 3.72 (s, 3H), 3.67 (s, 3H), 2.42 (hept, J=6.6 Hz, 1H), 1.13 (d, J=6.6 Hz, 6H).

Ex 23-2: 2-Methoxyethyl 3-((6-chloro-4-methoxypyridin-3-yl)carbamoyl)-3-(2-isopropylphenyl)azetidine-1-carboxylate 2-Methoxyethyl 3-((6-chloro-4-methoxypyridin-3-yl)carbamoyl)-3-(2-isopropylphenyl)azetidine-1-carboxylate Ex 23-2 is prepared from methoxyethyl chloroformate according to the methodology described for Ex 23-1. White solid. LCMS-1: $t_R$=1.13 min [M+1]$^+$ 462.31.

Example 24-1: N-(6-chloro-4-methoxypyridin-3-yl)-3-(2-isopropylphenyl)-1-(3-methylpyridin-4-yl)azetidine-3-carboxamide To a solution of Ex 3 (50 mg, 0.14 mmol) in dioxane (2 mL), are added 4-bromo-3-methylpyridine (95 mg, 0.55 mmol), NaOtBu (20 mg, 0.21 mmol) and the Pd catalyst SK-0002-A (4.2 mg, 0.007 mmol). The resulting mixture is degassed and is stirred at 100° C. for 4 days. The reaction is filtered on a syringe filter and is then purified by prep. HPLC (Prep-HPLC-2 conditions) to give the title compound Ex 24-1 as a brownish oil (1 mg, 2% yield). LCMS-1: $t_R$=0.76 min, [M+1]$^+$ 451.33.

Example 24-2: N-(6-chloro-4-methoxypyridin-3-yl)-1-(3-fluoropyridin-4-yl)-3-(2-isopropylphenyl)azetidine-3-carboxamide Ex 3 (44 mg, 0.12 mmol), 4-bromo-3-fluoro-pyridine (43 mg, 0.24 mmol) and Cs$_2$CO$_3$ (59 mg, 0.18 mmol) are suspended in DMA and the mixture is stirred at 90° C. for 18 h (reaction monitored by LC-MS). The mixture is cooled down to r.t., diluted with EtOAc (50 mL) and washed sequentially with water and brine. The organic phase is dried over MgSO$_4$, filtered and evaporated. The residue is purified by prep. HPLC (Prep-HPLC-2 conditions) to give the title compound Ex 24-2 as an off-white solid (20 mg, 36% yield). LCMS-1: $t_R$=0.75 min, [M+1]$^+$ 455.28; $^1$H NMR (400 MHz, CDCl3) δ: 9.28 (s, 1H), 8.15 (d, J=4.1 Hz, 1H), 8.10 (d, J=5.3 Hz, 1H), 7.45 (s, 2H), 7.43-7.35 (m, 3H), 6.75 (s, 1H), 6.45-6.36 (m, 1H), 5.00-4.85 (m, 2H), 4.61-4.49 (m, 2H), 3.70 (s, 3H), 2.56-2.46 (m, 1H), 1.17 (d, J=6.6 Hz, 6H).

TABLE 8

Examples 24-3 to 24-26
Examples 24-3 to 24-26 are synthesized according to methodology described for Ex 24-2 starting from Ex 3 or Ex 10. DMA may be replaced by DMF, and Cs$_2$CO$_3$ may be replaced by DIPEA. Functional groups, such as acid or alcohol, may be protected with an appropriate protecting group. For example esters are saponified by 2N LiOH in a second step.

| Example | Name | Analytics LCMS-1 |
|---|---|---|
| Ex 24-3 | N-(6-chloro-4-methoxypyridin-3-yl)-1-(3-fluoro-2-methylpyridin-4-yl)-3-(2-isopropylphenyl)azetidine-3-carboxamide | $[M+1]^+$ 469.29 $t_R$ 0.78 |

TABLE 8-continued

Examples 24-3 to 24-26
Examples 24-3 to 24-26 are synthesized according to methodology described for Ex 24-2
starting from Ex 3 or Ex 10. DMA may be replaced by DMF, and $Cs_2CO_3$ may be replaced by
DIPEA. Functional groups, such as acid or alcohol, may be protected with an appropriate
protecting group. For example esters are saponified by 2N LiOH in a second step.

| Example | Name | Analytics LCMS-1 |
|---|---|---|
| Ex 24-4 | N-(6-chloro-4-methoxypyridin-3-yl)-1-(5-fluoro-2-methylpyridin-4-yl)-3-(2-isopropylphenyl)azetidine-3-carboxamide | $[M + 1]^+$ 469.30 $t_R$ 0.77 |
| Ex 24-5 | N-(6-chloro-4-methoxypyridin-3-yl)-3-(2-isopropylphenyl)-1-(2-methylpyridin-4-yl)azetidine-3-carboxamide | $[M + 1]^+$ 451.31 $t_R$ 0.76 |
| Ex 24-6 | N-(6-chloro-4-methoxypyridin-3-yl)-1-(2,6-dimethylpyridin-4-yl)-3-(2-isopropylphenyl)azetidine-3-carboxamide | $[M + 1]^+$ 465.33 $t_R$ 0.79 |
| Ex 24-7 | N-(6-chloro-4-methoxypyridin-3-yl)-1-(4-fluoropyridin-2-yl)-3-(2-isopropylphenyl)azetidine-3-carboxamide | $[M + 1]^+$ 455.28 $t_R$ 1.23 |
| Ex 24-8 | N-(6-chloro-4-methoxypyridin-3-yl)-1-(5-cyanopyrimidin-2-yl)-3-(2-isopropylphenyl)azetidine-3-carboxamide | $[M + 1]^+$ 463.29 $t_R$ 1.22 |
| Ex 24-9 | N-(6-chloro-4-methoxypyridin-3-yl)-1-(5-fluoropyrimidin-2-yl)-3-(2-isopropylphenyl)azetidine-3-carboxamide | $[M + 1]^+$ 456.28 $t_R$ 1.25 |
| Ex 24-10 | N-(6-chloro-4-methoxypyridin-3-yl)-1-(5-fluoropyrimidin-4-yl)-3-(2-isopropylphenyl)azetidine-3-carboxamide | $[M + 1]^+$ 456.29 $t_R$ 1.09 |
| Ex 24-11 | N-(6-chloro-4-methoxypyridin-3-yl)-3-(2-isopropylphenyl)-1-(pyrimidin-4-yl)azetidine-3-carboxamide | $[M + 1]^+$ 438.32 $t_R$ 0.73 |
| Ex 24-12 | N-(6-chloro-4-methoxypyridin-3-yl)-3-(2-isopropylphenyl)-1-(2-methylpyrimidin-4-yl)azetidine-3-carboxamide | $[M + 1]^+$ 452.32 $t_R$ 0.74 |
| Ex 24-13 | N-(6-chloro-4-methoxypyridin-3-yl)-3-(2-isopropylphenyl)-1-(5-methylpyrimidin-4-yl)azetidine-3-carboxamide | $[M + 1]^+$ 452.32 $t_R$ 0.76 |
| Ex 24-14 | N-(6-chloro-4-methoxypyridin-3-yl)-3-(2-isopropylphenyl)-1-(6-methylpyrimidin-4-yl)azetidine-3-carboxamide | $[M + 1]^+$ 452.31 $t_R$ 0.74 |
| Ex 24-15 | 1-(6-chloro-2-methylpyrimidin-4-yl)-N-(6-chloro-4-methoxypyridin-3-yl)-3-(2-isopropylphenyl)azetidine-3-carboxamide | $[M + 1]^+$ 486.25 $t_R$ 1.27 |
| Ex 24-16 | N-(6-chloro-4-methoxypyridin-3-yl)-1-(5-fluoro-2-methylpyrimidin-4-yl)-3-(2-isopropylphenyl)azetidine-3-carboxamide | $[M + 1]^+$ 470.32 $t_R$ 0.92 |
| Ex 24-17 | N-(6-chloro-4-methoxypyridin-3-yl)-1-(5-fluoropyrimidin-4-yl)-4-(2-isopropylphenyl)piperidine-4-carboxamide | $[M + 1]^+$ 484.32 $t_R$ 1.15 |
| Ex 24-18 | N-(6-chloro-4-methoxypyridin-3-yl)-1-(5-fluoro-2-methylpyrimidin-4-yl)-4-(2-isopropylphenyl)piperidine-4-carboxamide | $[M + 1]^+$ 498.32 $t_R$ 0.94 |
| Ex 24-19 | methyl 5-(3-((6-chloro-4-methoxypyridin-3-yl)carbamoyl)-3-(2-isopropylphenyl)azetidin-1-yl)pyrazine-2-carboxylate | $[M + 1]^+$ 496.31 $t_R$ 1.15 |
| Ex 24-20 | 5-(3-((6-chloro-4-methoxypyridin-3-yl)carbamoyl)-3-(2-isopropylphenyl)azetidin-1-yl)pyrazine-2-carboxylic acid | $[M + 1]^+$ 482.30 $t_R$ 1.05 |
| Ex 24-21 | methyl 6-(3-((6-chloro-4-methoxypyridin-3-yl)carbamoyl)-3-(2-isopropylphenyl)azetidin-1-yl)nicotinate | $[M + 1]^+$ 495.30 $t_R$ 1.24 |
| Ex 24-22 | methyl 2-(3-((6-chloro-4-methoxypyridin-3-yl)carbamoyl)-3-(2-isopropylphenyl)azetidin-1-yl)pyrimidine-5-carboxylate | $[M + 1]^+$ 496.30 $t_R$ 1.24 |
| Ex 24-23 | 2-(3-((6-chloro-4-methoxypyridin-3-yl)carbamoyl)-3-(2-isopropylphenyl)azetidin-1-yl)pyrimidine-5-carboxylic acid | $[M + 1]^+$ 482.28 $t_R$ 1.07 |
| Ex 24-24 | methyl 6-(3-((6-chloro-4-methoxypyridin-3-yl)carbamoyl)-3-(2-isopropylphenyl)azetidin-1-yl)pyridazine-3-carboxylate | $[M + 1]^+$ 495.96 $t_R$ 1.11 |
| Ex 24-25 | ethyl 2-(3-((6-chloro-4-methoxypyridin-3-yl)carbamoyl)-3-(2-isopropylphenyl)azetidin-1-yl)oxazole-4-carboxylate | $[M + 1]^+$ 499.28 $t_R$ 1.23 |
| Ex 24-26 | 2-(3-((6-chloro-4-methoxypyridin-3-yl)carbamoyl)-3-(2-isopropylphenyl)azetidin-1-yl)oxazole-4-carboxylic acid | $[M + 1]^+$ 471.26 $t_R$ 1.06 |

Example 25: N-(6-chloro-4-methoxypyridin-3-yl)-3-(2-isopropylphenyl)-1-(1H-tetrazol-5-yl)azetidine-3-carboxamide Step 1. A solution of cyanogen bromide 5N in $CH_3CN$ (164 uL, 0.04 mmol) is added to a solution of Ex 3 (48 mg, 0.13 mmol) and sodium acetate in MeOH (2.5 mL) at 0° C. The reaction mixture is stirred at r.t. overnight, is then quenched with water and diluted with EtOAc (30 mL). The organic solution is washed with aq. sat. $NaHCO_3$, followed by brine and is dried over $MgSO_4$, filtered and evaporated to afford crude N-(6-chloro-4-methoxypyridin-3-yl)-1-cyano-3-(2-isopropylphenyl)azetidine-3-carboxamide as a yellow oil (78 mg).

Step 2. To a solution of crude N-(6-chloro-4-methoxy-pyridin-3-yl)-1-cyano-3-(2-isopropylphenyl)azetidine-3-carboxamide (51 mg, 0.13 mmol) in DMF (2.5 mL) is added ammonium chloride (11 mg, 0.2 mmol) and sodium azide (13 mg, 0.2 mmol) at r.t. The mixture is then heated to 100° C. for 2 h. The reaction mixture is injected in prep. HLPC (Prep-HPLC-1 conditions) to afford the title compound Ex 25 as a white solid (2.4 mg, 4% yield over 2 steps). LCMS-1: $t_R$=0.97 min, $[M+1]^+$ 428.16.

Example 26: N-(6-chloro-4-methoxypyridin-3-yl)-3-(2-isopropylphenyl)-1-(4-oxo-4,5-dihydrooxazol-2-yl)azetidine-3-carboxamide To a solution of Ex 3 (50 mg, 0.14 mmol) in DCM (3 mL), chloroacetyl isocyanate (17.5 uL, 0.14 mmol) is added. The reaction mixture is stirred for 1 h at r.t. (Reaction progress is monitored by LCMS). The mixture is poured into water and is extracted with DCM (2×15 mL). The combined extracts are dried over $MgSO_4$, filtered and concentrated. The residue is dissolved in THE (2 mL) and DBU (41 uL, 0.42 mmol) is added. The reaction mixture is stirred at r.t. for 1 day, is then poured into aq. 1N HCl and is extracted with EtOAc (2×20 mL). The combined extracts are dried over MgSO$_4$, filtered and concentrated. The crude product is purified by prep. HPLC (Prep-HPLC-1 conditions) to give Ex 26 as a yellow oil (37 mg, 67% over 2 steps). LCMS-1: t$_R$=0.97 min, [M+1]$^+$ 443.28.

Example 27: N-(6-chloro-4-methoxypyridin-3-yl)-1-(2-hydroxy-3,4-dioxocyclobut-1-en-1-yl)-3-(2-isopropylphenyl)azetidine-3-carboxamide Step 1. Ex 3 (40 mg, 0.11 mmol) is dissolved in EtOH (0.5 mL) and TEA (46.4 uL, 0.33 mmol) is added. The mixture is then added dropwise to a solution of 3,4-diethoxy-3-cyclobutene-1,2-dione (19.7 uL, 0.13 mmol) in EtOH (0.5 mL). The reaction mixture is stirred at r.t. overnight. Volatiles are evaporated, and the residue is purified by prep. HPLC (Prep-HPLC-2 conditions) to afford N-(6-chloro-4-methoxypyridin-3-yl)-1-(2-ethoxy-3,4-dioxocyclobut-1-en-1-yl)-3-(2-isopropylphenyl)azetidine-3-carboxamide as a white solid (50 mg, 93% yield).

Step 2. To a solution of N-(6-chloro-4-methoxypyridin-3-yl)-1-(2-ethoxy-3,4-dioxocyclobut-1-en-1-yl)-3-(2-isopropylphenyl)azetidine-3-carboxamide (50 mg, 0.10 mmol) in dioxane (2 mL) is added at r.t. 4N HCl in dioxane (1 mL) and one drop of water. The reaction mixture is stirred at r.t. overnight. Volatiles are evaporated and the residue is purified by prep. HPLC (Prep-HPLC-1 conditions) to give the title compound Ex 27 as an off-white solid (5 mg, 11% yield). LCMS-1: t$_R$=1.12 min, [M+1]$^+$ 456.27.

Biological Assays

Beta-Arrestin Recruitment Assay to Determine IC$_{50}$ Values for Human LPAR$_1$ The Tango™ EDG2-bla U2OS cells are obtained from Invitrogen. These cells contain the human LPA$_1$ receptor cDNA linked to a TEV protease site and a Gal4-VP16 transcription factor integrated into the Tango™ GPCR-bla U2OS parental cell line. This parental cell line stably expresses a beta-arrestin/TEV protease fusion protein and the beta-lactamase (bla) reporter gene under the control of a UAS response element. Upon LPA (agonist) binding, LPA$_1$ receptor gets activated, leading to arrestin-protease recruitment and proteolytic release of the transcription factor: The transcription factor then regulates transcription of a beta-lactamase reporter construct, which is measured upon addition of the live-cell substrate.

10'000 Tango™ EDG2-bla U2OS cells are seeded in a 384-well black with clear bottom plate in 30 µl Freestyle 293 Expression Medium (Invitrogen) and incubated for 20 h at 37° C., 5% CO$_2$. For antagonist assays, 5 µl of test compound (dilution series in DMSO/Freestyle 293 Expression medium/0.1% fatty acid free BSA (Sigma)) or buffer control are added per well and incubated for 30 min at 37° C., 5% CO$_2$. 5 µl of LPA 18:1 (500 nM final) (solution in Freestyle 293 Expression medium/0.1% fatty acid free BSA (Sigma)) are added per well and the plate incubated for 16 h at 37° C., 5% CO$_2$. Cells are then loaded with LiveBLAzer-FRET™ B/G Substrate (Invitrogen) for 2 h in the dark and the fluorescence emission at 460 nm and 530 nm is measured using the SynergyMx reader (BioTek). Following the background subtraction from both channels, the 460/530 nm emission ratio for each well is calculated, then plotted and fitted to a 4-parameter logistic function to obtain IC50 values. IC50 is the concentration of antagonist inhibiting 50% of the maximal response.

Antagonistic activities (IC$_{50}$ values) of exemplified compounds have been measured and antagonistic activities are displayed in Table 9.

TABLE 9

| Example | IC$_{50}$ LPAR$_1$ [nM] |
| --- | --- |
| 1 | 48 |
| 2 | 74 |
| 3 | 4 |
| 4 | 6 |
| 5 | 3 |
| 6 | 3 |
| 7 | 41 |
| 8 | 252 |
| 9 | 4 |
| 10 | 12 |
| 11 | 36 |
| 12 | 1200 |
| 13 | 3 |
| 14 | 12 |
| 15 | 196 |
| 16 | 419 |
| 17 | 3 |
| 18-1 | 9 |
| 18-2 | 35 |
| 18-3 | 37 |
| 18-4 | 143 |
| 18-5 | 347 |
| 18-6 | 128 |
| 18-7 | 44 |
| 18-8 | 3 |
| 18-9 | 22 |
| 18-10 | 76 |
| 18-11 | 136 |
| 18-12 | 28 |
| 18-13 | 129 |
| 18-14 | 74 |
| 18-15 | 61 |
| 18-16 | 111 |
| 18-17 | 27 |
| 18-18 | 142 |
| 18-19 | 21 |
| 18-20 | 16 |
| 18-21 | 19 |
| 18-22 | 79 |
| 18-23 | 56 |
| 18-24 | 156 |
| 18-25 | 47 |
| 18-26 | 72 |
| 18-27 | 21 |
| 18-28 | 17 |
| 19-1 | 127 |
| 19-2 | 19 |
| 19-3 | 9 |
| 19-4 | 385 |
| 19-5 | 270 |
| 19-6 | 61 |
| 19-7 | 15 |
| 19-8 | 43 |
| 19-9 | 52 |
| 19-10 | 17 |
| 19-11 | 107 |
| 19-12 | 24 |
| 19-13 | 112 |
| 19-14 | 67 |
| 19-15 | 37 |
| 19-16 | 54 |
| 19-17 | 43 |
| 19-18 | 88 |
| 19-19 | 21 |
| 19-20 | 22 |
| 19-21 | 72 |
| 19-22 | 12 |
| 19-23 | 100 |
| 20-1 | 11 |
| 20-2 | 608 |
| 20-3 | 21 |
| 20-4 | 472 |
| 20-5 | 34 |
| 21-1 | 17 |
| 21-2 | 3 |
| 21-3 | 2 |

TABLE 9-continued

| Example | IC$_{50}$ LPAR$_1$ [nM] |
|---|---|
| 21-4 | 1 |
| 21-5 | 6 |
| 21-6 | 44 |
| 21-7 | 3 |
| 21-8 | 16 |
| 21-9 | 2 |
| 21-10 | 37 |
| 21-11 | 42 |
| 21-12 | 19 |
| 21-13 | 22 |
| 21-14 | 4 |
| 21-15 | 5 |
| 21-16 | 12 |
| 21-17 | 16 |
| 21-18 | 1560 |
| 21-19 | 4 |
| 21-20 | 73 |
| 21-21 | 56 |
| 22-1 | 22 |
| 22-2 | 12 |
| 22-3 | 6 |
| 22-4 | 9 |
| 22-5 | 5 |
| 22-6 | 3 |
| 22-7 | 18 |
| 22-8 | 12 |
| 22-9 | 34 |
| 22-10 | 15 |
| 22-11 | 18 |
| 22-12 | 431 |
| 22-13 | 7 |
| 22-14 | 204 |
| 22-15 | 74 |
| 22-16 | 201 |
| 23-1 | 6 |
| 23-2 | 69 |
| 24-1 | 2 |
| 24-2 | 2 |
| 24-3 | 2 |
| 24-4 | 2 |
| 24-5 | 3 |
| 24-6 | 91 |
| 24-7 | 1 |
| 24-8 | 1 |
| 24-9 | 8 |
| 24-10 | 2 |
| 24-11 | 5 |
| 24-12 | 7 |
| 24-13 | 5 |
| 24-14 | 8 |
| 24-15 | 29 |
| 24-16 | 13 |
| 24-17 | 3 |
| 24-18 | 5 |
| 24-19 | 9 |
| 24-20 | 145 |
| 24-21 | 12 |
| 24-22 | 22 |
| 24-23 | 3150 |
| 24-24 | 24 |
| 24-25 | 15 |
| 24-26 | 91 |
| 25 | 270 |
| 26 | 12 |
| 27 | 55 |

Assessment of In Vivo Potency

The in vivo potency of the compounds of Formula (I) can be determined using a mouse LPA-induced skin vascular leakage model. Female Balb/c mice are treated with either vehicle or test compound (e.g. at 30 mg/kg or 100 mg/kg p.o.) for at least 1 h prior to administration of the albumin marker Evans blue (50 mg/kg, i.v., 0.9% NaCl) and subsequent challenge with LPA (5 μg, i.d.). After 30 minutes, mice are sacrificed by CO$_2$ inhalation. Discs of skin from the injection sites are removed, digested in formamide (500 μl, 37° C., 24 hrs) and the content of Evans blue quantified by colorimetric assay. Results are expressed as extravasated Evans blue per skin disc (μg/disc).

As an example, selected compound of the present invention, Ex 21-2, is able to effectively reduce LPA-induced vascular leakage after oral administration of 30 mg/kg to mice as compared to a group of animals treated with vehicle only. Reduction of vascular leakage compared to vehicle group was >60%.

The invention claimed is:

1. A compound of Formula (I),

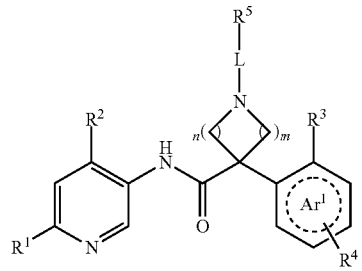

Formula (I)

wherein
R$^1$ is hydrogen, halogen, methyl, or trifluoromethyl;
R$^2$ is C$_{1-3}$-alkoxy, cyclopropyloxy or methoxy-C$_{2-3}$-alkoxy;
Ar$^1$ represents phenyl, or 6-membered heteroaryl containing one or two nitrogen atoms, wherein said group Ar$^1$ is substituted with R$^3$ and R$^4$, wherein
R$^3$ is n-propyl, isopropyl, or C$_{3-6}$-cycloalkyl; and
R$^4$ represents one substituent independently selected from hydrogen, fluoro, methyl and methoxy;
m and n independently represent the integer 1 or 2; and
the group -L-R$^5$ represents
hydrogen;
—C$_{1-4}$-alkyl;
—C$_{0-6}$-alkylene-C$_{3-6}$-cycloalkyl; wherein the C$_{3-6}$-cycloalkyl independently is unsubstituted or mono-substituted with halogen;
—CO—H;
-L$^1$—CO—R$^{C11}$ wherein R$^{C11}$ independently represents hydroxy; —O-benzyl; —O—C$_{1-6}$-alkyl; C$_1$-fluoroalkyl; or —NR$^{N11}$R$^{N12}$; wherein independently R$^{N11}$ is hydrogen or C$_{1-4}$-alkyl, and R$^{N12}$ is hydrogen, C$_{1-4}$-alkyl, —SO$_2$—C$_{1-6}$-alkyl, or —O—R$^{O11}$, wherein R$^{O11}$ independently represents hydrogen, C$_{1-6}$-alkyl, or benzyl; and
-L$^1$-independently represents
—C$_{1-6}$-alkylene-, —CO—C$_{1-6}$-alkylene-, —SO$_2$—C$_{1-6}$-alkylene-, —CO—O—C$_{1-6}$-alkylene-, —CO—NH—C$_{1-6}$-alkylene-, or —SO$_2$—NH—C$_{1-6}$-alkylene-;
—C$_{1-6}$-alkylene-, —CO—C$_{1-6}$-alkylene-, or —SO$_2$—C$_{1-6}$-alkylene-; wherein in the above groups said C$_{1-6}$-alkylene independently is mono-substituted with hydroxy, C$_{1-3}$-alkoxy, —O—CO—C$_{1-4}$-alkyl, or —NR$^{N13}$R$^{N14}$; wherein independently R$^{N13}$ is hydrogen or C$_{1-4}$-alkyl, and R$^{N14}$ is hydrogen, C$_{1-4}$-alkyl or —CO—O—C$_{1-4}$-alkyl;

—$C_{2-6}$-alkylene-, —CO—$C_{2-6}$-alkylene-, or —$SO_2$—$C_{2-6}$-alkylene-; wherein in the above groups said $C_{2-6}$-alkylene independently is di-substituted wherein the substituents are independently selected from hydroxy and —$NR^{N15}R^{N16}$, wherein independently $R^{N15}$ is hydrogen or $C_{1-4}$-alkyl, and $R^{N16}$ is hydrogen, $C_{1-4}$-alkyl or —CO—O—$C_{1-4}$-alkyl;

—$C_{0-4}$-alkylene-$C_{3-8}$-cycloalkylene-$C_{0-4}$-alkylene-, —CO—$C_{0-4}$-alkylene-$C_{3-8}$-cycloalkylene-$C_{0-4}$-alkylene-, —$SO_2$—$C_{0-4}$-alkylene-$C_{3-8}$-cycloalkylene-$C_{0-4}$-alkylene-, —CO—NH—$C_{0-4}$-alkylene-$C_{3-8}$-cycloalkylene-$C_{0-4}$-alkylene-, or —CO—O—$C_{0-4}$-alkylene-$C_{3-8}$-cycloalkylene-$C_{0-4}$-alkylene-;

—$C_{0-4}$-alkylene-$Cy^1$-$C_{0-4}$-alkylene-, —CO—$C_{0-4}$-alkylene-$Cy^1$-$C_{0-4}$-alkylene-, —CO—O—$C_{0-4}$-alkylene-$Cy^1$-$C_{0-4}$-alkylene-, —CO—NH—$C_{0-4}$-alkylene-$Cy^1$-$C_{0-4}$-alkylene-, —$SO_2$—$C_{0-4}$-alkylene-$Cy^1$-$C_{0-4}$-alkylene-, or —$SO_2$—NH—$C_{0-4}$-alkylene-$Cy^1$-$C_{0-4}$-alkylene-; wherein $Cy^1$ independently represents a $C_{3-6}$-heterocycloalkylene containing one ring oxygen atom, or one ring nitrogen atom, wherein said ring nitrogen, in case it has a free valency, independently is mono-substituted with H, $C_{1-4}$-alkyl or —CO—O—$C_{1-4}$-alkyl;

—$C_{2-4}$-alkylene-O—$C_{2-4}$-alkylene-O—$C_{1-4}$-alkylene-, or —CO—$C_{1-4}$-alkylene-O—$C_{2-4}$-alkylene-O—$C_{1-4}$-alkylene-;

—$C_{2-4}$-alkylene-$X^{11}$—$C_{1-4}$-alkylene-, —CO—O—$C_{2-4}$-alkylene-$X^{11}$—$C_{1-4}$-alkylene-, —CO—NH—$C_{2-4}$-alkylene-$X^{11}$—$C_{1-4}$-alkylene-, or —$SO_2$—NH—$C_{2-4}$-alkylene-$X^{11}$—$C_{1-4}$-alkylene-; wherein $X^{11}$ independently represents oxygen, or a nitrogen atom which is independently mono-substituted with H, $C_{1-4}$-alkyl, $C_{3-6}$-cycloalkyl, or —CO—O—$C_{1-4}$-alkyl;

—CO—$C_{1-4}$-alkylene-$X^{12}$—$C_{1-4}$-alkylene-, —$SO_2$—$C_{1-4}$-alkylene-$X^{12}$—$C_{1-4}$-alkylene-, or —CO—$C_{1-4}$-alkylene-$X^{12}$—$C_{0-4}$-alkylene-$C_{3-6}$-cycloalkylene-$C_{0-4}$-alkylene-; wherein $X^{12}$ independently represents oxygen, or a nitrogen atom which is independently mono-substituted with H, $C_{1-4}$-alkyl, $C_{3-6}$-cycloalkyl, —CO—O—$C_{1-4}$-alkyl, or $C_{1-3}$-alkoxy-$C_{2-4}$-alkyl;

—$C_{2-4}$-alkylene-$X^{13}$—$C_{1-4}$-alkylene-; wherein $X^{13}$ represents —NH—CO—, and wherein said $C_{2-4}$-alkylene independently is unsubstituted, or mono-substituted with hydroxy;

—$C_{1-4}$-alkylene-$X^{14}$—$C_{1-4}$-alkylene-; wherein $X^{14}$ represents —CO—NH—;

—CO—$C_{2-6}$-alkenylene- or —$SO_2$—$C_{2-6}$-alkenylene-; or

—CO—$C_{2-6}$-fluoroalkylene-;

-$L^2$-hydroxy; wherein -$L^2$- represents

—CO—$C_{1-6}$-alkylene- or —$SO_2$—$C_{1-6}$-alkylene-; wherein in the above groups said $C_{1-6}$-alkylene independently is unsubstituted, or mono-substituted with hydroxy, $C_1$-fluoroalkyl, or —$NR^{N21}R^{N22}$ wherein independently $R^{N21}$ is hydrogen or $C_{1-4}$-alkyl, and $R^{N22}$ is hydrogen, $C_{1-4}$-alkyl or —CO—O—$C_{1-4}$-alkyl;

—$C_{2-6}$-alkylene-, —CO—O—$C_{2-6}$-alkylene-, —CO—NH—$C_{2-6}$-alkylene-, or —$SO_2$—NH—$C_{2-6}$-alkylene-, wherein in the above groups said $C_{2-6}$-alkylene independently is unsubstituted, or mono-substituted with hydroxy, $C_1$-fluoroalkyl, or —$NR^{N23}R^{N24}$ wherein independently $R^{N23}$ is hydrogen or $C_{1-4}$-alkyl, and $R^{N24}$ is hydrogen, $C_{1-4}$-alkyl or —CO—O—$C_{1-4}$-alkyl;

—$C_{0-4}$-alkylene-$C_{3-6}$-cycloalkylene-$C_{0-4}$-alkylene-, —CO—$C_{0-4}$-alkylene-$C_{3-6}$-cycloalkylene-$C_{0-4}$-alkylene-, or —$SO_2$—$C_{0-4}$-alkylene-$C_{3-6}$-cycloalkylene-$C_{0-4}$-alkylene-;

—$C_{0-4}$-alkylene-$Cy^2$-$C_{0-4}$-alkylene-, —CO—$C_{0-4}$-alkylene-$Cy^2$-$C_{0-4}$-alkylene-, or —$SO_2$—$C_{0-4}$-alkylene-$Cy^2$-$C_{0-4}$-alkylene-; wherein $Cy^2$ independently represents a $C_{3-6}$-heterocycloalkylene group containing one ring oxygen atom, or one ring nitrogen atom; wherein said ring nitrogen, in case it has a free valency, is independently mono-substituted with H, $C_{1-4}$-alkyl or —CO—O—$C_{1-4}$-alkyl;

—$C_{2-4}$-alkylene-(O—$C_{2-4}$-alkylene)$_p$- or —CO—$C_{1-4}$-alkylene-(O—$C_{2-4}$-alkylene)$_p$-; wherein p independently represents the integer 1 or 2;

—$C_{2-4}$-alkylene-$X^{21}$—$C_{2-4}$-alkylene-; wherein $X^{21}$ represents a nitrogen atom which is mono-substituted with H, $C_{1-4}$-alkyl, $C_{3-6}$-cycloalkyl, or —CO—O—$C_{1-4}$-alkyl;

—CO—$C_{1-4}$-alkylene-$X^{22}$—$C_{2-4}$-alkylene-, —CO—$C_{1-4}$-alkylene-$X^{22}$—$C_{1-4}$-alkylene-$C_{3-6}$-cycloalkylene-, or —$SO_2$—$C_{1-4}$-alkylene-$X^{22}$—$C_{2-4}$-alkylene-; wherein $X^{22}$ represents a nitrogen atom which is independently mono-substituted with H, $C_{1-4}$-alkyl, $C_{3-6}$-cycloalkyl, or —CO—O—$C_{1-4}$-alkyl;

—$C_{2-4}$-alkylene-$X^{23}$—$C_{1-4}$-alkylene-; wherein $X^{23}$ represents —NH—CO—, and wherein said $C_{2-4}$-alkylene independently is unsubstituted, or mono-substituted with hydroxy;

—$C_{1-4}$-alkylene-$X^{24}$—$C_{2-4}$-alkylene-; wherein $X^{24}$ represents —CO—NH—, and wherein said $C_{2-4}$-alkylene independently is unsubstituted, or mono-substituted with hydroxy; or 3,4-dioxocyclobut-1-ene-1,2-diyl;

-$L^3$-O—$R^{O31}$ wherein $R^{O31}$ is-$C_{1-4}$-alkyl, —CO—$C_{1-4}$-alkyl or —CO—$C_{2-4}$-alkenyl; and -$L^3$-independently represents —$C_{2-6}$-alkylene-, —CO—$C_{1-6}$-alkylene- or —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-;

-$L^4$-$NR^{N1}R^{N2}$ wherein independently $R^{N1}$ is hydrogen or $C_{1-4}$-alkyl; and $R^{N2}$ is hydrogen; $C_{1-4}$-alkyl; $C_{1-3}$-fluoroalkyl; $C_{3-6}$-cycloalkyl; $C_{1-3}$-alkoxy-$C_{2-4}$-alkylene; —CO—$C_{1-4}$-alkyl; —$SO_2$-$C_{1-4}$-alkyl; or —$SO_2$-$C_1$-fluoroalkyl; and -$L^4$-independently represents —$C_{2-6}$-alkylene-, —CO—$C_{1-6}$-alkylene-, —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-; or —$C_{0-4}$-alkylene-$Cy^4$-$C_{0-4}$-alkylene-, —CO—$C_{0-4}$-alkylene-$Cy^4$-$C_{0-4}$-alkylene-, or —$SO_2$—$C_{0-4}$-alkylene-$Cy^4$-$C_{0-4}$-alkylene-; wherein $Cy^4$ independently represents a $C_{3-6}$-heterocycloalkylene group containing one ring oxygen atom;

-$L^5$-$NR^{N3}R^{N4}$ wherein $R^{N3}$ is hydrogen, $C_{1-4}$-alkyl, or $C_{1-3}$-alkoxy-$C_{2-4}$-alkylene; and $R^{N4}$ is-CO—O—$C_{1-4}$-alkyl; —CO—$NR^{N51}R^{N52}$ wherein $R^{N51}$ and $R^{N52}$ are independently selected from hydrogen and $C_{1-4}$-alkyl; or —$SO_2$—$NR^{N53}R^{N54}$ wherein independently $R^{N53}$ is hydrogen or $C_{1-4}$-alkyl, and $R^{N54}$ is hydrogen, $C_{1-4}$-alkyl, or —CO—$C_{1-4}$-alkyl;

and -$L^5$-independently represents
- —$C_{2-6}$-alkylene-, —CO—$C_{1-6}$-alkylene- or —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-;

-$L^6$-N($R^{N61}$)—O—$R^{O61}$ wherein $R^{N61}$ is hydrogen, —CO—$C_{1-4}$-alkyl, or —CO—O—$C_{1-4}$-alkyl; and $R^{O61}$ independently represents hydrogen, $C_{1-6}$-alkyl, or benzyl;

and -$L^6$-independently represents
- —$C_{2-6}$-alkylene-, —CO—$C_{1-6}$-alkylene-, —$SO_2$—$C_{1-6}$-alkylene-, —CO—O—$C_{2-6}$-alkylene-, —CO—NH—$C_{2-6}$-alkylene-, or —$SO_2$—NH—$C_{2-6}$-alkylene-;

-$L^7$-N$R^{N5}R^{N6}$ wherein $R^{N5}$ is hydrogen or $C_{1-4}$-alkyl; $R^{N6}$ is hydrogen, $C_{1-4}$-alkyl, —CO—$C_{1-4}$-alkyl, $C_{1-3}$-fluoroalkyl, or $C_{3-6}$-cycloalkyl; and -$L^7$-independently represents
- —CO—, or —$SO_2$—;

-$L^8$—$SO_2$—$R^{S81}$ wherein $R^{S81}$ independently represents —$C_{1-6}$-alkyl; $C_1$-fluoroalkyl; hydroxy; —$NR^{N81}R^{N82}$ wherein independently $R^{N81}$ is hydrogen or $C_{1-4}$-alkyl, and $R^{N82}$ is hydrogen, $C_{1-4}$-alkyl, —CO—$C_{1-6}$-alkyl; and -$L^8$-independently represents
- —$C_{1-6}$-alkylene-, —CO—$C_{1-6}$-alkylene-, —$SO_2$—$C_{1-6}$-alkylene-, —CO—O—$C_{2-6}$-alkylene-, —CO—NH—$C_{1-6}$-alkylene-, or —$SO_2$—NH—$C_{1-6}$-alkylene-;

-$L^9$-HET$^1$, wherein HET$^1$ represents 5- or 6-membered heteroaryl, wherein said HET$^1$ independently is unsubstituted or mono-, or di-substituted, wherein the substituents are independently selected from $C_{1-4}$-alkyl; halogen; cyano; hydroxy; hydroxymethyl; —$C_{0-2}$-alkylene-$Cy^{91}$—COO$R^{O91}$ wherein $R^{O91}$ is hydrogen or $C_{1-4}$-alkyl, and wherein $Cy^{91}$ represents a $C_{3-6}$-cycloalkylene group; or -$C_{0-2}$-alkylene-COO$R^{O92}$ wherein $R^{O92}$ is hydrogen or $C_{1-4}$-alkyl; and -$L^9$-independently represents
- —$C_{0-6}$-alkylene-, —CO—$C_{0-6}$-alkylene-, —$SO_2$—$C_{0-6}$-alkylene-, —CO—O—$C_{1-6}$-alkylene-, —CO—NH—$C_{1-6}$-alkylene-, or —$SO_2$—NH—$C_{1-6}$-alkylene-;

-$L^{10}$-$C_{4-6}$-heterocyclyl, wherein the $C_{4-6}$-heterocyclyl independently contains one or two ring heteroatoms independently selected from nitrogen, sulfur and oxygen; wherein in the above groups said $C_{4-6}$-heterocyclyl independently is unsubstituted, or mono-, di-, or tri-substituted wherein the substituents are independently selected from:
- one or two oxo substituents each attached to a ring carbon atom in alpha position to a ring nitrogen atom; and/or
- two methyl substituents attached to a ring carbon atom in alpha position to a ring nitrogen atom or a ring oxygen atom; and/or
- two oxo substituents at a ring sulfur atom; and/or
- $C_{1-4}$-alkyl, $C_{1-3}$-alkoxy-$C_{2-4}$-alkyl, $C_{2-3}$-fluoroalkyl, or —CO—$C_{1-4}$-alkyl attached to a ring nitrogen atom having a free valency; and -$L^{10}$-independently represents
- —$C_{0-6}$-alkylene-, —CO—$C_{0-6}$-alkylene-, —$SO_2$—$C_{0-6}$-alkylene-, —CO—O—$C_{1-6}$-alkylene-, —CO—NH—$C_{1-6}$-alkylene-, or —$SO_2$—NH—$C_{1-6}$-alkylene-;

-$L^{11}$-cyano; wherein -$L^{11}$- represents —CO—$C_{1-6}$-alkylene-, —$SO_2$—$C_{1-6}$-alkylene, or —$C_{0-6}$-alkylene-;

-$L^{12}$-$NO_2$; wherein -$L^{12}$- represents —$C_{2-6}$-alkylene-; or

-$L^{13}$-$C_{1-4}$-alkyl; wherein -$L^{13}$- represents —CO—, —CO—O—, or —$SO_2$—;

or a pharmaceutically acceptable salt thereof.

2. A compound according to claim 1, wherein $R^1$ is halogen; or a pharmaceutically acceptable salt thereof.

3. A compound according to claim 1, wherein $R^2$ is $C_{1-3}$-alkoxy;

or a pharmaceutically acceptable salt thereof.

4. A compound according to claim 1, wherein $Ar^1$ represents phenyl;
wherein said phenyl group is substituted with $R^3$ and $R^4$, wherein
$R^3$ represents isopropyl; and
$R^4$ represents hydrogen;
or a pharmaceutically acceptable salt thereof.

5. A compound according to claim 1, wherein the fragment:

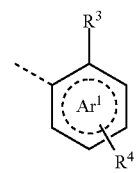

represents a ring independently selected from:

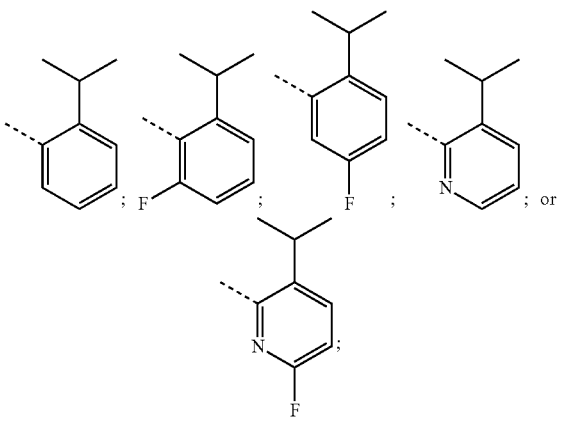

or a pharmaceutically acceptable salt thereof.

6. A compound according to claim 1, wherein m and n both are 1;
or a pharmaceutically acceptable salt thereof.

7. A compound according to claim 1, wherein the group -L-$R^5$ represents
hydrogen;
—$C_{1-4}$-alkyl;
—$C_{0-6}$-alkylene-$C_{3-6}$-cycloalkyl; wherein the $C_{3-6}$-cycloalkyl independently is unsubstituted or mono-substituted with halogen;

—CO—H;
-L$^1$—CO—R$^{C11}$ wherein R$^{C11}$ independently represents hydroxy; or —O—C$_{1-6}$-alkyl; and
-L$^1$-independently represents
—C$_{1-6}$-alkylene-, —CO—C$_{1-6}$-alkylene-, or —CO—NH—C$_{1-6}$-alkylene-;
-L$^2$-hydroxy; wherein -L$^2$- represents
—CO—C$_{1-6}$-alkylene- or —SO$_2$—C$_{1-6}$-alkylene-;
—C$_{2-6}$-alkylene-, —CO—NH—C$_{2-6}$-alkylene-, or —SO$_2$—NH—C$_{2-6}$-alkylene-, wherein in the above groups said C$_{2-6}$-alkylene independently is unsubstituted, or mono-substituted with hydroxy; or 3,4-dioxocyclobut-1-ene-1,2-diyl;
-L$^3$-O—R$^{O31}$ wherein R$^{O31}$ is-C$_{1-4}$-alkyl or —CO—C$_{2-4}$-alkenyl; and
-L$^3$-independently represents
—SO$_2$—C$_{1-6}$-alkylene-, —CO—O—C$_{2-6}$-alkylene-, —CO—NH—C$_{2-6}$-alkylene-, or —SO$_2$—NH—C$_{2-6}$-alkylene-;
-L$^4$-NR$^{N1}$R$^{N2}$ wherein independently R$^{N1}$ is hydrogen or C$_{1-4}$-alkyl; and R$^{N2}$ is hydrogen; C$_{1-4}$-alkyl; or —SO$_2$—C$_{1-4}$-alkyl; and
-L$^4$-independently represents
—C$_{2-6}$-alkylene-, —CO—C$_{1-6}$-alkylene-, or —SO$_2$—C$_{1-6}$-alkylene-;
-L$^5$-NR$^{N3}$R$^{N4}$ wherein R$^{N3}$ is hydrogen, or C$_{1-4}$-alkyl; and R$^{N4}$ is-SO$_2$—NR$^{N53}$R$^{N54}$ wherein independently R$^{N53}$ is hydrogen or C$_{1-4}$-alkyl, and R$^{N54}$ is hydrogen, or C$_{1-4}$-alkyl;
and -L$^5$-independently represents
—C$_{2-6}$-alkylene-, —CO—C$_{1-6}$-alkylene- or —SO$_2$—C$_{1-6}$-alkylene-;
-L$^7$-NR$^{N5}$R$^{N6}$ wherein R$^{N5}$ is hydrogen or C$_{1-4}$-alkyl; R$^{N6}$ is hydrogen, C$_{1-4}$-alkyl, or C$_{3-6}$-cycloalkyl; and
-L$^7$-independently represents
—CO—, or —SO$_2$—;
-L$^8$—SO$_2$—R$^{S81}$ wherein R$^{S81}$ independently represents
—C$_{1-6}$-alkyl; C$_1$-fluoroalkyl; or hydroxy; and
-L$^8$-independently represents
—C$_{1-6}$-alkylene-, —CO—C$_{1-6}$-alkylene-, or —SO$_2$—C$_{1-6}$-alkylene-;
-L$^9$-HET$^1$, wherein HET$^1$ represents 5- or 6-membered heteroaryl, wherein said HET$^1$ independently is unsubstituted or mono-, or di-substituted wherein the substituents are independently selected from C$_{1-4}$-alkyl; halogen; cyano; hydroxy; hydroxymethyl; and -C$_{0-2}$-alkylene-COOR$^{O92}$ wherein R$^{O92}$ is hydrogen or C$_{1-4}$-alkyl; and
-L$^9$-independently represents
—C$_{0-6}$-alkylene-, —CO—C$_{0-6}$-alkylene-, or —SO$_2$—C$_{0-6}$-alkylene;
-L$^{10}$-C$_{4-6}$-heterocyclyl, wherein the C$_{4-6}$-heterocyclyl independently contains one or two ring heteroatoms independently selected from nitrogen and oxygen; wherein in the above groups said C$_{4-6}$-heterocyclyl independently is unsubstituted, or mono-, or di-substituted wherein the substituents are independently selected from:
one or two oxo substituents each attached to a ring carbon atom in alpha position to a ring nitrogen atom; and/or
two methyl substituents attached to a ring carbon atom in alpha position to a ring nitrogen atom or a ring oxygen atom; and
-L$^{10}$-independently represents
—C$_{0-6}$-alkylene-, —CO—C$_{0-6}$-alkylene-, or —SO$_2$—C$_{0-6}$-alkylene-; or -L$^{13}$-C$_{1-4}$-alkyl; wherein -L$^{13}$- represents —CO—, —CO—O—, or —SO$_2$—;
or a pharmaceutically acceptable salt thereof.

8. A compound according to claim 1, wherein the group -L-R$^5$ represents hydrogen;
isopropyl, isobutyl;
cyclobutyl;
—CO—H;
-L$^1$—COOH; wherein -L$^1$- represents
*—CH$_2$—C(CH$_3$)$_2$—, *—CH$_2$—CH$_2$—C(CH$_3$)$_2$—, *—CH$_2$—CH$_2$—CH$_2$—C(CH$_3$)$_2$—, or *—CO—CH$_2$—C(CH$_3$)$_2$—;
-L$^2$-hydroxy; wherein -L$^2$- represents
—CH$_2$—CH$_2$—, *—CH$_2$—CH(OH)—CH$_2$—;
*—CO—NH—CH$_2$—CH$_2$—; or
*—SO$_2$—CH$_2$—CH$_2$—;
-L$^3$-O—CH$_3$, or -L$^3$-O—CO—C(CH$_3$)—CH$_2$, wherein -L$^3$- represents
*—CO—NH—CH$_2$—CH$_2$—;
-L$^7$-NH$_2$, -L$^7$-NH—CH$_3$, -L$^7$-NH—CH$_2$—CH$_3$, -L$^7$-NH—CH(CH$_3$)$_2$, or -L$^7$-NH-cyclopropyl; wherein -L$^7$- represents
—CO—, or —SO$_2$—;
-L$^9$-HET$^1$; wherein -L$^9$-HET$^1$ represents

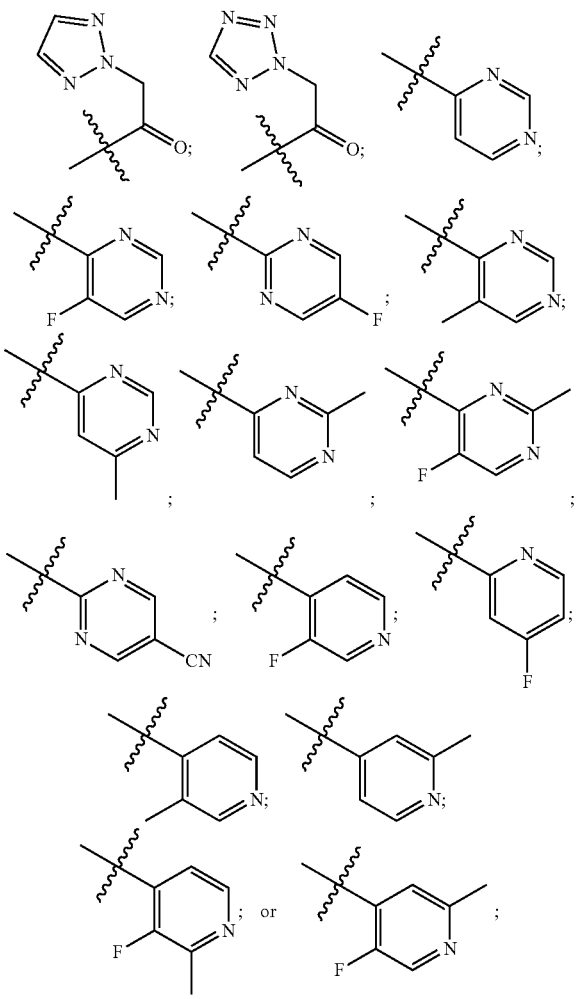

-L$^{10}$-C$_{4-6}$-heterocyclyl; wherein -L$^{10}$-C$_{4-6}$-heterocyclyl represents

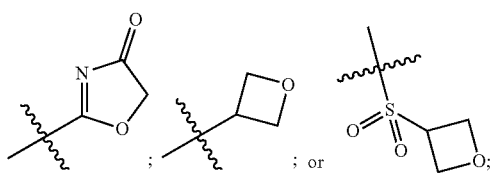

or

-L¹³-methyl; wherein -L¹³- represents —CO—, or —SO₂—;

wherein in the above groups the asterisks indicate the bond which is connected to the rest of the molecule;

or a pharmaceutically acceptable salt thereof.

9. A compound according to claim 1, wherein the group -L-R⁵ represents —SO₂—NH₂;

or a pharmaceutically acceptable salt thereof.

10. A compound, wherein said compound is selected from the group consisting of:
- N-(6-fluoro-4-methoxypyridin-3-yl)-3-(2-isopropylphenyl)azetidine-3-carboxamide;
- 3-(2-isopropylphenyl)-N-(4-methoxypyridin-3-yl)azetidine-3-carboxamide;
- N-(6-chloro-4-methoxypyridin-3-yl)-3-(2-isopropylphenyl)azetidine-3-carboxamide;
- N-(6-bromo-4-methoxypyridin-3-yl)-3-(2-isopropylphenyl)azetidine-3-carboxamide;
- N-(6-chloro-4-ethoxypyridin-3-yl)-3-(2-isopropylphenyl)azetidine-3-carboxamide;
- N-(6-chloro-4-isopropoxypyridin-3-yl)-3-(2-isopropylphenyl)azetidine-3-carboxamide;
- N-(6-chloro-4-cyclopropoxypyridin-3-yl)-3-(2-isopropylphenyl)azetidine-3-carboxamide;
- N-(6-chloro-4-(2-methoxyethoxy)pyridin-3-yl)-3-(2-isopropylphenyl)azetidine-3-carboxamide;
- (S)—N-(6-chloro-4-((1-methoxypropan-2-yl)oxy)pyridin-3-yl)-3-(2-isopropylphenyl)azetidine-3-carboxamide;
- N-(6-chloro-4-methoxypyridin-3-yl)-4-(2-isopropylphenyl)piperidine-4-carboxamide;
- 3-(2-isopropylphenyl)-N-(4-methoxy-6-methylpyridin-3-yl)azetidine-3-carboxamide;
- 3-(2-isopropylphenyl)-N-(4-methoxy-6-(trifluoromethyl)pyridin-3-yl)azetidine-3-carboxamide;
- N-(6-chloro-4-methoxypyridin-3-yl)-3-(2-fluoro-6-isopropylphenyl)azetidine-3-carboxamide;
- N-(6-chloro-4-methoxypyridin-3-yl)-3-(5-fluoro-2-isopropylphenyl)azetidine-3-carboxamide;
- N-(6-chloro-4-methoxypyridin-3-yl)-3-(3-isopropylpyridin-2-yl)azetidine-3-carboxamide;
- N-(6-chloro-4-methoxypyridin-3-yl)-3-(6-fluoro-3-isopropylpyridin-2-yl)azetidine-3-carboxamide;
- N-(6-chloro-4-methoxypyridin-3-yl)-3-(2-cyclopentylphenyl)azetidine-3-carboxamide;
- N-(6-chloro-4-methoxypyridin-3-yl)-1-isopropyl-3-(2-isopropylphenyl)azetidine-3-carboxamide;
- N-(6-chloro-4-methoxypyridin-3-yl)-1-isobutyl-3-(2-isopropylphenyl)azetidine-3-carboxamide;
- N-(6-chloro-4-methoxypyridin-3-yl)-1-(2-hydroxyethyl)-3-(2-isopropylphenyl)azetidine-3-carboxamide;
- 1-(2-(1H-tetrazol-5-yl)ethyl)-N-(6-chloro-4-methoxypyridin-3-yl)-3-(2-isopropylphenyl)azetidine-3-carboxamide;
- 1-(3-(1H-tetrazol-5-yl)propyl)-N-(6-chloro-4-methoxypyridin-3-yl)-3-(2-isopropylphenyl)azetidine-3-carboxamide;
- 2-(3-((6-chloro-4-methoxypyridin-3-yl)carbamoyl)-3-(2-isopropylphenyl)azetidin-1-yl)acetic acid;
- 1-(2-aminoethyl)-N-(6-chloro-4-methoxypyridin-3-yl)-3-(2-isopropylphenyl)azetidine-3-carboxamide;
- N-(6-chloro-4-methoxypyridin-3-yl)-1-cyclobutyl-3-(2-isopropylphenyl)azetidine-3-carboxamide;
- N-(6-chloro-4-methoxypyridin-3-yl)-3-(2-isopropylphenyl)-1-(oxetan-3-yl)azetidine-3-carboxamide;
- N-(6-chloro-4-methoxypyridin-3-yl)-1-((1-fluorocyclopropyl)methyl)-3-(2-isopropylphenyl)azetidine-3-carboxamide;
- (R)—N-(6-chloro-4-methoxypyridin-3-yl)-1-((2,2-dimethyl-1,3-dioxolan-4-yl)methyl)-3-(2-isopropylphenyl)azetidine-3-carboxamide;
- (R)—N-(6-chloro-4-methoxypyridin-3-yl)-1-(2,3-dihydroxypropyl)-3-(2-isopropylphenyl)azetidine-3-carboxamide;
- 1-((1H-pyrazol-3-yl)methyl)-N-(6-chloro-4-methoxypyridin-3-yl)-3-(2-isopropylphenyl)azetidine-3-carboxamide;
- 1-((1H-pyrazol-4-yl)methyl)-N-(6-chloro-4-methoxypyridin-3-yl)-3-(2-isopropylphenyl)azetidine-3-carboxamide;
- 1-((1H-1,2,3-triazol-4-yl)methyl)-N-(6-chloro-4-methoxypyridin-3-yl)-3-(2-isopropylphenyl)azetidine-3-carboxamide;
- methyl 4-(3-((6-chloro-4-methoxypyridin-3-yl)carbamoyl)-3-(2-isopropylphenyl)azetidin-1-yl)-2,2-dimethylbutanoate;
- 4-(3-((6-chloro-4-methoxypyridin-3-yl)carbamoyl)-3-(2-isopropylphenyl)azetidin-1-yl)-2,2-dimethylbutanoic acid;
- methyl 4-(3-((6-chloro-4-ethoxypyridin-3-yl)carbamoyl)-3-(2-isopropylphenyl)azetidin-1-yl)-2,2-dimethylbutanoate;
- 4-(3-((6-chloro-4-ethoxypyridin-3-yl)carbamoyl)-3-(2-isopropylphenyl)azetidin-1-yl)-2,2-dimethylbutanoic acid;
- 4-(3-((6-chloro-4-isopropoxypyridin-3-yl)carbamoyl)-3-(2-isopropylphenyl)azetidin-1-yl)-2,2-dimethylbutanoic acid;
- methyl 4-(4-((6-chloro-4-methoxypyridin-3-yl)carbamoyl)-4-(2-isopropylphenyl)piperidin-1-yl)-2,2-dimethylbutanoate;
- 4-(4-((6-chloro-4-methoxypyridin-3-yl)carbamoyl)-4-(2-isopropylphenyl)piperidin-1-yl)-2,2-dimethylbutanoic acid;
- 4-(3-((6-bromo-4-methoxypyridin-3-yl)carbamoyl)-3-(2-isopropylphenyl)azetidin-1-yl)-2,2-dimethylbutanoic acid;
- ethyl 5-(3-((6-chloro-4-methoxypyridin-3-yl)carbamoyl)-3-(2-isopropylphenyl)azetidin-1-yl)-2,2-dimethylpentanoate;
- 5-(3-((6-chloro-4-methoxypyridin-3-yl)carbamoyl)-3-(2-isopropylphenyl)azetidin-1-yl)-2,2-dimethylpentanoic acid;
- ethyl 5-(3-((6-chloro-4-ethoxypyridin-3-yl)carbamoyl)-3-(2-isopropylphenyl)azetidin-1-yl)-2,2-dimethylpentanoate;
- 5-(3-((6-chloro-4-ethoxypyridin-3-yl)carbamoyl)-3-(2-isopropylphenyl)azetidin-1-yl)-2,2-dimethylpentanoic acid;
- N-(6-chloro-4-methoxypyridin-3-yl)-3-(2-isopropylphenyl)-1-(2-(sulfamoylamino)ethyl)azetidine-3-carboxamide;

N-(6-chloro-4-methoxypyridin-3-yl)-1-(3-hydroxypropanoyl)-3-(2-isopropylphenyl)azetidine-3-carboxamide;

1-acetyl-N-(6-chloro-4-methoxypyridin-3-yl)-3-(2-isopropylphenyl)azetidine-3-carboxamide;

N-(6-chloro-4-methoxypyridin-3-yl)-1-formyl-3-(2-isopropylphenyl)azetidine-3-carboxamide;

N-(6-chloro-4-methoxypyridin-3-yl)-3-(2-isopropylphenyl)-1-(oxetane-3-carbonyl)azetidine-3-carboxamide;

N-(6-chloro-4-methoxypyridin-3-yl)-1-(3-hydroxyisoxazole-5-carbonyl)-3-(2-isopropylphenyl)azetidine-3-carboxamide;

N-(6-chloro-4-methoxypyridin-3-yl)-1-(5-hydroxy-1,2,4-oxadiazole-3-carbonyl)-3-(2-isopropylphenyl)azetidine-3-carboxamide;

1-(2-(2H-1,2,3-triazol-2-yl)acetyl)-N-(6-chloro-4-methoxypyridin-3-yl)-3-(2-isopropylphenyl)azetidine-3-carboxamide;

N-(6-chloro-4-methoxypyridin-3-yl)-3-(2-isopropylphenyl)-1-(2-(4-methyl-1H-1,2,3-triazol-1-yl)acetyl)azetidine-3-carboxamide;

N-(6-chloro-4-methoxypyridin-3-yl)-1-(2-(4-(hydroxymethyl)-1H-1,2,3-triazol-1-yl)acetyl)-3-(2-isopropylphenyl)azetidine-3-carboxamide;

1-(2-(2H-tetrazol-2-yl)acetyl)-N-(6-chloro-4-methoxypyridin-3-yl)-3-(2-isopropylphenyl)azetidine-3-carboxamide;

1-(2-(1H-1,2,3-triazol-1-yl)acetyl)-N-(6-chloro-4-methoxypyridin-3-yl)-3-(2-isopropylphenyl)azetidine-3-carboxamide;

N-(6-chloro-4-methoxypyridin-3-yl)-1-(2-(3-hydroxy-1H-pyrazol-4-yl)acetyl)-3-(2-isopropylphenyl)azetidine-3-carboxamide;

N-(6-chloro-4-methoxypyridin-3-yl)-1-(2-(3-hydroxy-1H-pyrazol-5-yl)acetyl)-3-(2-isopropylphenyl)azetidine-3-carboxamide;

N-(6-chloro-4-methoxypyridin-3-yl)-3-(2-isopropylphenyl)-1-(sulfamoylglycyl)azetidine-3-carboxamide;

N-(6-chloro-4-methoxypyridin-3-yl)-3-(2-isopropylphenyl)-1-((methylsulfonyl)glycyl)azetidine-3-carboxamide;

N-(6-chloro-4-methoxypyridin-3-yl)-3-(2-isopropylphenyl)-1-(2-(methylsulfonyl)acetyl)azetidine-3-carboxamide;

methyl 4-(3-((6-chloro-4-methoxypyridin-3-yl)carbamoyl)-3-(2-isopropylphenyl)azetidin-1-yl)-2,2-dimethyl-4-oxobutanoate;

4-(3-((6-chloro-4-methoxypyridin-3-yl)carbamoyl)-3-(2-isopropylphenyl)azetidin-1-yl)-2,2-dimethyl-4-oxobutanoic acid;

4-(3-((6-bromo-4-methoxypyridin-3-yl)carbamoyl)-3-(2-isopropylphenyl)azetidin-1-yl)-2,2-dimethyl-4-oxobutanoic acid;

4-(4-((6-chloro-4-methoxypyridin-3-yl)carbamoyl)-4-(2-isopropylphenyl)piperidin-1-yl)-2,2-dimethyl-4-oxobutanoic acid;

4-(3-((6-chloro-4-ethoxypyridin-3-yl)carbamoyl)-3-(2-isopropylphenyl)azetidin-1-yl)-2,2-dimethyl-4-oxobutanoic acid;

4-(3-((6-fluoro-4-methoxypyridin-3-yl)carbamoyl)-3-(2-isopropylphenyl)azetidin-1-yl)-2,2-dimethyl-4-oxobutanoic acid;

N-(6-chloro-4-methoxypyridin-3-yl)-3-(2-isopropylphenyl)-1-(methylsulfonyl)azetidine-3-carboxamide;

N-(6-chloro-4-methoxypyridin-3-yl)-3-(2-isopropylphenyl)-1-((2-methoxyethyl)sulfonyl)azetidine-3-carboxamide;

N-(6-chloro-4-methoxypyridin-3-yl)-1-((2-(dimethylamino)ethyl)sulfonyl)-3-(2-isopropylphenyl)azetidine-3-carboxamide;

N-(6-chloro-4-methoxypyridin-3-yl)-3-(2-isopropylphenyl)-1-(oxetan-3-ylsulfonyl)azetidine-3-carboxamide;

N-(6-fluoro-4-methoxypyridin-3-yl)-3-(2-isopropylphenyl)-1-sulfamoylazetidine-3-carboxamide;

N-(6-chloro-4-methoxypyridin-3-yl)-3-(2-isopropylphenyl)-1-sulfamoylazetidine-3-carboxamide;

N-(6-chloro-4-ethoxypyridin-3-yl)-3-(2-isopropylphenyl)-1-sulfamoylazetidine-3-carboxamide;

N-(6-chloro-4-isopropoxypyridin-3-yl)-3-(2-isopropylphenyl)-1-sulfamoylazetidine-3-carboxamide;

N-(6-chloro-4-cyclopropoxypyridin-3-yl)-3-(2-isopropylphenyl)-1-sulfamoylazetidine-3-carboxamide;

N-(6-chloro-4-(2-methoxyethoxy)pyridin-3-yl)-3-(2-isopropylphenyl)-1-sulfamoylazetidine-3-carboxamide;

(S)—N-(6-chloro-4-((1-methoxypropan-2-yl)oxy)pyridin-3-yl)-3-(2-isopropylphenyl)-1-sulfamoylazetidine-3-carboxamide;

N-(6-chloro-4-methoxypyridin-3-yl)-4-(2-isopropylphenyl)-1-sulfamoylpiperidine-4-carboxamide;

N-(6-bromo-4-methoxypyridin-3-yl)-3-(2-isopropylphenyl)-1-sulfamoylazetidine-3-carboxamide;

3-(2-isopropylphenyl)-N-(4-methoxy-6-methylpyridin-3-yl)-1-sulfamoylazetidine-3-carboxamide;

3-(2-isopropylphenyl)-N-(4-methoxy-6-(trifluoromethyl)pyridin-3-yl)-1-sulfamoylazetidine-3-carboxamide;

N-(6-chloro-4-methoxypyridin-3-yl)-3-(2-cyclopentylphenyl)-1-sulfamoylazetidine-3-carboxamide N-(6-chloro-4-methoxypyridin-3-yl)-3-(2-isopropylphenyl)-1-(N-methylsulfamoyl)azetidine-3-carboxamide;

N-(6-chloro-4-methoxypyridin-3-yl)-1-(N-cyclopropylsulfamoyl)-3-(2-isopropylphenyl)azetidine-3-carboxamide;

N-(6-chloro-4-methoxypyridin-3-yl)-3-(2-fluoro-6-isopropylphenyl)-1-sulfamoylazetidine-3-carboxamide;

N-(6-chloro-4-methoxypyridin-3-yl)-3-(5-fluoro-2-isopropylphenyl)-1-sulfamoylazetidine-3-carboxamide;

N-(6-chloro-4-methoxypyridin-3-yl)-3-(3-isopropylpyridin-2-yl)-1-sulfamoylazetidine-3-carboxamide;

N-(6-chloro-4-methoxypyridin-3-yl)-3-(6-fluoro-3-isopropylpyridin-2-yl)-1-sulfamoylazetidine-3-carboxamide;

3-(2-isopropylphenyl)-N-(4-methoxypyridin-3-yl)-1-sulfamoylazetidine-3-carboxamide;

N-(6-chloro-4-methoxypyridin-3-yl)-3-(2-isopropylphenyl)-1-(N-(2-methoxyethyl)sulfamoyl)azetidine-3-carboxamide;

N-(6-chloro-4-methoxypyridin-3-yl)-1-(N-(2-hydroxyethyl)sulfamoyl)-3-(2-isopropylphenyl)azetidine-3-carboxamide;

N3-(6-chloro-4-methoxypyridin-3-yl)-3-(2-isopropylphenyl)azetidine-1,3-dicarboxamide;

N3-(6-chloro-4-methoxypyridin-3-yl)-3-(2-isopropylphenyl)-N1-methylazetidine-1,3-dicarboxamide;

N3-(6-chloro-4-methoxypyridin-3-yl)-N1-ethyl-3-(2-isopropylphenyl)azetidine-1,3-dicarboxamide;

N3-(6-chloro-4-methoxypyridin-3-yl)-N1-isopropyl-3-(2-isopropylphenyl)azetidine-1,3-dicarboxamide;

(S)-N3-(6-chloro-4-((1-methoxypropan-2-yl)oxy)pyridin-3-yl)-N1-cyclopropyl-3-(2-isopropylphenyl)azetidine-1,3-dicarboxamide;

N3-(6-chloro-4-methoxypyridin-3-yl)-N1-cyclopropyl-3-(3-isopropylpyridin-2-yl)azetidine-1,3-dicarboxamide;

2-(3-(((6-chloro-4-methoxypyridin-3-yl)carbamoyl)-3-(2-isopropylphenyl)azetidine-1-carboxamido)ethyl methacrylate;

N3-(6-chloro-4-methoxypyridin-3-yl)-N1-(2-hydroxyethyl)-3-(2-isopropylphenyl)azetidine-1,3-dicarboxamide;

N3-(6-chloro-4-methoxypyridin-3-yl)-3-(2-isopropylphenyl)-N1-(2-methoxyethyl)azetidine-1,3-dicarboxamide;

ethyl (3-(((6-chloro-4-methoxypyridin-3-yl)carbamoyl)-3-(2-isopropylphenyl)azetidine-1-carbonyl)glycinate;

(3-(((6-chloro-4-methoxypyridin-3-yl)carbamoyl)-3-(2-isopropylphenyl)azetidine-1-carbonyl)glycine;

ethyl 3-(3-(((6-chloro-4-methoxypyridin-3-yl)carbamoyl)-3-(2-isopropylphenyl)azetidine-1-carboxamido)propanoate;

3-(3-(((6-chloro-4-methoxypyridin-3-yl)carbamoyl)-3-(2-isopropylphenyl)azetidine-1-carboxamido)propanoic acid;

N3-(6-chloro-4-methoxypyridin-3-yl)-3-(2-isopropylphenyl)-N1,N1-dimethylazetidine-1,3-dicarboxamide;

N-(6-chloro-4-methoxypyridin-3-yl)-3-(2-isopropylphenyl)-1-(morpholine-4-carbonyl)azetidine-3-carboxamide;

methyl 3-((6-chloro-4-methoxypyridin-3-yl)carbamoyl)-3-(2-isopropylphenyl)azetidine-1-carboxylate;

2-methoxyethyl 3-((6-chloro-4-methoxypyridin-3-yl)carbamoyl)-3-(2-isopropylphenyl)azetidine-1-carboxylate;

N-(6-chloro-4-methoxypyridin-3-yl)-3-(2-isopropylphenyl)-1-(3-methylpyridin-4-yl)azetidine-3-carboxamide;

N-(6-chloro-4-methoxypyridin-3-yl)-1-(3-fluoropyridin-4-yl)-3-(2-isopropylphenyl)azetidine-3-carboxamide;

N-(6-chloro-4-methoxypyridin-3-yl)-1-(3-fluoro-2-methylpyridin-4-yl)-3-(2-isopropylphenyl)azetidine-3-carboxamide;

N-(6-chloro-4-methoxypyridin-3-yl)-1-(5-fluoro-2-methylpyridin-4-yl)-3-(2-isopropylphenyl)azetidine-3-carboxamide;

N-(6-chloro-4-methoxypyridin-3-yl)-3-(2-isopropylphenyl)-1-(2-methylpyridin-4-yl)azetidine-3-carboxamide;

N-(6-chloro-4-methoxypyridin-3-yl)-1-(2,6-dimethylpyridin-4-yl)-3-(2-isopropylphenyl)azetidine-3-carboxamide;

N-(6-chloro-4-methoxypyridin-3-yl)-1-(4-fluoropyridin-2-yl)-3-(2-isopropylphenyl)azetidine-3-carboxamide;

N-(6-chloro-4-methoxypyridin-3-yl)-1-(5-cyanopyrimidin-2-yl)-3-(2-isopropylphenyl)azetidine-3-carboxamide;

N-(6-chloro-4-methoxypyridin-3-yl)-1-(5-fluoropyrimidin-2-yl)-3-(2-isopropylphenyl)azetidine-3-carboxamide;

N-(6-chloro-4-methoxypyridin-3-yl)-1-(5-fluoropyrimidin-4-yl)-3-(2-isopropylphenyl)azetidine-3-carboxamide;

N-(6-chloro-4-methoxypyridin-3-yl)-3-(2-isopropylphenyl)-1-(pyrimidin-4-yl)azetidine-3-carboxamide;

N-(6-chloro-4-methoxypyridin-3-yl)-3-(2-isopropylphenyl)-1-(2-methylpyrimidin-4-yl)azetidine-3-carboxamide;

N-(6-chloro-4-methoxypyridin-3-yl)-3-(2-isopropylphenyl)-1-(5-methylpyrimidin-4-yl)azetidine-3-carboxamide;

N-(6-chloro-4-methoxypyridin-3-yl)-3-(2-isopropylphenyl)-1-(6-methylpyrimidin-4-yl)azetidine-3-carboxamide;

1-(6-chloro-2-methylpyrimidin-4-yl)-N-(6-chloro-4-methoxypyridin-3-yl)-3-(2-isopropylphenyl)azetidine-3-carboxamide;

N-(6-chloro-4-methoxypyridin-3-yl)-1-(5-fluoro-2-methylpyrimidin-4-yl)-3-(2-isopropylphenyl)azetidine-3-carboxamide;

N-(6-chloro-4-methoxypyridin-3-yl)-1-(5-fluoropyrimidin-4-yl)-4-(2-isopropylphenyl)piperidine-4-carboxamide;

N-(6-chloro-4-methoxypyridin-3-yl)-1-(5-fluoro-2-methylpyrimidin-4-yl)-4-(2-isopropylphenyl)piperidine-4-carboxamide;

methyl 5-(3-((6-chloro-4-methoxypyridin-3-yl)carbamoyl)-3-(2-isopropylphenyl)azetidin-1-yl)pyrazine-2-carboxylate;

5-(3-((6-chloro-4-methoxypyridin-3-yl)carbamoyl)-3-(2-isopropylphenyl)azetidin-1-yl)pyrazine-2-carboxylic acid;

methyl 6-(3-((6-chloro-4-methoxypyridin-3-yl)carbamoyl)-3-(2-isopropylphenyl)azetidin-1-yl)nicotinate;

methyl 2-(3-((6-chloro-4-methoxypyridin-3-yl)carbamoyl)-3-(2-isopropylphenyl)azetidin-1-yl)pyrimidine-5-carboxylate;

2-(3-((6-chloro-4-methoxypyridin-3-yl)carbamoyl)-3-(2-isopropylphenyl)azetidin-1-yl)pyrimidine-5-carboxylic acid;

methyl 6-(3-((6-chloro-4-methoxypyridin-3-yl)carbamoyl)-3-(2-isopropylphenyl)azetidin-1-yl)pyridazine-3-carboxylate;

ethyl 2-(3-((6-chloro-4-methoxypyridin-3-yl)carbamoyl)-3-(2-isopropylphenyl)azetidin-1-yl)oxazole-4-carboxylate;

N-(6-chloro-4-methoxypyridin-3-yl)-3-(2-isopropylphenyl)-1-(1H-tetrazol-5-yl)azetidine-3-carboxamide;

N-(6-chloro-4-methoxypyridin-3-yl)-3-(2-isopropylphenyl)-1-(4-oxo-4,5-dihydrooxazol-2-yl)azetidine-3-carboxamide; and N-(6-chloro-4-methoxypyridin-3-yl)-1-(2-hydroxy-3,4-dioxocyclobut-1-en-1-yl)-3-(2-isopropylphenyl)azetidine-3-carboxamide;

or a pharmaceutically acceptable salt thereof.

11. A pharmaceutical composition comprising a compound according to claim 1, or a pharmaceutically acceptable salt thereof, and a pharmaceutically acceptable carrier.

12. A compound, wherein said compound is:
N-(6-chloro-4-methoxypyridin-3-yl)-3-(2-isopropylphenyl)-1-sulfamoylazetidine-3-carboxamide;
or a pharmaceutically acceptable salt thereof.

13. A pharmaceutical composition comprising the compound according to claim 12, or a pharmaceutically acceptable salt thereof, and a pharmaceutically acceptable carrier.

14. A pharmaceutical composition comprising a compound according to claim 10, or a pharmaceutically acceptable salt thereof, and a pharmaceutically acceptable carrier.

15. A method for the treatment of pulmonary fibrosis or systemic sclerosis; comprising administering to a subject in need thereof an effective amount of a compound according to claim 1, or a pharmaceutically acceptable salt thereof.

16. A method for the treatment of pulmonary fibrosis or systemic sclerosis; comprising administering to a subject in need thereof an effective amount of a compound according to claim 10, or a pharmaceutically acceptable salt thereof.

17. A method for the treatment of pulmonary fibrosis or systemic sclerosis; comprising administering to a subject in need thereof an effective amount of the compound according to claim 12, or a pharmaceutically acceptable salt thereof.

\* \* \* \* \*